US012407083B2

(12) United States Patent
Park et al.

(10) Patent No.: US 12,407,083 B2
(45) Date of Patent: Sep. 2, 2025

(54) ANTENNA MODULE DISPOSED IN VEHICLE

(71) Applicant: LG ELECTRONICS INC., Seoul (KR)

(72) Inventors: Byeongyong Park, Seoul (KR); Ilnam Cho, Seoul (KR); Kangjae Jung, Seoul (KR); Byungwoon Jung, Seoul (KR); Uisheon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 18/166,065

(22) Filed: Feb. 8, 2023

(65) Prior Publication Data

US 2024/0014538 A1 Jan. 11, 2024

(30) Foreign Application Priority Data

Jul. 5, 2022 (WO) ................ PCT/KR2022/009668

(51) Int. Cl.
*H01Q 1/12* (2006.01)
*H01Q 1/38* (2006.01)
*H01Q 1/52* (2006.01)

(52) U.S. Cl.
CPC ............. *H01Q 1/1271* (2013.01); *H01Q 1/38* (2013.01); *H01Q 1/52* (2013.01)

(58) Field of Classification Search
CPC ........ H01Q 21/28; H01Q 21/08; H01Q 9/045; H01Q 1/38; H01Q 1/32; H01Q 1/243; H01Q 1/1271; H01Q 1/52; H01Q 1/241; H01Q 1/12; H01Q 1/36; H01Q 1/364; H01R 4/02
See application file for complete search history.

(56) References Cited

U.S. PATENT DOCUMENTS 11,955,704 B2 * 4/2024 Huh ........................ H01Q 1/364
11,955,708 B2 * 4/2024 Park ........................ H01Q 21/08
11,973,265 B2 * 4/2024 Ryu ...................... H01Q 9/0407
12,015,205 B2 * 6/2024 Jin ........................ H01Q 21/064
12,107,323 B2 * 10/2024 Park ........................ H01Q 1/405
(Continued)

FOREIGN PATENT DOCUMENTS

KR 1020220123133 9/2022
KR 1020220131335 9/2022

OTHER PUBLICATIONS

Korean Intellectual Property Office Application No. 10-2024-7017104, Notice of Allowance dated Feb. 3, 2025, 7 pages.

*Primary Examiner* — Tho G Phan
(74) *Attorney, Agent, or Firm* — LEE, HONG, DEGERMAN, KANG & WAIMEY

(57) ABSTRACT

An antenna assembly includes a first layer realized as a dielectric substrate formed of a transparent dielectric material, and a second layer formed in a metal mesh shape on one surface of the dielectric substrate. The second layer includes a metal mesh radiator region configured with metal lines that realize an atypical mesh shape having a specific line-width or smaller in such a manner as to transmit and receive a wireless signal and an open area, and a dummy metal mesh region configured with metal lines and slits that realize an atypical mesh shape having a specific line-width or smaller.

11 Claims, 38 Drawing Sheets

(a)

(b)

(56) References Cited

U.S. PATENT DOCUMENTS

| | | | | |
|---|---|---|---|---|
| 2009/0140938 | A1* | 6/2009 | Ishibashi | H01Q 1/44 343/897 |
| 2016/0091998 | A1* | 3/2016 | Chyan | G06F 3/04883 345/174 |
| 2023/0006363 | A1* | 1/2023 | Yoon | H01Q 1/44 |
| 2024/0258690 | A1* | 8/2024 | Iimura | H01Q 1/22 |

* cited by examiner (a)

(b) (c)

(a)

(b)

(a)

(b)

(a)

(b)

(a)

(b)

| | | | | | | | | |
|---|---|---|---|---|---|---|---|---|
| PRODUCT SPECIFICATIONS | MATERIAL | Cu | Ag(BOTH-SIDE BLACKENING) | | | | | |
| | MESH TYPE | TYPICAL (DIAMOND) | ATYPICAL | | | ATYPICAL | | |
| | LINE-WIDTH (μm) | 4.2 ~ 4.5 | 5.2 ~ 5.4 | | | 5.2 ~ 5.4 | | |
| | LINE-HEIGHT (μm) | 0.5 ~ 0.6 | 6.0 ~ 6.3 | | | 6.0 ~ 6.3 | | |
| | PITCH (μm) | 70 | 100 | 125 | 150 | 100 | 125 | 150 |
| PRODUCT FEATURES | TRANSMISSIVITY(%) | 79.79 | 82.62 | 83.76 | 85.11 | 83.13 | 84.95 | 86.29 |
| | HAZE | 7.32 | 3.60 | 2.52 | 2.11 | 3.31 | 2.30 | 1.92 |
| | SHEET RESISTANCE (Ω/sq) | – | 0.47 | 0.65 | 0.88 | 0.48 | 0.67 | 0.89 |
| | TENSILE FORCE (kgf/cm) | Ave. 0.5 | Ave. 1.31 | | | | | |
| | MESH SHAPE |  | | | | | | |
| | | TM | ATM 1 | ATM 2 | ATM 3 | ATM 4 | ATM 5 | ATM 6 |

(a)

(b)

| mm | WAVELENGTH |
|---|---|
| 0.1 | 0.02 |
| 0.2 | 0.05 |
| 0.3 | 0.07 |
| 0.4 | 0.09 |
| 0.5 | 0.12 |
| 0.6 | 0.14 |
| 0.7 | 0.16 |
| 0.8 | 0.19 |
| 0.9 | 0.21 |
| 1 | 0.23 |

(a)

(b)

(a)

(b)

(a)

(b)

(a)

(b)

ANTENNA MODULE DISPOSED IN VEHICLE

CROSS-REFERENCE TO RELATED APPLICATION

Pursuant to 35 U.S.C. § 119(a), this application claims the benefit of the earlier filing date and the right of priority to International Patent Application No. PCT/KR2022/009668, filed on Jul. 5, 2022, the contents of which is incorporated by reference herein in its entirety.

TECHNICAL FIELD

The present disclosure relates to a transparent antenna that is disposed in a vehicle. Particularly, the preset disclosure relates to an antenna assembly that is formed of a transparent material in such a manner that an antenna region is not identified on a glass pane of a vehicle.

BACKGROUND

A vehicle may perform the service of performing wireless communication with another vehicle, a nearby object, a nearby infrastructure, or a nearby base station. In this regard, various communication services may be provided through a wireless communication system to which an LTE communication technology or a 5G communication technology applies. One portion of an LTE frequency band may be allocated in order to provide the 5G communication service.

A vehicle body and a vehicle roof that are formed of a metal material have the problem that a radio wave is blocked from propagating. Accordingly, a separate antenna structure may be disposed on the top of the vehicle body or the vehicle roof. In addition, in a case where the antenna structure is disposed on the bottom of the vehicle body or the vehicle roof, the vehicle body or a portion of the vehicle roof that corresponds to a region which an antenna is disposed may be formed of a non-metal material.

However, there is no need to integrally form the vehicle body or the vehicle roof in terms of design. In this case, an exterior portion of the vehicle body or the vehicle roof may be formed of a metal material. Accordingly, there occurs a problem in that antenna performance can be greatly increased due to the vehicle body or the vehicle roof.

In this regard, in order to increase a communication capacity, a transparent antenna may be disposed on a glass pane corresponding to a vehicle window pane, without changing a design of an exterior appearance of the vehicle. However, there occurs a problem in that antenna radiation efficiency and impedance bandwidth characteristics are degraded due to an electrical loss of an antenna formed of a transparent material.

When an antenna pattern is formed in such a manner as to have a metal mesh structure in which metal lines are connected to each other on a dielectric substrate, a transparent antenna in which the metal lines are distinguishable with the naked eye may be realized. However, in a case where the metal mesh structure is not formed on a dielectric region surrounding an antenna region on which an antenna pattern is formed, the antenna region and the dielectric region are distinguished with the naked eye, and there occurs a problem in that a difference in visibility occurs.

In order to solve this problem, a dummy mesh grid may also be disposed on the dielectric region. However, interference with the antenna pattern occurs due to the disposing of the dummy mesh grid. Thus, there occurs a problem in that antenna performance is degraded.

When the antenna formed of a transparent material is disposed on a glass pane of the vehicle, a transparent antenna pattern may be configured in such a manner as to be electrically connected to an electricity supply pattern that is disposed on a separate dielectric substrate. In this regard, a loss in electricity supply and a decrease in antenna performance may occur due to the connecting of the transparent antenna pattern and the electricity supply pattern. In addition, there may occur a difference in the degree of transparency between a transparent region on which the transparent antenna pattern is formed and an opaque region on which the electricity supply pattern is formed. A region on which an antenna is disposed and a different region may be distinguished with the naked eye, depending on the difference in the degree of transparency. There is a need to provide a method for minimizing a difference in visibility between the antenna region on the glass pane of the vehicle and the different region despite the difference in the degree of transparency.

SUMMARY

An object of the present disclosure is to solve the above-mentioned problems and other problems. Another object of the present disclosure is to provide an antenna assembly that is formed of a transparent material in such a manner that an antenna region is not distinguishable with the naked eye from a dielectric region.

Still another object of the present disclosure is to minimize a difference in visibility between a region where an antenna formed of a transparent material and a different region.

Still another object of the present disclosure is to minimize interference between a dummy mesh grid disposed on a dielectric region and an antenna region.

Still another object of the present disclosure is to ensure non-visibility of each of a transparent antenna and an antenna assembly including the transparent antenna, without degradation in antenna performance.

Still another object of the present disclosure is to ensure both non-visibility of a shape of an antenna assembly and non-visibility that results when the antenna assembly is attached to a display or a glass pane.

Still another object of the present disclosure is to improve visibility without degradation in antenna performance in a transparent antenna through optimal designing of a dummy pattern having an open area.

Still another object of the present disclosure is to provide a broadband antenna structure, made of a transparent material, that is also capable of decreasing a loss in electricity supply and improving antenna efficiency while operating in a broad band.

In order to achieve the above-mentioned objects and other objects, according to an aspect of the present disclosure, there is provided an antenna assembly including a first layer realized as a dielectric substrate formed of a transparent dielectric material, and a second layer formed in a metal mesh shape on one surface of the dielectric substrate. The second layer includes a metal mesh radiator region configured with metal lines that realize an atypical mesh shape having a specific line-width or smaller in such a manner as to transmit and receive a wireless signal, and an open area; and a dummy metal mesh region configured with metal lines and slits that realize an atypical mesh shape having a specific line-width or smaller.

The metal mesh radiator region is formed in such a manner as to have first transmissivity, and the dummy metal mesh region is formed in such a manner as to have second transmissivity that is higher than the first transmissivity. The dummy metal mesh region is spaced a distance away from an outer portion of the metal mesh radiator region. The atypical mesh shape of the dummy metal mesh region overlapping virtual cut lines formed in both axial directions forms the open area. The virtual cut lines and a polygon made up of the metal lines in the atypical mesh shape are formed in such a manner as to overlap in a line-width region corresponding to the inside of the polygon. The virtual cut lines are formed on the dummy metal mesh region to be equally spaced apart from one another.

In the antenna assembly, the first transmissivity of the metal mesh radiator region may be 80% or more. The second transmissivity of the dummy metal mesh region may be 82% or more. Sheet resistance of the metal mesh radiator region may be 1 Ω (ohm)/sq or less.

In the antenna assembly, a difference between the first transmissivity of the metal mesh radiator region and the second transmissivity of the dummy metal mesh region may be 2% or less. A boundary of one portion of the dummy metal mesh region and a boundary of the metal mesh radiator region may be spaced a separation distance apart. A boundary of the dummy metal mesh region and the boundary of the metal mesh radiator region may be spaced a distance of 200 μm or less apart.

In the antenna assembly, the dummy metal mesh region may be formed in such a manner as to have a line-width of 5.2 μm to 5.4 μm. The dummy metal mesh region may be formed in such a manner as to have a width of 6.0 μm to 6.3 μm.

In the antenna assembly, an antenna pattern realized by the metal mesh radiator region may operate in an operating frequency band of 800 MHz to 3000 MHz. A distance between the virtual cut lines on the dummy metal mesh region may be set to 1/10 or less of a wavelength. When an operating frequency band of 3000 MHz in which the antenna pattern operates is defined as a reference frequency, the distance between the virtual cut lines may be set to 10 mm or less.

In the antenna assembly, in a case where the metal lines in the atypical mesh shape are formed in such a manner as to have a pitch of 100 μm to 150 μm, the atypical mesh shape may be formed in such a manner as to have a sheet resistance of 0.47 Ω/sq to 0.89 Ω/sq.

In the antenna assembly, a dummy pattern on the dummy metal mesh region may be configured in such a manner as to be disconnected in vertical and horizontal directions. Coupling between an antenna pattern realized by the metal mesh radiator region and the dummy pattern configured in such a manner as to be disconnected in the vertical and horizontal directions may be decreased more than second coupling between the antenna pattern and each of the dummy patterns that are connected to each other.

In the antenna assembly, a boundary of the dummy pattern may be configured in such a manner as to be spaced a distance of 100 μm or less away from boundaries of the metal lines on the metal mesh radiator region.

In the antenna assembly, vertical virtual cut lines may be disposed on the dummy metal mesh region in such a manner as to be spaced a first distance apart in a vertical direction, and horizontal virtual cut lines may be disposed on the dummy metal mesh region in such a manner as to be spaced a second distance apart in a horizontal direction. The first distance and the second distance may be set to a distance or greater between a boundary of the dummy metal mesh region and a boundary of the metal mesh radiator region.

In the antenna assembly, a first region of the dummy metal mesh region that is spaced a predetermined distance or smaller away from a boundary of the metal mesh radiator region may form an open dummy region where slits by which the atypical mesh shape is disconnected are present.

In the antenna assembly, a second region of the dummy metal mesh region that is spaced a predetermined distance or greater away from the boundary of the metal mesh radiator region may form a closed dummy region where the atypical mesh shapes are connected to each other.

In the antenna assembly, the predetermined distance may be set to ¼ to ½ of a wavelength corresponding to an uppermost frequency, among operating frequencies of an antenna pattern that is realized by the metal mesh radiator region.

According to another aspect of the present disclosure, there is provided an antenna assembly including a first layer realized as a dielectric substrate formed of a transparent dielectric material; and a second layer formed in a metal mesh shape on one surface of the dielectric substrate and including a first region and a second region formed adjacent to the first region. The second layer includes a metal mesh radiator region configured with metal lines that realize an atypical mesh shape having a specific line-width or smaller in such a manner as to transmit and receive a wireless signal, and an open area, a dummy metal mesh region configured with metal lines and slits that realize an atypical mesh shape having a specific line-width or smaller, and a connector portion configured in such a manner as to be connected to the metal mesh radiator region and thus to transmit a signal.

In the antenna assembly, the first transmissivity of the metal mesh radiator region may be 80% or more. The second transmissivity of the dummy metal mesh region may be 82% or more. The third transmissivity of the connector portion may be 70% or less, and sheet resistance of the metal mesh radiator region may be 1 Ω (ohm)/sq or less.

In the antenna assembly, a difference between the first transmissivity of the metal mesh radiator region and the second transmissivity of the dummy metal mesh region may be 2% or less. A boundary of one portion of the dummy metal mesh region and a boundary of the metal mesh radiator region may be spaced a separation distance apart. A boundary of the dummy metal mesh region and the boundary of the metal mesh radiator region may be spaced a distance of 200 μm or less apart.

In the antenna assembly, the metal mesh radiator region and the dummy metal mesh region form the first region, and the connector portion may form the second region. The metal mesh radiator region is formed in such a manner as to have first transmissivity, and the dummy metal mesh region may be formed in such a manner as to have second transmissivity that is higher than the first transmissivity. The connector portion is formed in such a manner as to have third transmissivity that is lower than the first transmissivity. The dummy metal mesh region is spaced a distance away from an outer portion of the metal mesh radiator region.

The atypical mesh shape of the dummy metal mesh region overlapping virtual cut lines formed in both axial directions forms the open area. The virtual cut lines and a polygon made up of the metal lines in the atypical mesh shape are formed in such a manner as to overlap in a line-width region corresponding to the inside of the polygon. The virtual cut lines are formed on the dummy metal mesh region to be equally spaced apart from one another.

In the antenna assembly, the dummy metal mesh region may be formed in such a manner as to have a line-width of 5.2 μm to 5.4 μm. The dummy metal mesh region may be formed in such a manner as to have a width of 6.0 μm to 6.3 μm.

In the antenna assembly, an antenna pattern realized by the metal mesh radiator region may operate in an operating frequency band of 800 MHz to 3000 MHz. A distance between the virtual cut lines on the dummy metal mesh region may be set to 1/10 or less of a wavelength. When an operating frequency band of 3000 MHz in which the antenna pattern operates is defined as a reference frequency, the distance between the virtual cut lines may be set to 10 mm or less.

In the antenna assembly, in a case where the metal lines in the atypical mesh shape are formed in such a manner as to have a pitch of 100 μm to 150 μm, the atypical mesh shape may be formed in such a manner as to have a sheet resistance of 0.47 Ω/sq to 0.89 Ω/sq.

In the antenna assembly, a dummy pattern on the dummy metal mesh region may be configured in such a manner as to be disconnected in vertical and horizontal directions. Coupling between an antenna pattern realized by the metal mesh radiator region and the dummy pattern configured in such a manner as to be disconnected in the vertical and horizontal directions may be decreased more than second coupling between the antenna pattern and each of the dummy patterns that are connected to each other.

A boundary of the dummy pattern may be configured in such a manner as to be spaced a distance of 100 μm or smaller away from boundaries of the metal lines on the metal mesh radiator region.

In the antenna assembly, vertical virtual cut lines may be disposed on the dummy metal mesh region in such a manner as to be spaced a first distance apart in a vertical direction, and horizontal virtual cut lines may be disposed on the dummy metal mesh region in such a manner as to be spaced a second distance apart in a horizontal direction. The first distance and the second distance may be set to a distance or greater between a boundary of the dummy metal mesh region and a boundary of the metal mesh radiator region.

In the antenna assembly, a first region of the dummy metal mesh region that is spaced a predetermined distance or smaller away from a boundary of the metal mesh radiator region may form an open dummy region where slits by which the atypical mesh shape is disconnected are present.

In the antenna assembly, a second region of the dummy metal mesh region that is spaced a predetermined distance or greater away from the boundary of the metal mesh radiator region may form a closed dummy region where the atypical mesh shapes are connected to each other.

The predetermined distance may be set to 1/4 to 1/2 of a wavelength corresponding to an uppermost frequency, among operating frequencies of an antenna pattern that is realized by the metal mesh radiator region.

Technical effects of the transparent antenna that is disposed in the vehicle are described as follows.

According to the present disclosure, the antenna assembly can be optimally configured that is formed of a transparent material in such a manner that the antenna region is not identifiable from the neighboring dielectric region in a transparent antenna structure.

According to the present disclosure, a difference in the non-visibility between a region where the antenna formed of a transparent material is disposed and a different region can be minimized by forming the open dummy region where the slits is formed in the dielectric region.

According to the present disclosure, the spacing by a predetermined distance between the antenna region and the dummy pattern can ensure the non-visibility of each of the transparent antenna and the antenna assembly including the transparent antenna without the degradation in the antenna performance.

According to the present disclosure, forming of an open dummy structure in such a manner as to disconnect points of intersection of the metal lines on a dummy region and one point on each of the metal lines can ensure the non-visibility of each of the transparent antenna and the antenna assembly including the transparent antenna without the degradation in the antenna performance.

According to the present disclosure, forming of virtual cut lines formed in both axial directions in such a manner as to disconnect the metal lines on the dummy region can ensure the non-visibility of each of the transparent antenna and the antenna assembly including the transparent antenna without the degradation in the antenna performance.

According to the present disclosure, a structure of the virtual cut line capable of being realized in various sizes and shapes can ensure the non-visibility of each of the transparent antenna and the antenna assembly including the transparent antenna without the degradation in the antenna performance.

According to the present disclosure, an atypical metal mesh grid structure capable of being realized in various sizes and shapes can realize the transparent antenna having an excellent level of transparency and excellent sheet resistance characteristics without the degradation in the antenna performance.

According to the present disclosure, optimal designing of the slits in the dummy pattern having the open area and the open area separate from the radiator region can improve the visibility without the degradation in the antenna performance in the transparent antenna.

According to the present disclosure, the broadband antenna structure, formed of a transparent material, that is capable of decreasing a loss in electricity supply and improving the antenna efficiency while operating in the broad band can be provided through a glass pane of the vehicle or a display region of an electronic apparatus.

According to the present specification, the transparent antenna structure capable of performing wireless communication in 4G and 5G frequency bands can be provided while minimizing a change in the antenna performance and a difference between the antenna region and a region in the vicinity of the antenna region.

According to the present specification, the transparent antenna structure capable of performing the wireless communication in a mmWave frequency band can be provided while minimizing the change in the antenna performance and the difference between the antenna region and the region in the vicinity of the antenna region.

An additional range of applicability of the present disclosure would be apparent from the following detailed description. However, it would be clearly understood that various alterations and modifications are possibly made within the technical idea of the present disclosure, and therefore it should be understood that a specific embodiment, as a desired embodiment, are provided only in an exemplary manner in the present disclosure.

DETAILED DESCRIPTION

Figure 1:
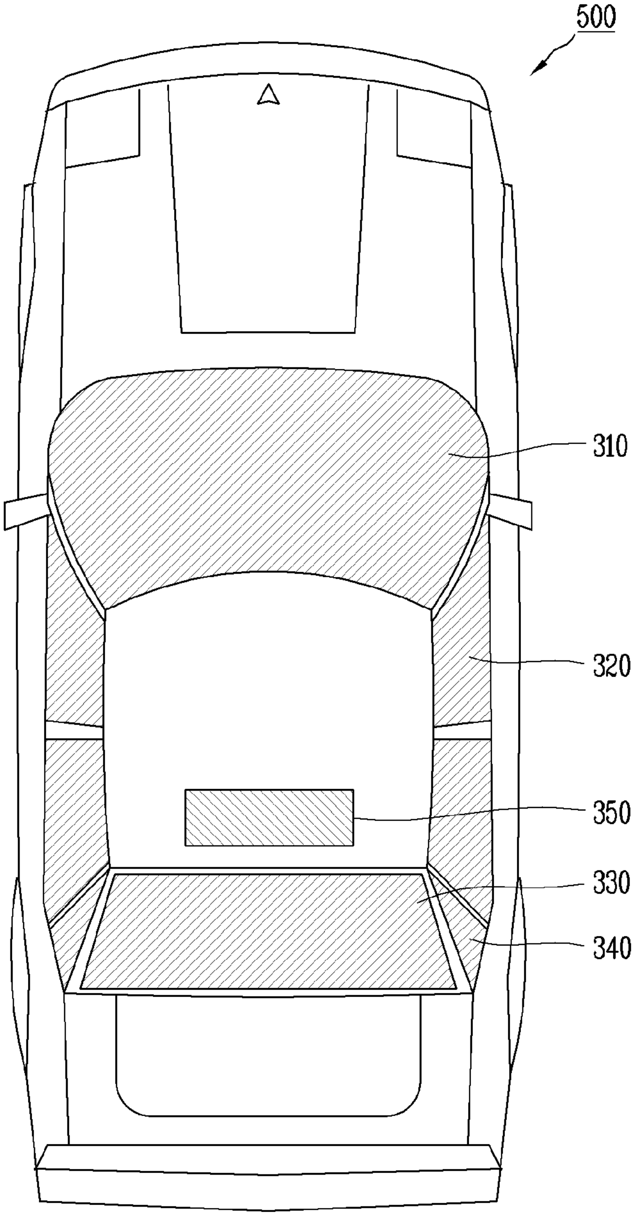
FIG. 1 is a view of a glass pane of a vehicle on which an antenna structure according to an embodiment of the present disclosure is disposed.

For the purpose of disclosure, an embodiment of the present disclosure will be described below in detail referring to the accompanying drawings. The same or similar constituent elements are given the same reference numeral, and descriptions thereof are not repeated. The terms "module" and "unit" are hereinafter interchangeably or individually used to represent a constituent element only for convenience in description in the present specification, but are not themselves intended to provide a distinguishing meaning or function. In addition, in describing the embodiment of the present invention, a detailed description of a well-known technology related thereto will be omitted when determined as making the nature and gist of the present invention unclear. The accompanying drawings are used only to help easily understand the technical idea of the present disclosure. It should be understood that the idea of the present invention is not limited by the accompanying drawings and that any alterations of, equivalents of, and substitutes for, a constituent element of the present disclosure are included within the scope of the present invention.

The terms "first," "second," and so on are used to describe various constituent elements, but do not impose any limitation on the various constituent elements. These terms are used only to distinguish one element from another.

It should be understood that a constituent element, when referred to as being "coupled to" or "connected to" a different constituent element, may also be directly coupled to or directly connected to the different constituent element or may also be coupled to or connected to the different constituent element with a third constituent element in between. In contrast, it should be understood that a constituent element, when referred to as being "directly coupled to" or "directly connected to" a different constituent element, is coupled to or connected to the different constituent element without a third constituent element in between.

A noun in singular form has the same meaning as when used in plural form, unless it has a different meaning in context.

The term "include," "have," or the like in the present application is intended to indicate that a feature, a number, a step, an operation, a constituent element, a component, or a combination of these, which is described in the specification, is present, and thus should be understood not to pre-exclude the possibility that one or more other features, numbers, steps, operations, constituent elements, components, or combinations of these will be present or added.

An antenna system described herein may be mounted in a vehicle. A configuration and an operation according to an embodiment of the present disclosure that is described herein may also apply to a communication system, that is, an antenna system, that is mounted in the vehicle. In this regard, the antenna system mounted in the vehicle may include a plurality of antennas, and a transceiver circuit and a processor that control the plurality of antennas.

Hereinafter, an antenna assembly (antenna module) according to the present disclosure that is capable of being disposed on a window of the vehicle and a vehicle antenna system including the antenna assembly will be described. In this regard, the antenna assembly may mean a structure that results from combining conductive patterns on a dielectric substrate and may also be referred to as the antenna module.

In this regard, FIG. 1 illustrates a glass pane of a vehicle on which the antenna structure according to the embodiment of the present disclosure is disposed. Referring to FIG. 1, a vehicle 500 may be configured to include a front glass panel 310, a door glass pane 320, a rear glass pane 330, and a quarter glass pane 340. The vehicle 500 may be configured to further include an upper glass pane 350 formed on a roof in an upper region thereof.

Therefore, a glass pane constituting a window of the vehicle 500 may include the front glass panel 310 disposed in a front region of the vehicle 500, the door glass pane 320 disposed in a door region of the vehicle 500, and the rear glass pane 330 disposed in a rear region of the vehicle 500. The glass pane constituting the window of the vehicle 500 may further include the quarter glass pane 340 that is disposed in a portion of the door region of the vehicle 500. In addition, the glass pane constituting the window of the vehicle 500 may further include the upper glass pane 350 that is disposed in the upper region of the vehicle 500 in a manner that is spaced away from the rear glass pane 330. Accordingly, each glass pane constituting the window of the vehicle 500 may also be referred to as a window.

The front glass panel 310 serves to prevent wind from blowing from in front of the vehicle 500 into the vehicle 500 and thus may be referred to as a front windshield. The front glass panel 310 may be formed in such a manner as to have a two-layer junction structure with a thickness of approximately 5.0 mm to 5.5 mm. The front glass panel 310 may be formed in such a manner as to have a structure that results from joining a glass pane, a shatterproof film and a glass pane into a single panel.

The door glass pane 320 may be formed in such a manner as to have a two-layer junction layer or to have a single layer of compressed glass. The rear glass pane 330 may be formed in such a manner as to have a two-layer junction structure with a thickness of approximately 3.5 mm to 5.5 mm or formed of a single layer of compressed glass. It is necessary that there is a separation distance among a heating wire, an AM/FM antenna, and a transparent antenna on the rear glass pane 330. The quarter glass pane 340 may be formed of a single layer of compressed glass with a thickness of approximately 3.5 mm to 4.0 mm and is not limited thereto.

The quarter glass pane 340 varies in size with a type of vehicle. The quarter glass pane 340 may be configured in such a manner as to have a smaller size than the front glass panel 310 and the rear glass pane 330.

Figure 2A:
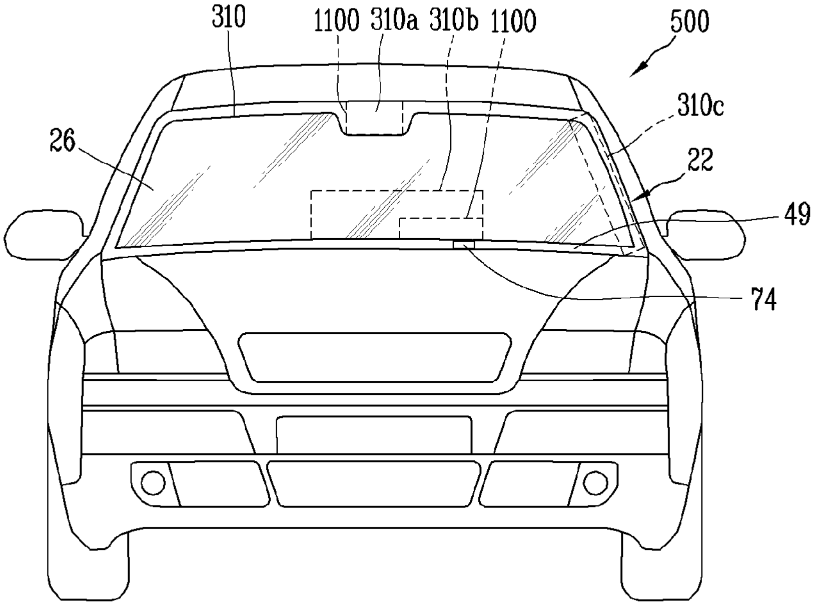
FIG. 2A is a front view of the vehicle in FIG. 1 in which an antenna assembly is disposed on different regions of a front glass pane.
Figure 2B:
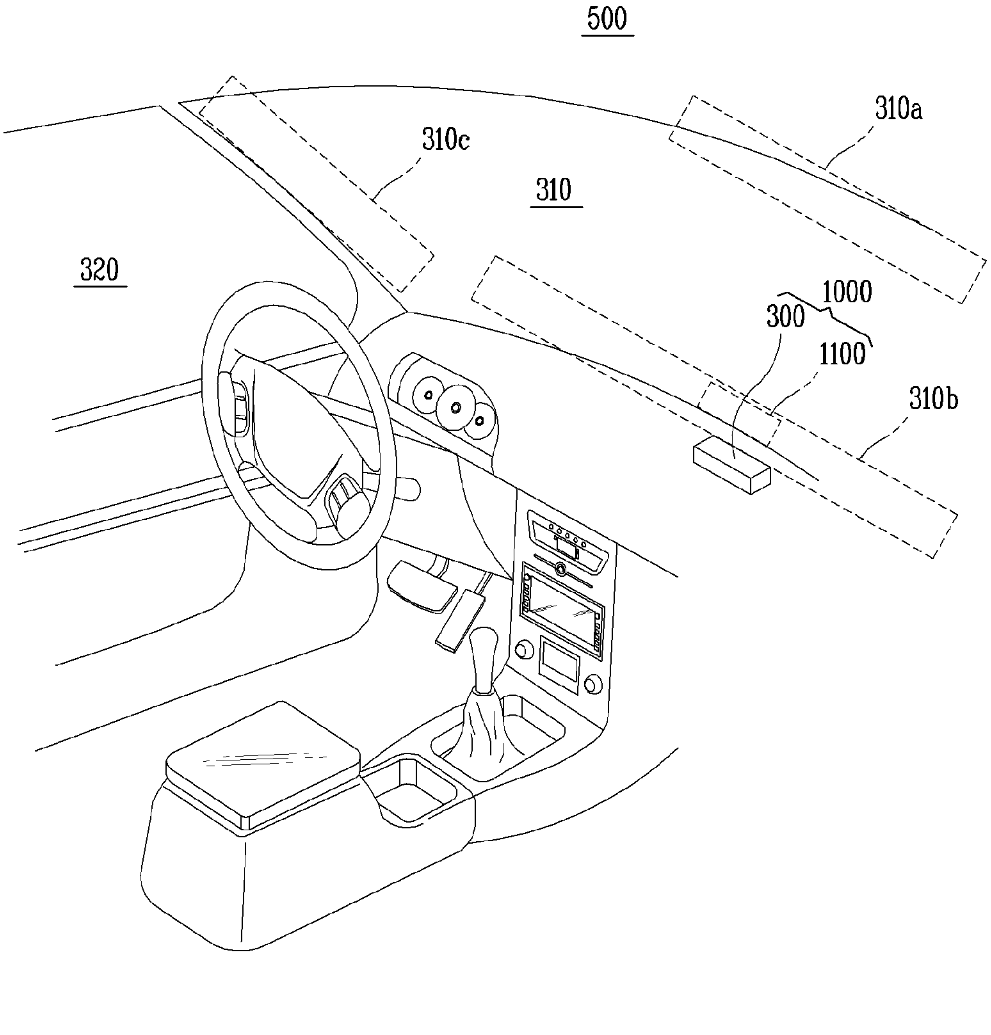
FIG. 2B is a perspective view of a front portion of the inside of the vehicle in FIG. 1 in which the antenna assembly is disposed on the different regions of the front glass pane.
Figure 2C:
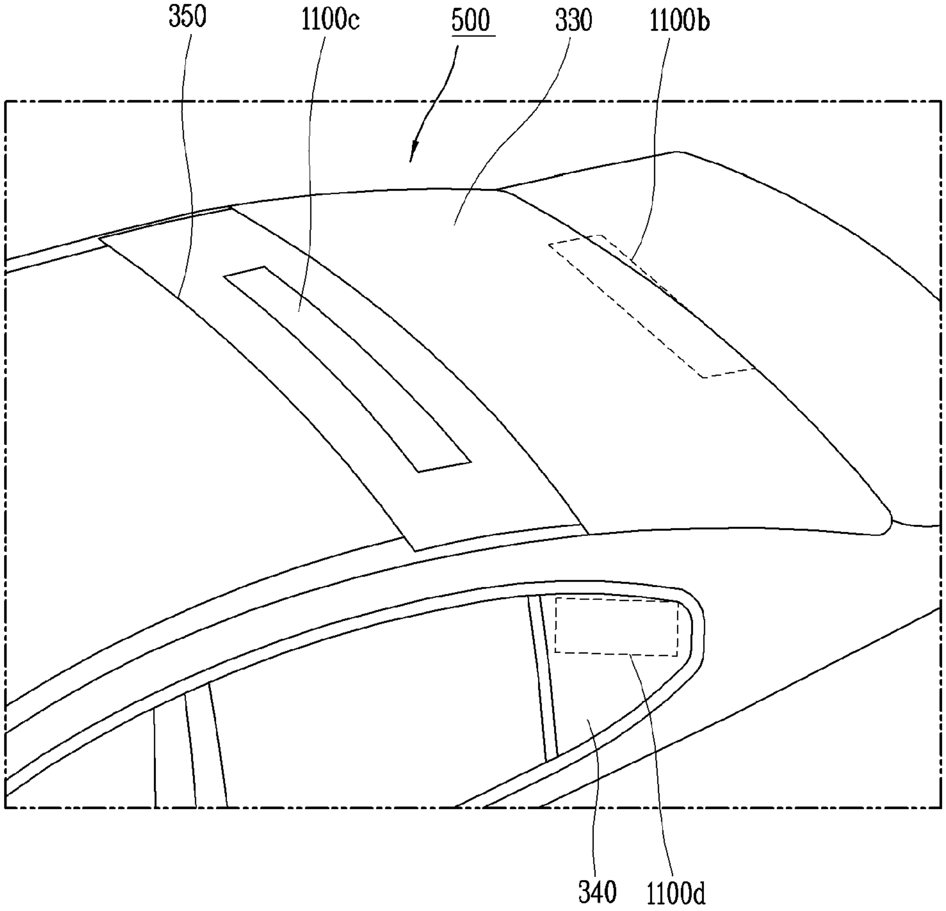
FIG. 2C is a perspective view of a lateral side of the vehicle in FIG. 1 in which the antenna assembly is disposed on an upper glass pane.

A structure in which an antenna assembly according to the present disclosure is disposed on different regions of a front glass pane of the vehicle 500 will be described below. The antenna assembly attached to a vehicle glass pane may be realized as the transparent antenna. In this regard, FIG. 2A illustrates the front side of the vehicle 500 in FIG. 1 in which the antenna assembly is disposed on the different regions of the front glass pane. FIG. 2B is a perspective view of a front portion of the inside of the vehicle 500 in FIG. 1 in which the antenna assembly is disposed on the different regions of the front glass pane. FIG. 2C is a perspective view of a lateral side of the vehicle 500 in FIG. 1 in which the antenna assembly is disposed on the upper glass pane 350.

FIG. 2A illustrates a configuration in which the transparent antenna for the vehicle 500 according to the present disclosure may be disposed. A glass-pane assembly 22 may include an antenna on an upper region 310*a*. The glass pane assembly 22 may include the antenna on the upper region 310*a*, an antenna on a lower region 310*b*, and/or an antenna on a lateral-side region 310*c*. In addition, the glass pane assembly 22 may include a translucent glass pane 26 formed of a dielectric substrate. The antenna on the upper region 310*a*, the antenna on the lower region 310*b*, and/or the antenna on the lateral-side region 310*c* are configured in such a manner as to support an arbitrary one, selected from among various communication systems.

An antenna module 1100 may be realized by the upper region 310*a*, the lower region 310*b*, or the lateral-side region 310*c* of the front glass panel 310. In a case where the antenna module 1100 is disposed on the lower region 310*b* of the front glass panel 310, the antenna module 1100 may be expanded up to a lower-region body 49 of the translucent glass pane 26. The lower-region body 49 of the translucent glass pane 26 may be realized in such a manner as to have a lower degree of transparency than the other portions. One portion of an electricity supply unit, or interface lines other than the one portion thereof may be realized on the lower-region body 49 of the translucent glass pane 26. A connector assembly 74 may be realized on the lower-region body 49 of the translucent glass pane 26. The lower-region body 49 may constitute a vehicle body made of a metal material.

Referring to FIG. 2B, an antenna assembly 1000 may be configured to include a telematics control unit (TCU) (telematics module) 300 and the antenna module 1100. The antenna module 1100 may be disposed on different regions of the glass pane of the vehicle 500.

Referring to FIGS. 2A and 2B, the antenna assembly may be disposed on the upper region 310*a*, the lower region 310*b*, and/or the lateral-side region 310*c* of the glass pane of the vehicle 500. Referring to FIGS. 2A to 2C, the antenna assembly may be disposed on the front glass panel 310, the rear glass pane 330, the quarter glass pane 340, and the upper glass pane 350 of the vehicle 500.

Referring to FIGS. 2A to 2C, the antenna on the upper region 310*a* of the front glass panel 310 of the vehicle 500 may be configured in such a manner as to operate in a low band (LB), a mid band (MB), and a high band (HB) in a 4G/5G communication system, and in a 5G Sub-6 band. The antenna on the lower region 310*b* and/or the antenna on the lateral-side region 310*c* may also be configured in such a manner as to operate in the LB, the MB, and the HB in the 4G/5G communication system and in the 5G Sub-6 band. An antenna structure 1100*b* on the rear glass pane 330 may also be configured in such a manner as to operate in the LB, the MB, and the HB, in the 4G/5G communication system and in the 5G Sub-6 band. An antenna structure 1100*c* on the upper glass pane 350 of the vehicle 500 may also be configured in such a manner as to operate in the LB, the MB, and the HB in the 4G/5G communication system and in the 5G Sub-6 band. An antenna structure 1100*d* on the quarter glass pane 340 may also be configured in such a manner as to operate in the LB, the MB, and the HB in the 4G/5G communication system and in the 5G Sub-6 band.

At least one portion of an out portion of the front glass panel 310 of the vehicle 500 may be formed as the translucent glass pane 26. The translucent glass pane 26 may include a first portion on which an antenna and one portion of the electricity supply unit are formed and a second portion in which one portion of the electricity supply unit and a dummy structure are formed. In addition, translucent glass pane 26 may further include a dummy region on which conductive patterns are not formed. As an example, a transparent region of the glass pane assembly 22 may be formed in such a manner as to have transparency in order to enable light transmission and secure a field of view.

The conductive patterns are illustrated as possibly being formed on one portion of the front glass panel 310, but may be expanded to the door glass panel 320 and the rear glass panel 330 in FIG. 1 and to an arbitrary glass structure. A driver or an occupant other than the driver in the vehicle 500 can see a road and a surrounding environment through the glass pane assembly 22. In addition, the driver or the occupant other than the driver can seethe road and the surrounding environment without his/her view being blocked by the antenna on the upper region 310*a*, the antenna on the lower region 310*b*, and/or the antenna on the lateral-side region 310*c*.

Figure 3:
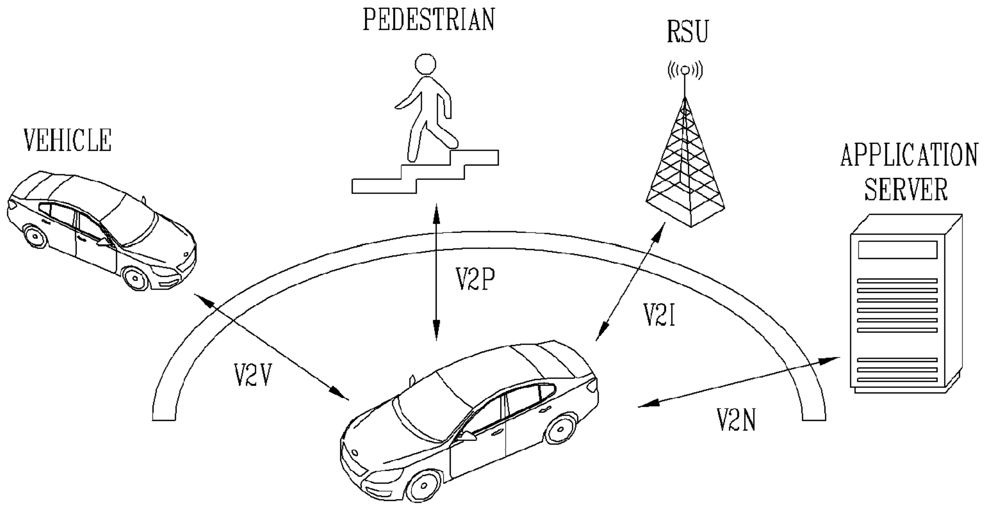
FIG. 3 is a view illustrating types of V2X application.

The vehicle 500 may be configured in such a manner as to communicate with a pedestrian, a nearby infrastructure, and/or a nearby server in addition to a nearby vehicle. In this regard, FIG. 3 illustrates types of V2X application. Referring to FIG. 3, vehicle-to-everything (V2X) communication includes communication between a vehicle and any entity, such as vehicle-to-vehicle (V2V) communication which refers to communication between vehicles, vehicle-to-Infrastructure (V2I) communication which refers to communication between a vehicle and an eNB or a road side unit (RSU), vehicle-to-pedestrian (V2P) communication which refers to communication between a vehicle and a terminal carried by a person (a pedestrian, a cyclist, a vehicle driver, or a passenger), vehicle-to-network (V2N) communication, or the like.

Figure 4:
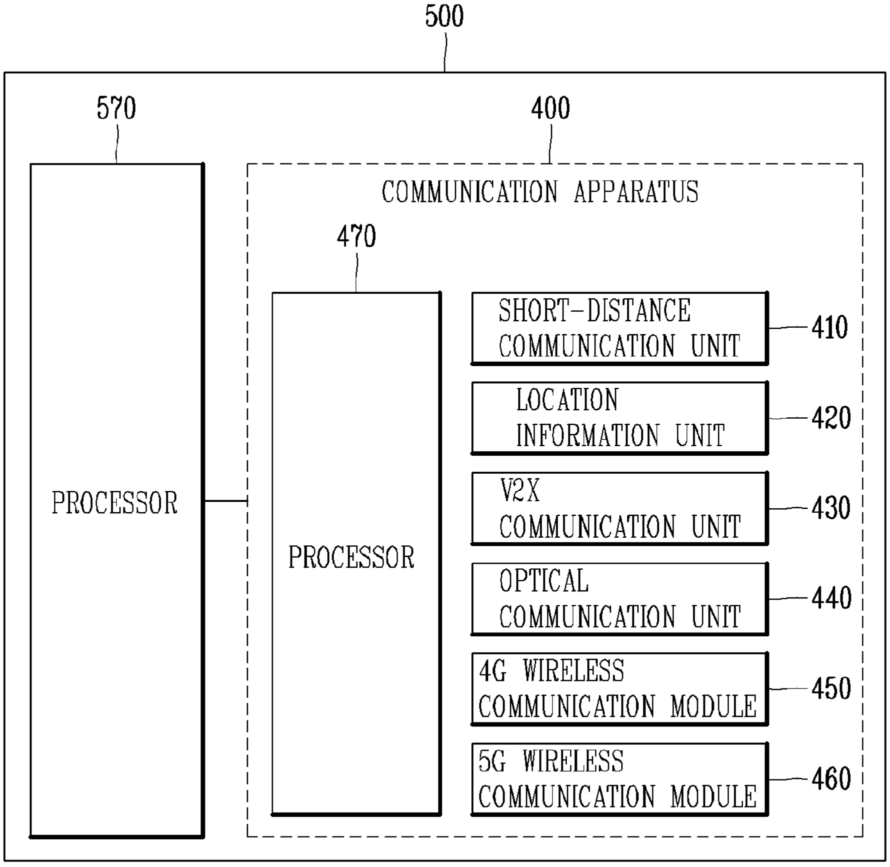
FIG. 4 is a block diagram that is referred to for description of the vehicle according to the embodiment of the present disclosure and an antenna system mounted in the vehicle.

FIG. 4 is a block diagram that is referred to for description of the vehicle 500 according to the embodiment of the present disclosure and the antenna system mounted in the vehicle 500.

The vehicle 500 may be configured to include a communication apparatus 400 and a processor 570. The communication apparatus 400 may correspond to a telematics control unit of the vehicle 500.

The communication apparatus 400 is an apparatus for performing communication with an external device. The external device here may be another vehicle, a mobile terminal, or a server. In order to perform communication, the communication apparatus 400 may include a transmission antenna, a reception antenna, and any one of a radio frequency (RF) circuit and an RF element in which various communication protocols are possibly implemented. The communication apparatus 400 may include a short-distance communication unit 410, a location information unit 420, a V2X communication unit 430, an optical communication unit 440, a 4G wireless communication module 450, and a 5G wireless communication module 460.

The communication apparatus 400 may include a processor 470. According to the embodiment of the present disclosure, the communication apparatus 400 may further include a constituent element other than the constituent elements described, or may not include one or several of the constituent elements described.

The 4G wireless communication module 450 and the 5G wireless communication module 460 perform communication with one or more communication systems through one or more antenna modules. The 4G wireless communication module 450 may transmit and/receive a signal to and from an apparatus, belonging to a first communication system, through a first antenna module. In addition, the 5G wireless communication module 460 may transmit/receive a signal to and from an apparatus, belonging to a second communication system, through a second antenna module. The 4G wireless communication module 450 and the 5G wireless communication module 460 may be physically realized as a single integrated communication module. The first communication system and second communication system here may be an LTE communication system and a 5G the communication system, respectively. However, the first communication system and the second communication system are not limited thereto and are expandable to correspond to arbitrary different communication systems, respectively.

A processor of an apparatus inside the vehicle 500 may be realized as a micro control unit (MCU) or a modem. The processor 470 of the communication apparatus 400 may correspond to a modem. The processor 470 may be realized as an integrated modem. The processor 470 may acquire surrounding information from a nearby vehicle, a nearby entity, or a nearby infrastructure through wireless communication. The processor 470 may perform vehicle control using the acquired surrounding information.

The processor 570 of the vehicle 500 may be a processor of a car area network (CAN) or advanced driving assistance system (ADAS), but is not limited thereto. When the vehicle 500 employs a distribution control technique, the processor 570 of the vehicle 500 may be replaced with a processor of each apparatus.

The antenna module disposed inside the vehicle 500 may be configured to include a wireless communication unit. The 4G wireless communication module 450 may transmit and receive a 4G signal to and from a 4G base station through a 4G mobile communication network. At this point, the 4G wireless communication module 450 may transmit one or more 4G transmission signals to the 4G base station. In addition, the 4G wireless communication module 450 may receive one or more 4G reception signals from the 4G base station. In this regard, Uplink (UL) Multi-Input Multi-Output (MIMO) may be performed with a plurality of 4G transmission signals that are transmitted to the 4G base station. In addition, Downlink (DL) Multi-Input Multi-Output (MIMO) may be performed with a plurality of 4G reception signals that are received from the 4G base station.

The 5G wireless communication module 460 may transmit and receive a 5G signal to and from a 5G base station through a 5G mobile communication network. At this point, the 4G base station and the 5G base station may use a Non-Standalone (NSA) architecture. For example, the 4G base station and the 5G base station may be built in such a manner as to employ the Non-Standalone (NSA) architecture. Alternatively, the 5G base station may be built at a different location than the 4G base station in such a manner as to employ the Non-Standalone (NSA) architecture. The 5G wireless communication module 460 may transmit and receive the 5G signal to and from the 5G base station through the 5G mobile communication network. At this point, the 5G wireless communication module 460 may transmit one or more 5G transmission signals to the 5G base station. In addition, the 5G wireless communication module 460 may receive one or more 5G reception signals from the 5G base station. In the case, a 5G frequency band that is the same as a 4G frequency band may be used, and this may be referred to as LTE re-farming. A Sub-6 band that is a band of 6 GHz or lower may be used as the 5G frequency band. In contrast, in order to perform broadband high-speed communication, a mmWave band may be used as the 5G frequency band. In a case where the mmWave band is used, an electronic apparatus may perform beamforming for coverage expansion of an area where communication with a base station is possible.

Regardless of the 5G frequency band, the 5G communication system may support a larger number of Multi-Input Multi-Output (MIMO) processes to improve a transmission speed. In this regard, Uplink (UL) Multi-Input Multi-Output (MIMO) may be performed with a plurality of 5G transmission signals that are transmitted to the 5G base station. In addition, Downlink (DL) Multi-Input Multi-Output (MIMO) may be performed with a plurality of 5G receptions signals that are received from the 5G base station.

The 4G base station and the 45 base station may enter a dual connectivity (DC) state through the 4G wireless communication module 450 and the 5G wireless communication module 460. This double connectivity between the 4G base station and the 5G base station may be referred to as EUTRAN NR DC (EN-DC). When the 4G base station and the 5G base station have a co-located structure, an improvement in throughput is possible through inter-carrier aggregation (inter-CA). Therefore, when the 4G base station and the 5G base station are in an EN-DC state, the 4G reception signal and the 5G reception signal may be received at the same time through the 4G wireless communication module 450 and the 5G wireless communication module 460. Short-distance communication may be performed between electronic apparatuses (for example, vehicles) using the 4G wireless communication module 450 and the 5G wireless communication module 460. According to the embodiment of the present disclosure, wireless communication may be performed between vehicles using a V2V scheme after a resource is allocated, without involvement of the base station.

For transmission speed improvement and communication system convergence, carrier aggregation (CA) may be performed using at least one of the 4G wireless communication module 450 and the 5G wireless communication module 460, and a Wi-Fi communication module 113. In this regard, 4G+WiFi carrier aggregation (CA) may be performed using the 4G wireless communication module 450 and the Wi-Fi communication module 113. Alternatively, 5G+WiFi carrier aggregation (CA) may be performed using the 5G wireless communication module 460 and the Wi-Fi communication module 113.

The communication apparatus 400, along with a user interface device, may realize a vehicle display device. In this case, the vehicle display device may be referred to as a telematics device or an audio video navigation (AVN) device.

A broadband transparent antenna structure according to the present disclosure that is capable of being disposed on the glass pane of the vehicle 500 may be realized as a single dielectric substrate that lies on the same plane as a CPW electricity supply unit. The broadband transparent antenna structure according to the present disclosure that is capable of being disposed on the glass pane of the vehicle 500 may be realized as a structure in which a ground is formed on both sides of a radiator and may form a broadband structure.

Figure 5A:
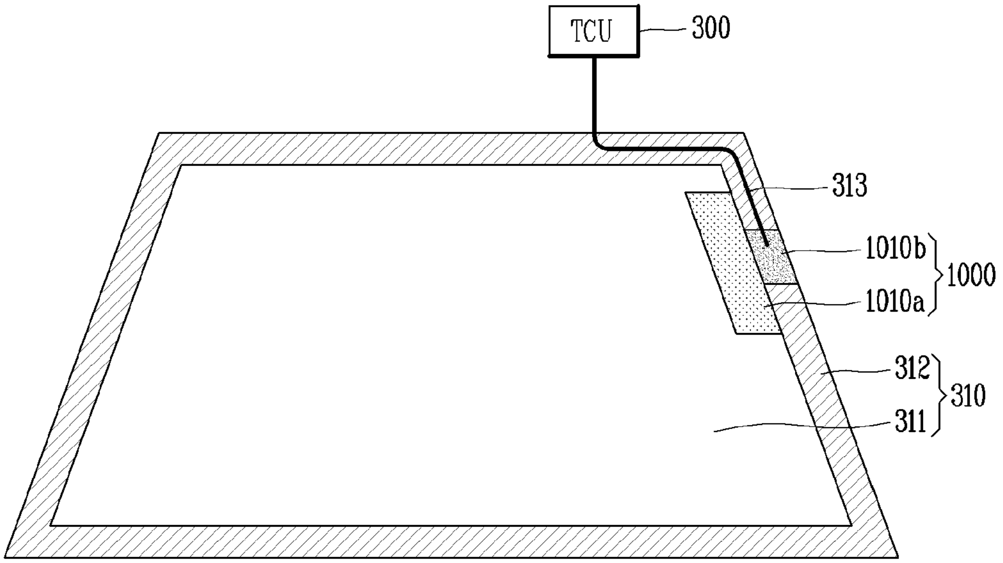
FIGS. 5A to 5C are views each illustrating a configuration in which the antenna assembly according to the present disclosure is disposed on the glass pane of the vehicle.

The antenna assembly associated with the broadband transparent antenna structure according to the present disclosure will be described below. In this regard, FIGS. 5A to 5C each illustrate a configuration in which the antenna assembly according to the present disclosure is disposed on the glass pane of the vehicle 500. Referring to FIG. 5A, the antenna assembly 1000 may include a first dielectric substrate 1010*a* and a second dielectric substrate 1010*b*. The first dielectric substrate 1010*a* may be realized as a transparent substrate and thus may be referred to as a transparent substrate 1010*a*. The second dielectric substrate 1010*b* may be realized as an opaque substrate 1010*b*.

A glass panel 310 may be configured to include a transparent region 311 and an opaque region 312. The opaque region 312 of the glass panel 310 may be a frit layer formed of a frit layer. The opaque region 312 may be formed in such a manner as to surround the transparent region 311. The opaque region 312 may be formed on an edge portion of the transparent region 311. The opaque region 312 may form a boundary portion of the glass panel 310.

A signal pattern formed on a dielectric substrate 1010 may be connected to the telematics control unit (TCU) 300 through a connector component 313, such as a coaxial cable. The telematics control unit (TCU) 300 may be disposed inside the vehicle 500, but is not limited thereto. The telematics control unit (TCU) 300 may be disposed in a dashboard inside the vehicle 500 or in a ceiling region inside the vehicle 500, but is not limited thereto.

Figure 5B:
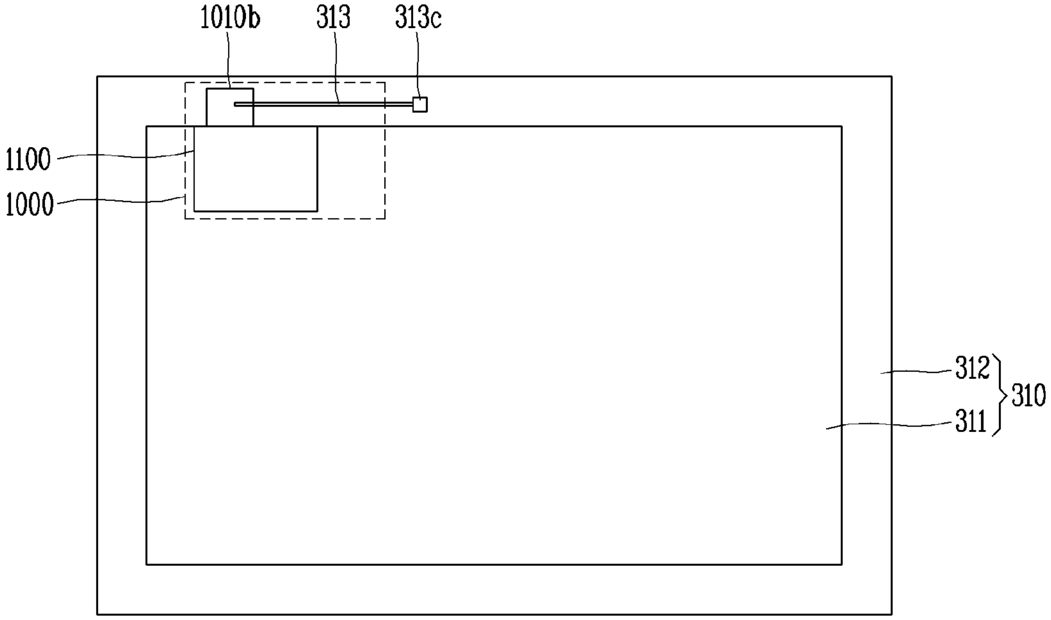
Figure 5C:
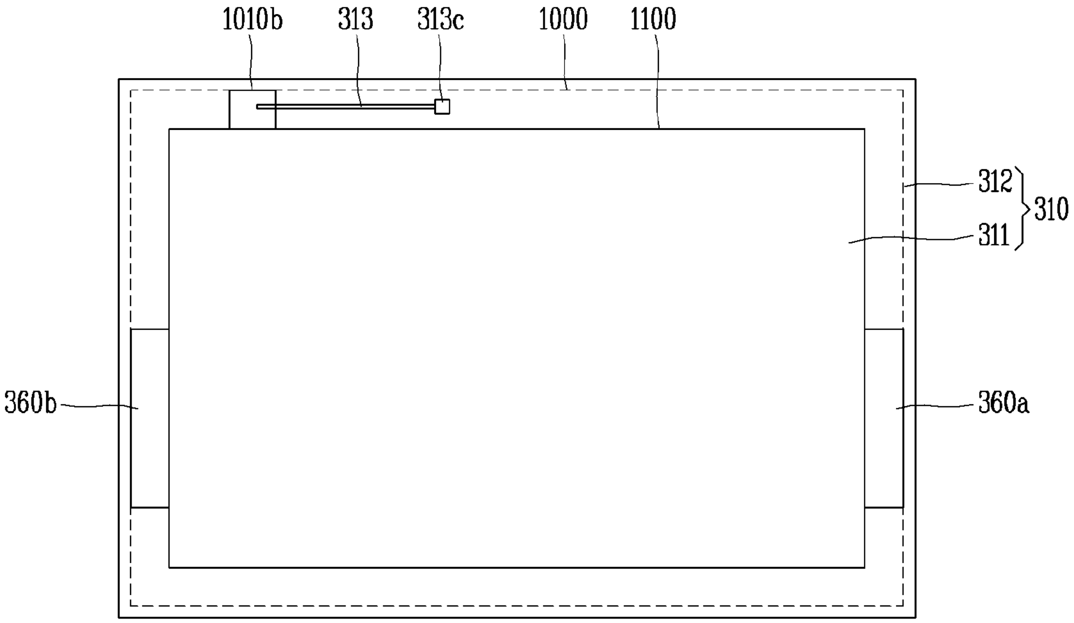

FIG. 5B illustrates a configuration in which the antenna assembly 1000 is disposed on one region of the glass panel 310. FIG. 5C illustrates in a configuration in which the antenna assembly 1000 is disposed on the entire glass panel 310.

Referring to FIGS. 5B to 5C, the glass panel 310 may include the transparent region 311 and the opaque region 312. The opaque region 312 is a non-visible region having a predetermined degree of transparency or lower, and may be referred to as a black printing (BP) region or a black matrix (BM) region. The opaque region 312 corresponding to the opaque region 312 may be formed in such a manner as to surround the transparent region 311. The opaque region 312 may be formed on an edge portion of the opaque region 311. The opaque region 312 may form the boundary portion of the glass panel 310. The second dielectric substrate 1010*b* corresponding to an electricity supply substrate, or heating wire pads 360*a* and 360*b* may be disposed on the opaque region 312. The second dielectric substrate 1010*b* disposed on the opaque region 312 may be referred to as an opaque substrate. As illustrated in FIG. 5C, in a case where the antenna assembly 1000 is disposed on the entire glass panel 310, the heating wire pads 360*a* and 360*b* may also be disposed on the opaque region 312.

Referring to FIG. 5B, the antenna assembly 1000 may include the first transparent dielectric substrate 1010*a* and the second dielectric substrate 1010*b*. Referring to FIG. 5B to 5C, the antenna assembly 1000 may include the antenna module 1100 and the second dielectric substrate 1010*b* that are each formed of the conductive patterns. The antenna module 1100 may be formed as a transparent electrode portion and thus may be realized as a transparent antenna module. The antenna module 1100 may be realized as one or more antenna elements. The antenna module 1100 may include a MIMO antenna and/or other antenna elements for wireless communication. Other antenna elements may include at least one of GNSS, radio, broadcasting, WiFi, satellite communication, UWB, and remote Keyless entry (RKE) antennas for vehicle application.

Referring to FIGS. 5A to 5C, the antenna assembly 1000 may interface with the telematics control unit (TCU) 300 through the connector component 313. A connector 313*c* of the connector component 313 may be formed on an end portion of a cable and may be electrically connected to the TCU 300. The signal pattern formed on the second dielectric substrate 1010*b* of the antenna assembly 1000 may be connected to the TCU 300 through the connector component 313, such as the coaxial cable. The antenna module 1100 may be electrically connected to the TCU 300 through the connector component 313. The TCU 300 may be disposed inside the vehicle 500, but is not limited thereto. The TCU 300 may be disposed in the dashboard inside the vehicle 500 or in the ceiling region inside the vehicle 500, but is not limited thereto.

When a transparent antenna assembly according to the present disclosure is attached to the inside or surface of the glass panel 310, the transparent electrode portion including an antenna pattern and a dummy pattern may be disposed on the transparent region 311. In contrast, the opaque substrate may be disposed on the opaque region 312.

A broadband transparent antenna structure according to the present disclosure that may be disposed on the glass pane of the vehicle 500 may be realized as a single dielectric substrate that lies on the same plane as a CPW electricity supply unit. The broadband transparent antenna structure according to the present disclosure that is capable of being disposed on the glass pane of the vehicle 500 may be realized as a structure in which a ground is formed on both sides of a radiator and may form a broadband structure.

Figure 6A:
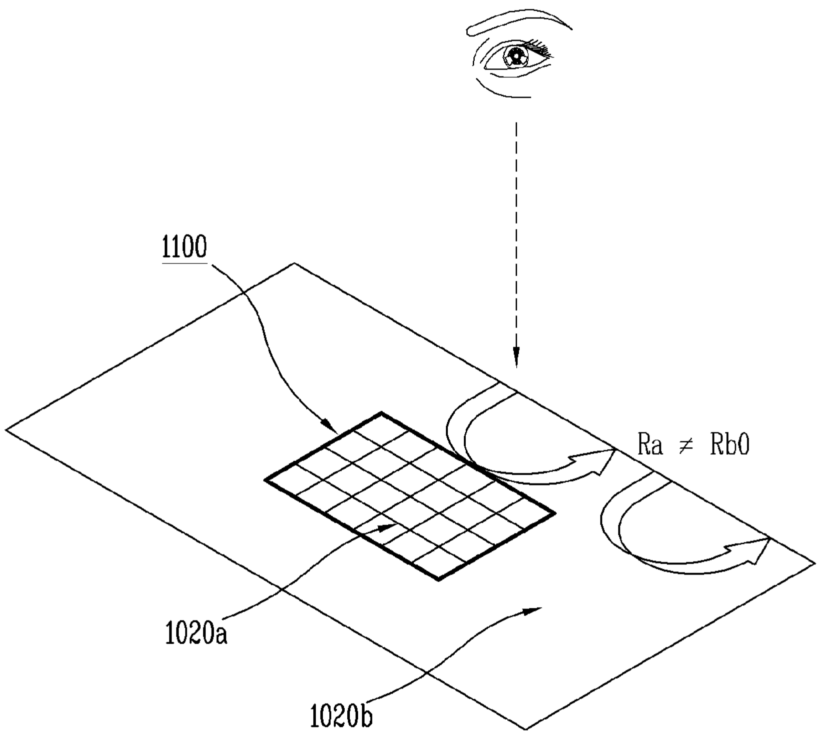
FIGS. 6A and 6B are views each illustrating a configuration in which a metal mesh structure according to the present disclosure is disposed on a dielectric substrate.
Figure 6B:
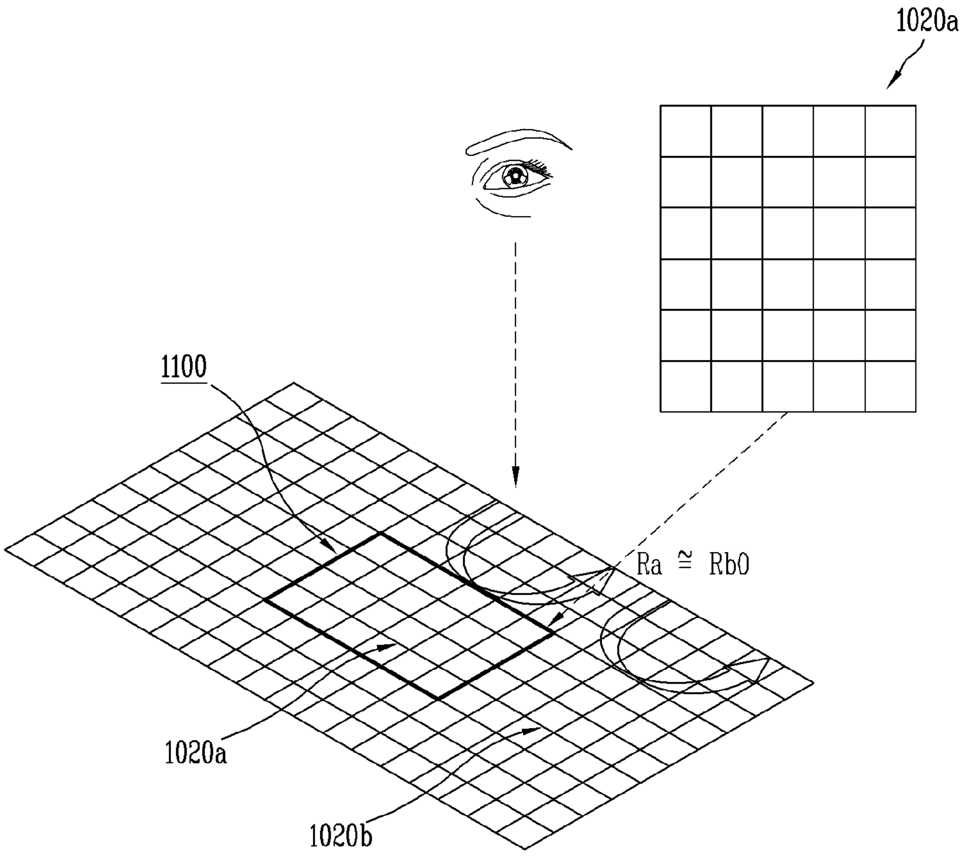
Figure 6B:
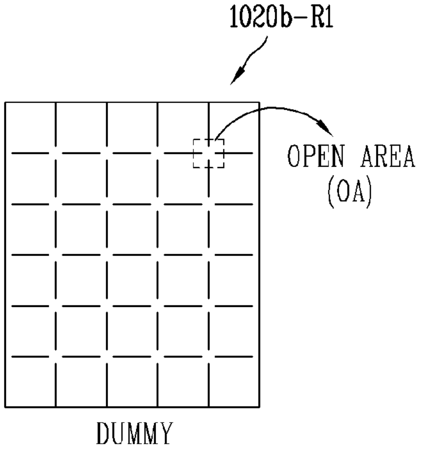
Figure 6B:
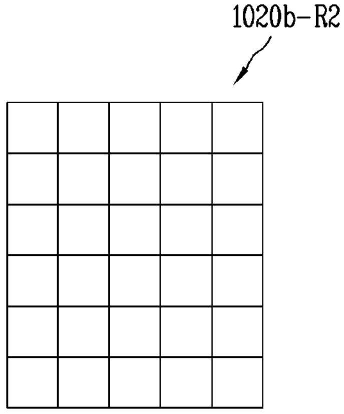

The antenna assembly associated with the broadband transparent antenna structure according to the present disclosure will be described below. In this regard, FIGS. 6A and 6B illustrate a configuration in which a metal mesh structure according to the present disclosure is disposed on the dielectric substrate. Specifically, FIG. 6A illustrates a structure in which the antenna module 1100 is disposed on the dielectric substrate 1010. The antenna module 1100 forms a metal mesh radiator region 1020*a*. Accordingly, the dielectric substrate 1010 may be configured with a metal mesh radiator region 1020*a* and a non-metal region 1020*b*0 in the vicinity thereof. A difference between reflectivity Ra of the metal mesh radiator region 1020*a* and reflectivity Ra0 of the non-metal region 1020*b*0 makes it to distinguish the metal mesh radiator region 1020*a* and the non-metal region 1020*b*0 with the naked eye. Non-visibility of the transparent antenna is required to be enhanced in such a manner that the metal mesh radiator region 1020*a* and the non-metal region 1020*b*0 are not distinguished.

FIG. 6B illustrates a structure in which the antenna module 1100 and the dummy pattern are disposed on the dielectric substrate 1010. Referring to FIG. 6B(a), the antenna module 1100 forms the metal mesh radiator region 1020*a*, and the dummy pattern forms a dummy metal mesh region 1020*b*. The metal mesh radiator region 1020*a* may be formed in such a manner as to have a structure in which metal lines are connected to each other. The metal mesh radiator region 1020*a* and the dummy metal mesh region 1020*b* may be formed in such a manner that the difference between reflectivity Rb of the metal mesh radiator region 1020*a* and reflectivity Rb of the dummy metal mesh region 1020*b* has a value that is equal to or lower than a threshold. Accordingly, the metal mesh radiator region 1020*a* and the dummy metal mesh region 1020*b* are made not to be distinguished with the naked eye.

Referring to FIGS. 6B(a) and 6B(b), the dummy metal mesh region 1020*b* may be formed in such a manner as to have a structure in which the metal lines are disconnected, that is, an open dummy structure 1020*b*-R1. In the open dummy structure 1020*b*-R1, an open area OA may be formed on a per-mesh grid basis or on the basis of each of the uniform mesh grids. Referring to FIGS. 6B(a) and 6B(c), the dummy metal mesh region 1020*b* may be formed in such a manner as to have a structure in which the metal lines are connected to each other, that is, a closed dummy structure 1020*b*-R2.

Surface resistivity in the open dummy structure 1020*b*-R1 is increased more than in the closed dummy structure 1020*b*-R2. Thus, antenna performance can be degraded in the open dummy structure 1020*b*-R1. The surface resistivity in the closed dummy structure 1020*b*-R2 is decreased more than in the open dummy structure 1020*b*-R1. Thus, the antenna performance can be improved in the closed dummy structure 1020*b*-R2. The open dummy structure 1020*b*-R1 may be formed in such a manner as to have higher transmissivity than the closed dummy structure 1020*b*-R2. In this regard, an open-area OA ratio of the open dummy structure 1020*b*-R1 may be kept at or below a threshold. Accordingly, the difference between the transmissivity of the closed dummy structure 1020*b*-R2 and the transmissivity of the open dummy structure 1020*b*-R1 may be kept at or below a predetermined level. In addition, the open dummy structure 1020*b*-R1 may increase the surface resistance and thus may minimize degradation in an antenna performance.

Figure 7A:
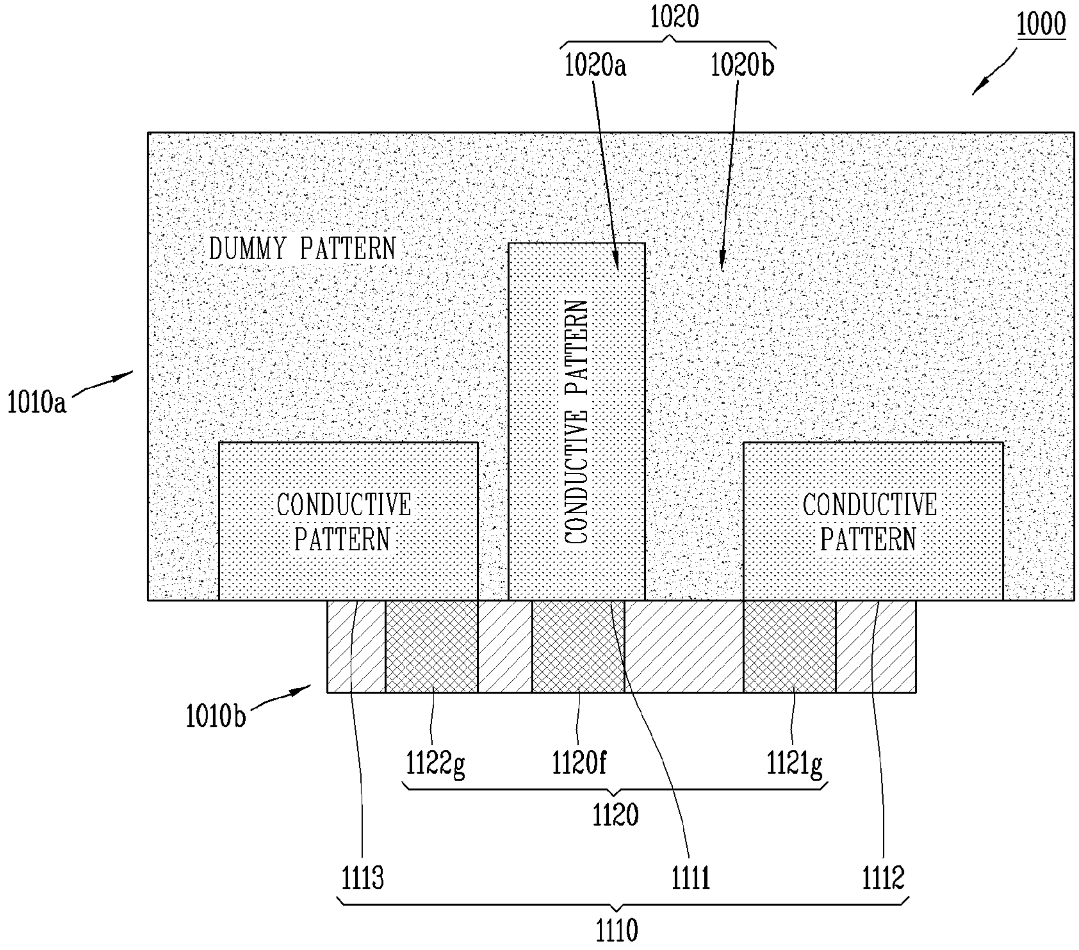
FIGS. 7A(a) and 7A(b) are a front view and a cross-sectional view, respectively, of a transparent antenna assembly according to the present disclosure.
Figure 7A:
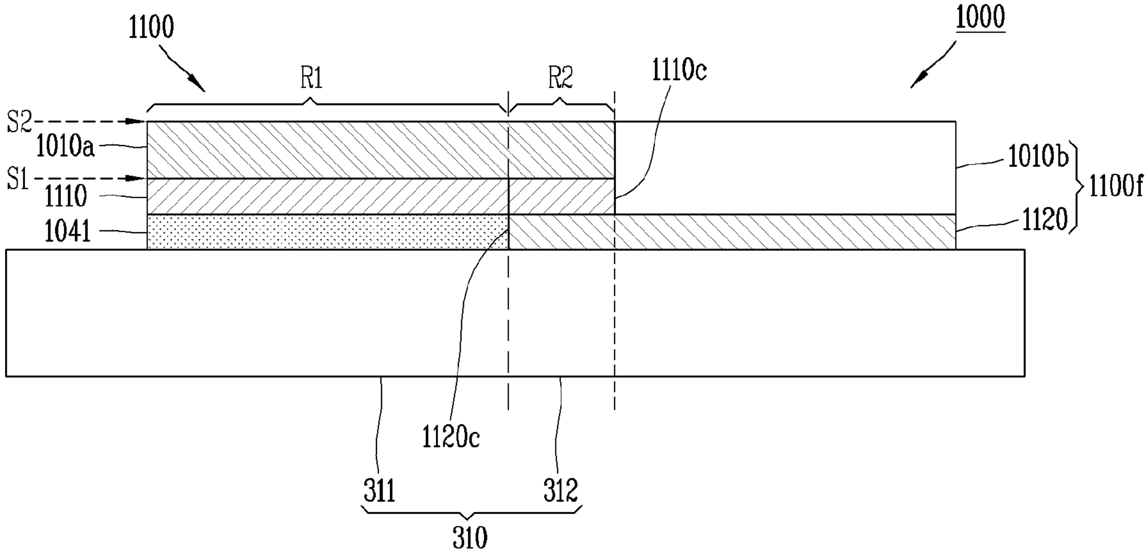
Figure 7B:
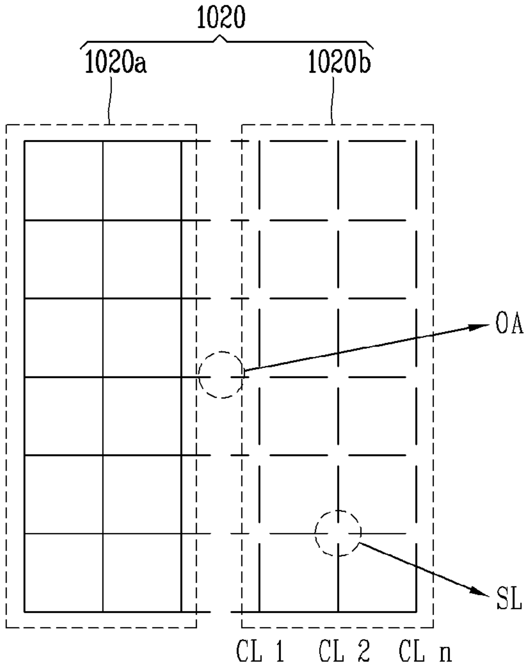
FIGS. 7B(a) and 7B(b) are views illustrating grid structures, respectively, of a metal mesh radiator region and a dummy metal mesh region in embodiments of the present disclosure.
Figure 7B:
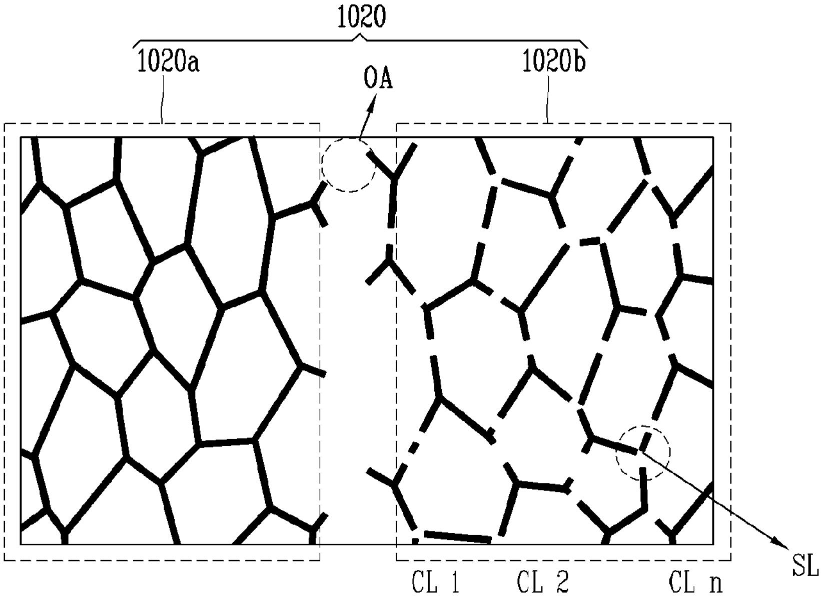

FIGS. 7A(a) and 7A(b) are a front view and a cross-sectional view, respectively, of a transparent antenna assembly according to the present disclosure. FIGS. 7B(a) and 7B(b) are views illustrating grid structures, respectively, of a metal mesh radiator region and a dummy metal mesh region in embodiments of the present disclosure.

FIG. 7A(a) is a front view of the antenna assembly 1000 associated with a transparent antenna structure. Referring to FIG. 7A(a), the antenna assembly 1000 may be configured to include a first transparent dielectric substrate 1010*a* and the second dielectric substrate 1010*b*. The first transparent dielectric substrate 1010*a* and the second dielectric substrate

1010*b* may be referred to as a transparent substrate 1010*a* and an opaque substrate 1010*b*, respectively.

Conductive patterns 1110 that operate as a radiator may be disposed on one surface of the transparent substrate 1010*a*. An electricity supply pattern 1120*f* and ground patterns and 1121*g* and 1122*g* may be formed on one surface of the opaque substrate 1010*b*. The conductive patterns 1110 that operate as the radiator may include two or more conductive patterns. The conductive patterns 1110 may include a first pattern 1111 that is connected to the electricity supply pattern 1120*f* and a second pattern 1112 that is connected to the ground pattern 1121*g*. The conductive patterns 1110 may further include a third pattern 1113 that is connected to the ground pattern 1122*g*. The conductive patterns 1110 that operate as the radiator may also be referred to as a radiation conductive portion 1110.

FIG. 7A(b) is a cross-sectional view of the antenna assembly 1000 and illustrates a layered structure of the antenna assembly 1000. Referring to FIG. 7A(b), the antenna module 1100 may be disposed on the transparent region 311 of the glass panel 310. A first region R1 of the antenna module 1100 may be disposed on the transparent region 311. A second region R2 of the antenna module 1100 may be disposed on the opaque region 312. An electricity supply structure 1100*f* may be disposed on the opaque region 312 of the glass panel 310.

The antenna module 1100 may include the transparent substrate 1010*a*, a first conductive pattern 1110, and an adhesion layer 1041. The electricity supply structure 1100*f* may include the opaque substrate 1010*b* and a second conductive pattern 1120. The first conductive pattern 1110 of the antenna module 1100 may be connected to the second conductive pattern 1120 of the electricity supply structure 1100*f*. A first connection pattern 1110*c* that is an end portion of the first conductive pattern 1110 may be connected to a second connection pattern 1120*c* of the second conductive pattern 1120.

The conductive patterns 1110 that constitute the antenna module 1100 may be realized as the transparent antenna. Referring to FIGS. 7A and 7B, the conductive patterns 1110 may be formed as metal grid patterns 1020*a* having a specific line-width or narrower and may form the metal mesh radiator region. Dummy metal grid patterns 1020*b* may be formed on an inner region or an outer region between each of the first to third patterns 1111, 1112, and 1113), among the conductive patterns 1110, in order to keep a degree of transparency uniform. The metal grid patterns 1020*a* and the dummy metal grid patterns 1020*b* may form a metal mesh layer 1020. The metal grid patterns 1020*a* may form a radiator region and thus may be referred to as the metal mesh radiator region 1020*a*. The dummy metal grid patterns 1020*b* may form a dummy region instead of the radiator region and thus may be referred to as the dummy metal mesh region 1020*b*.

FIG. 7B(a) illustrates a structure of the typical metal grid patterns 1020*a* and a structure of the dummy metal grid patterns 1020*b*. FIG. 7B(b) illustrates a structure of the atypical metal grid patterns 1020*a* and a structure of the dummy metal grid patterns 1020*b*. As illustrated in FIG. 7B(a), the metal mesh layer 1020 may be formed in such a manner as to have the transparent antenna structure that results from a plurality of metal mesh grids. The metal mesh layer 1020 may be formed in a typical metal mesh shape, such as a rectangular shape, a diamond shape, or a polygonal shape. The plurality of metal mesh grids may constitute a conductive pattern in such a manner as to operate as an electricity line and a radiator. The metal mesh layer 1020 constitutes the transparent antenna. As an example, the metal mesh layer 1020 may be realized in such a manner as to have a thickness of approximately 2 mm, but is not limited thereto.

The metal mesh layer 1020 may be configured to include the metal grid patterns 1020*a* and the dummy metal grid patterns 1020*b*. The metal grid patterns 1020*a* and the dummy metal grid patterns 1020*b* may form an opening area OA whose end portion is disconnected, and thus may be configured in such a manner as not to be electrically connected. Slits SL may be formed in the dummy metal grid patterns 1020*b* in such a manner that end portions of mesh grids CL1, CL2, and so forth up to GLn are not connected.

Referring to FIG. 7B(b), the metal mesh layer 1020 may be formed with a plurality of atypical metal mesh grids. The metal mesh layer 1020 may be configured to include the metal grid patterns 1020*a* and the dummy metal grid patterns 1020*b*. The metal grid patterns 1020*a* and the dummy metal grid patterns 1020*b* may be configured in such a manner as not to be electrically connected, by forming the open area OA whose end portion is disconnected. The slits SL may be formed in the dummy metal grid patterns 1020*b* in such a manner that the end portions of mesh grids CL1, CL2, and so forth up to GLn are not connected.

Figure 8A:
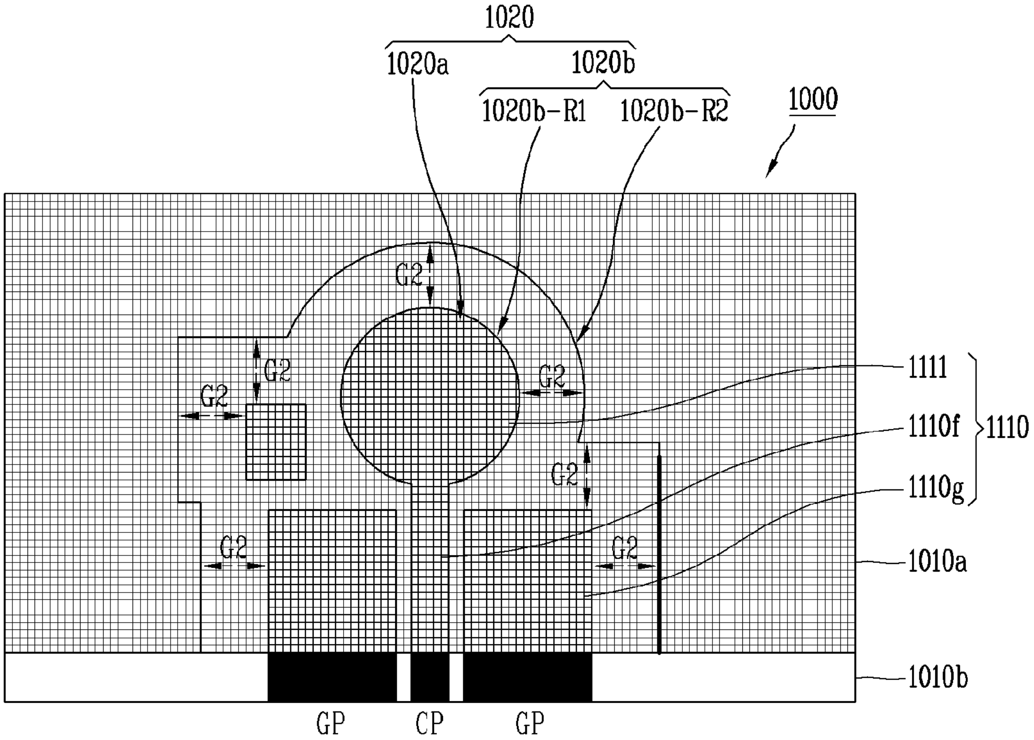
FIG. 8A is a view illustrating the antenna assembly according to the present disclosure that is configured with an antenna pattern portion and a dummy pattern portion.

FIG. 8A illustrates the antenna assembly according to the present disclosure that is configured with an antenna pattern portion and a dummy pattern portion. Referring to FIG. 8A, the antenna assembly may be configured with a radiator region, a dummy region, and an electricity supply region. FIG. 8B is an enlarged view of respective boundary portions of the antenna pattern portion and the dummy pattern portion in FIG. 8A. FIG. 9 illustrate a layered structure of the antenna assembly in the embodiments of the present disclosure.

FIGS. 9 (*a*) and (*b*) are views illustrating layered structures, respectively, of the antenna assembly in the embodiments of the present disclosure. FIG. 9 (*a*) illustrates the antenna assembly that results from disposing the first conductive pattern 1110 on top of the transparent substrate 1010*a*. Referring to FIG. 9 (*a*), the antenna module 1100 may be configured to include a protective layer 1030, the transparent substrate 1010*a*, the first conductive pattern 1110, and the adhesion layer 1041. The electricity supply structure 1100*f* may be configured to include the opaque substrate 1010*b*, the second conductive pattern 1120, and an adhesion layer 1042. Referring to FIG. 9 (*b*), the antenna module 1100 may be configured to include the transparent substrate 1010*a*, the first conductive pattern 1110, and the adhesion layer 1041. The electricity supply structure 1100*f* may be configured to include the second conductive pattern 1120, the opaque substrate 1010*b*, and the adhesion layer 1042.

Referring to FIGS. 9 (*a*) and 9 (*b*), the transparent substrate 1010*a* may include a first surface S1 and a second surface S2. The first surface S1 and the second surface S2 may be disposed on opposite surfaces, respectively. The first surface S1 and the second surface S2 may be formed in such a manner as to face the glass panel 310 and the inner side of the vehicle 500, respectively. The opaque substrate 1010*b* may include a third surface S3 and a fourth surface S4. The third surface S3 and the fourth surface S4 may be disposed on opposite surfaces, respectively. The third surface S3 and the fourth surface S4 may be formed in such a manner as to face the glass panel 310 and the inner side of the vehicle 500, respectively.

The antenna module 1100 may be disposed on the transparent region 311 of the glass panel 310, and the electricity supply structure 1100*f* may be disposed on the opaque region 312 of the glass panel 310. A frit pattern 312*f* may be formed on the opaque region 312 of the glass panel 310. The first conductive pattern 1110 of the antenna module 1100 may be connected to the second conductive pattern 1120 of the electricity supply structure 1100*f*. The first connection pattern 1110*c* that is an end portion of the first conductive pattern 1110 may be connected to the second connection pattern 1120*c* that is an end portion of the second conductive pattern 1120.

Referring to FIG. 9 (*a*), the first conductive pattern 1110 may be formed on the second surface S2 that is a front surface of the transparent substrate 1010*a*. The second conductive pattern 1120 may be formed on the third surface S3 that is a rear surface of the opaque substrate 1010*b*. Referring to FIG. 9 (*b*), the first conductive pattern 1110 may be formed on the first surface S1 that is the rear surface of the opaque substrate 1010*b*. The second conductive pattern 1120 may be formed on the fourth surface S4 that is a front surface of the opaque substrate 1010*b*.

Figure 8A:
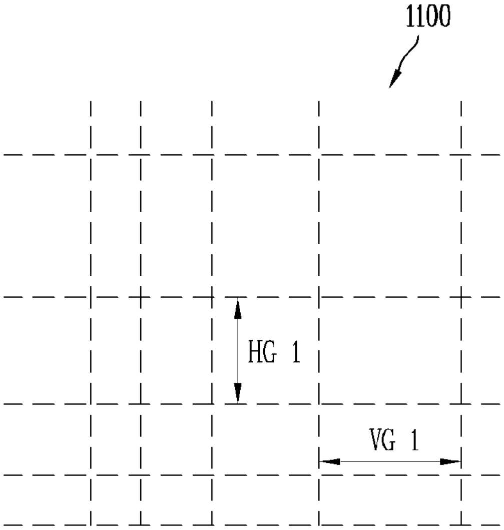
Figure 8B:
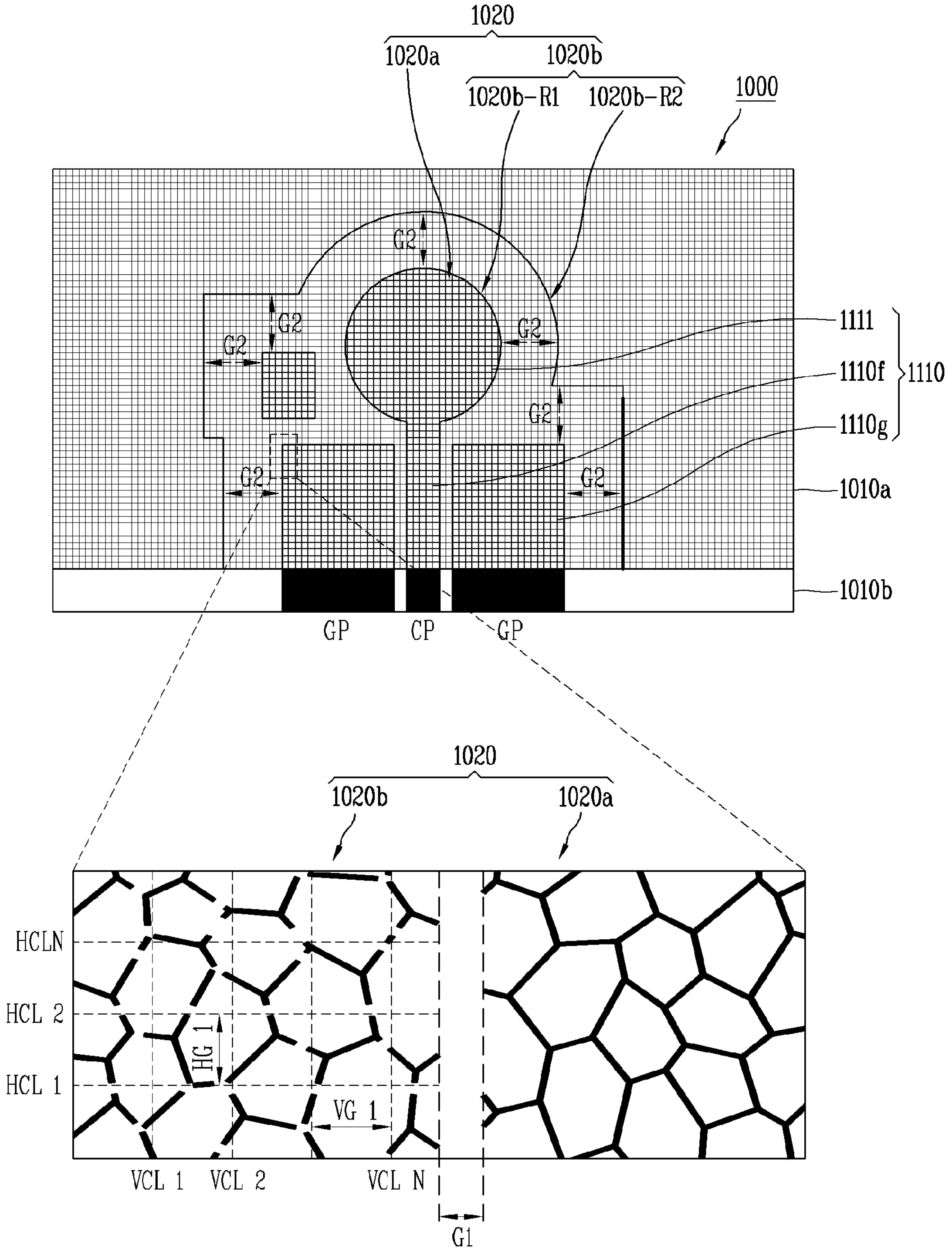
FIG. 8B is an enlarged view of respective boundary portions of the antenna pattern portion and the dummy pattern portion in FIG. 8A.
Figure 9:
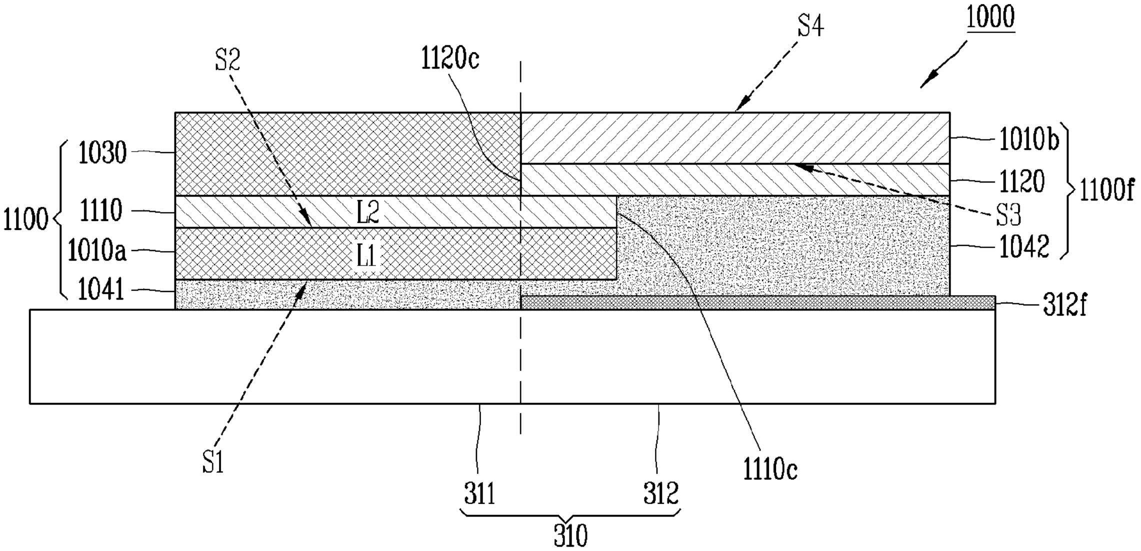
FIGS. 9 (*a*) and (*b*) are views illustrating layered structures, respectively, of the antenna assembly in the embodiments of the present disclosure.
Figure 9:
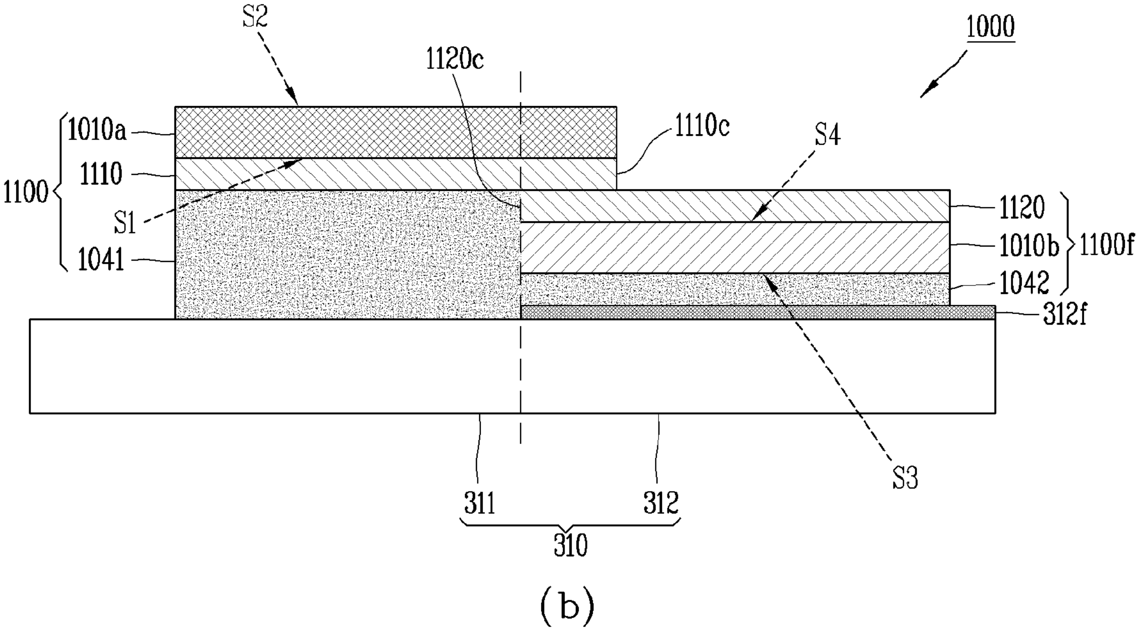

Referring to FIGS. 8A to 9, the antenna assembly 1000 may be configured to include the transparent substrate 1010*a* and the opaque substrate 1010*b*. In order to keep uniform the visibility of an edge region other than an antenna region of the transparent substrate 1010*a*, coating is also performed on all surfaces of the metal mesh structure in such a manner as to form a metal mesh grid structure on all regions of the transparent substrate 1010*a*. In this regard, as illustrated in FIGS. 8A and 8B, the transparent substrate 1010*a* may be formed in such a manner as to have a proportionally larger size than the radiation conductive portion 1110.

The radiation conductive portion 1110 may be configured to include an antenna pattern 1111, an electricity supply pattern 1110*f*, and a ground pattern 1120*g*. The electricity supply pattern 1110*f* may be formed in such a manner as to have a predetermined width and length so that the electricity supply pattern 1110*f* is connected to the antenna pattern 1111 and thus transmits a signal to the antenna pattern 1111. The ground pattern 1120*g* may be disposed to both sides of the electricity supply pattern 1110*f* in a manner that is spaced away from the electricity supply pattern 1110*f*. Conductive patterns, inside which the space is filled with metal, may be formed on the opaque substrate 1010*b*. A connector portion CP that transmits a signal to the electricity supply pattern 1110*f* may be formed on the opaque substrate 1010*b*. Ground portions GP may be formed to both sides, respectively, of the connector portion CP so that they are spaced away from a boundary of the connector portion CP. The electricity supply pattern 1110*f* and the ground pattern 1120*g* that are formed on the transparent substrate 1010*a* may form a CPW electricity supply structure. In addition, the connector portion CP and the ground portion GP, which are formed on the opaque substrate 1010*b*, may also form the CPW electricity supply structure.

Referring to FIGS. 8A to 9, the antenna assembly 1000 according to the present disclosure will be described below. The antenna assembly 1000 may be configured to include the first transparent dielectric substrate 1010*a* and the radiation conductive portion 1110. The radiation conductive portion 1110 is configured with a plurality of conductive patterns and thus constitutes one antenna element. Therefore, the radiation conductive portion 1110 may be referred to as a conductive pattern (conductive patterns), an antenna element, an antenna pattern (antenna patterns), or a radiation pattern (radiation patterns). The radiation conductive portion 1110 may be formed in a metal mesh shape on one surface of the transparent substrate 1010*a* in such a manner as to radiate a wireless signal.

The antenna module 1100 of the antenna assembly 1000 may be configured to include a first layer L1 and a second layer L2. The first layer L1 may be realized as a dielectric substrate formed of a transparent dielectric material. The second layer L2 may be formed in the metal mesh shape on one surface of the dielectric substrate. Referring to FIGS. 9 (*a*) and 9(*b*), the first layer L1 may be referred to as the dielectric substrate 1010, and the second layer L2 may also be referred to as the metal mesh layer 1020. In addition, the first layer L1 may be referred to as a dielectric region 1010, and the second layer L2 may also be referred to as the metal mesh layer 1020. In this regard, a combination of the dielectric region 1010 and the metal mesh layer 1020 may also be referred to as a dielectric substrate 1050.

The second layer L2 may be configured to include the metal mesh radiator region 1020*a* and the dummy metal mesh region 1020*b*. The metal mesh radiator region 1020*a* and the dummy metal mesh region 1020*b* may be referred to as the metal mesh grid (or the radiator region or the antenna pattern) 1020*a* and the dummy mesh grid (or the dummy region or the dummy pattern) 1020*b*, respectively.

The metal mesh radiator region 1020*a* may be configured with metal lines that realize an atypical mesh shape with a specific line-width or smaller in such a manner as to transmit and receive a wireless signal therethrough, and an open area OA. Metal lines on the metal mesh radiator region 1020*a* may be realized in such a manner as to have a line-width of 10 μm or less, and the open area OA may be realized in only a boundary portion of the metal mesh radiator region 1020*a*. The dummy metal mesh region 1020*b* may be configured with metal lines that realize an atypical mesh shape that has a specific line-width or smaller, and the open area OA. Metal lines on the dummy metal mesh region 1020*b* may be realized in such a manner as to have a line-width of 10 μm or less, and the open area OA may be realized in only a boundary portion and an inner portion of the metal mesh radiator region 1020*a*.

The metal mesh radiator region 1020*a* may be formed in such a manner as to have first transmissivity. The dummy metal mesh region 1020*b* may be formed in such a manner as to have second transmissivity that is higher than the first transmissivity. The open area OA may be formed in the boundary portion of the dummy metal mesh region 1020*b*. Slits SL are formed in the inner portion of the dummy metal mesh region 1020*b*, and thus the dummy metal mesh region 1020*b* may be formed in such a manner as to have low transmissivity than the metal mesh radiator region 1020*a*.

As an example, the first transmissivity of the metal mesh radiator region 1020*a* may be set to 80% or more. The second transmissivity of the dummy metal mesh region 1020*b* may be set to 82% or more. As another example, the second transmissivity of the metal mesh radiator region 1020*a* may be set to 70% or more. The second transmissivity of the dummy metal mesh region 1020*b* may be set to 72% or more. The metal mesh radiator region 1020*a* and the dummy metal mesh region 1020*b* may be formed in such a manner that the first line-width of the metal mesh radiator region 1020*a* is greater than the second line-width of the dummy metal mesh region 1020*b*. Thus, the dummy metal mesh region 1020*b* may be made to have relatively low transmissivity.

The metal mesh radiator region 1020*a* may be formed in such a manner that sheet resistance thereof is set to 1 Ω (ohm)/sq or less. The metal mesh radiator region 1020*a* and the dummy metal mesh region 1020_b_ may be formed in such a manner that a difference between the first transmissivity of the metal mesh radiator region 1020_a_ and the second transmissivity of the dummy metal mesh region 1020_b_ is 2% or less.

The dummy metal mesh region 1020_b_ may be configured in such a manner as to be spaced a distance away from an outer portion of the metal mesh radiator region 1020_a_. The dummy metal mesh region 1020_b_ and the metal mesh radiator region 1020_a_ may be formed in such a manner that a boundary of one portion of the dummy metal mesh region 1020_b_ and a boundary of the metal mesh radiator region 1020_a_ are spaced a distance away from each other. The dummy metal mesh region 1020_b_ may be configured in such a manner as to be spaced a specific distance G1 away from an outer portion of the metal mesh radiator region 1020_a_. The dummy metal mesh region 1020_b_ and the metal mesh radiator region 1020_a_ may be formed in such a manner that they are spaced a different distance apart on the radiator region than on the electricity supply region.

The atypical mesh shape of the dummy metal mesh region 1020_b_ that overlaps virtual cut lines formed in both axial directions may form the slits SL. The virtual cut lines and a polygon that is made up of metal lines in the atypical mesh shape be formed in such a manner as to overlap in a line-width region corresponding to the inside of the polygon. The virtual cut lines may be formed on the dummy metal mesh region 1020_b_ in such a manner as to be equally spaced a distance HG1 in one axial direction and a distance VG1 in the other axial direction.

Metal mesh lines on the metal mesh radiator region 1020_a_ and the dummy metal mesh region 1020_b_ may form an atypical pattern. In contrast, the virtual cut lines may form a typical pattern. In this regard, the virtual cut lines may be formed using atypical pattern mask.

The virtual cut lines may be formed in the dummy metal mesh region 1020_b_ in such a manner as to be equally spaced the distance HG1 in a one axial direction. The virtual cut lines may be formed in the dummy metal mesh region 1020_b_ in such a manner as to be equally spaced the distance VG1 in the other axial direction that is perpendicular to one axial direction. As an example, the virtual cut lines may be formed in such a manner that a first distance HG1 that they are spaced in one axial direction is the same as a second distance VG1 that they are spaced in the other axial direction. As another example, the virtual cut lines may be formed in such a manner that the first distance HG1 that they are spaced in one axial direction is different from the second distance VG1 that they are spaced in the other axial direction.

The greater the distance G1 the dummy metal mesh region 1020_b_ and the metal mesh radiator region 1020_a_ are spaced, the more distinctively the antenna pattern and the dummy pattern may be distinguished. The dummy metal mesh region 1020_b_ and the metal mesh radiator region 1020_a_ may be formed in such a manner that the distance G1 therebetween is set to 100 μm or less. The dummy metal mesh region 1020_b_ and the metal mesh radiator region 1020_a_ may be formed in such a manner that the distance G1 therebetween is set to the distance HG1 or smaller in one axial direction and the distance VG1 in the other axial direction between the virtual cut lines. Thus, a difference may not occur in visibility between the dummy metal mesh region 1020_b_ and the metal mesh radiator region 1020_a_.

In summary, dummy patterns on the dummy metal mesh region 1020_b_ may be configured in such a manner as to be cut in vertical and horizontal directions. Coupling between the antenna pattern realized by the metal mesh radiator region 1020_a_ and the dummy pattern on the dummy metal mesh region 1020_b_ that is configured in such a manner as to be disconnected in the vertical and horizontal directions may be decreased more than second coupling between the antenna pattern and each of the dummy patterns that are connected to each other. The dummy patterns here that are connected to each other means that, like the antenna patterns, the metal mesh grids are configured in such a manner as to be connected to each other.

The dummy pattern on the dummy metal mesh region 1020_b_ may be configured in such a manner that a boundary thereof is spaced the specific distance G1, for example, a distance of 100 μm or 200 μm or less, away from boundaries of the metal lines on the metal mesh radiator region 1020_a_. The dummy pattern on the dummy metal mesh region 1020_b_ may be formed in such a manner as to be spaced the specific distance G1 away from the boundary portion of the metal mesh radiator region 1020_a_ that is formed as the antenna pattern 1111 in FIGS. 7A (a) to 7B(b). In the regard, the specific distance G1 may be set to 200 μm or less. A threshold of the specific distance G1 may be set to 100 μm less.

The first distance HG1 and the second distance VG1 in the horizontal and vertical directions, respectively, of the virtual cut lines may be set to the specific distance G1 or greater. In this regard, in the dummy metal mesh region 1020_b_, vertical virtual cut lines and horizontal virtual cut lines may be disposed to be spaced the first distance HG1 apart in the horizontal distance and the second distance VG1 apart in the vertical distance. The first distance HG1 and the second distance VG1 may be set to the specific distance G1 or greater between a boundary of the dummy metal mesh region 1020_b_ and the boundary of the metal mesh radiator region 1020_a_.

Referring FIGS. 7A to 9, the dummy pattern on the dummy metal mesh region 1020_b_ may be divided into two regions, that is, a first region 1020_b_-R1 and a second region 1020_b_-R2. A boundary therebetween may be determined by an electrical distance from the radiation conductive portion 1110. It is possible that the dummy metal mesh region 1020_b_ is configured with a mesh (the first region 1020_b_-R1) that is disconnected by the virtual cut line, and a mesh (the second region 1020_b_-R2) that is not disconnected by a cut line. A distance G2 from the first region 1020_b_-R1 may be set to a specific distance or greater. As an example, the distance G2 from the first region 1020_b_-R1 may be set to a 0.5 or more wavelength of an uppermost frequency in an operating frequency band.

The dummy metal mesh region 1020_b_ may include the first region 1020_b_-R1) that is spaced a predetermined distance or smaller away from the metal mesh radiator region 1020_a_, and the second region 1020_b_-R2 that is spaced a predetermined distance or smaller away from the first region 1020_b_-R1. The first region 1020_b_-R1 of the dummy metal mesh region that is spaced a predetermined distance or smaller away from the boundary of the metal mesh radiator region 1020_a_ may form an open dummy region having an open area where the atypical mesh shape is disconnected. In contrast, the second region 1020_b_-R2 of the dummy metal mesh region that is spaced a predetermined space or greater away from the boundary of the metal mesh radiator region 1020_a_ may form a closed dummy region where the atypical mesh shapes are connected to each other.

In this regard, the atypical mesh shape that overlaps virtual cut lines formed in both axial directions may form the slits SL in the open dummy region. In contrast, similarly to the metal mesh radiator region 1020_a_, the atypical mesh shape may be formed in the closed dummy region in such a manner as to have a structure in which an open area is not formed inside itself. A predetermined distance that determines the open dummy region and the closed dummy region may be set to ¼ to ½ of a wavelength corresponding to an uppermost frequency, among operating frequencies of an antenna pattern that is realized by the metal mesh radiator region 1020*a*.

In summary, in a case where a size of the dielectric substrate 1010 that is an antenna substrate is $0.5\lambda_H$ or less from a contour of the radiation conductive portion 1110, a region other than the radiation conductive portion 1110 may be configured as the dummy metal mesh region 1020*b*. In a case where the size of the dielectric substrate 1010 is $0.5\lambda_H$ or more from a contour of the radiation conductive portion 1110, the open dummy region 1020*b*-R1 has to cover a minimum distance of up to $0.5\lambda_H$ from the radiation conductive portion 1110. A region that is spaced 0.5λH or more away from the outermost edge of the radiation conductive portion 1110 does not satisfy a condition for the dummy region, and thus is permissible as the closed dummy region 1020*b*-R2.

The virtual cut lines may be formed in such a manner as to be spaced a predetermined distance apart in a gradation pattern. The distance that the virtual cut lines are spaced apart may be monotonously increased or be monotonously decreased in a gradation pattern. The virtual cut lines may be formed in such a manner that a difference occurs in the distance that the virtual cut lines are disposed to be spaced apart at least in one of the vertical direction, the horizontal direction, and the like toward the direction opposite to the radiation conductive portion 1110, that is, in such a manner that a difference occurs in density. As an example, the radiation conductive portion 1110 may be deposed adjacent to an outer portion of the glass pane of the vehicle 500. A center portion of the glass pane of the vehicle 500 is required to have a higher degree of transparency than the outer portion thereof. Accordingly, the degree of transparency is required to get higher toward the direction opposite to the radiation conductive portion 1110, that is, toward the center portion of the glass pane of the vehicle 500. Therefore, the cut lines may be formed in such a manner that the distance that the virtual cut lines are disposed to be spaced apart is increased toward the direction opposite to the radiation conductive portion 1110.

In this regard, values of the first distance HG1 and the second distance VG1 of the cut lines that has a low density may be a reference for the distance between the cut lines. In other words, the cut lines may be formed in such a manner that the values of the first distance HG1 and the second distance VG1 of the cut lines that has a low density are set to 1⁄10 or less of a wavelength corresponding to an uppermost frequency.

A size of the dummy pattern, a distance between open points on the open area of the dummy pattern, and sheet resistance of the atypical pattern will be described in detail below. In this regard, FIGS. 10 (*a*) and (*b*) are views illustrating a configuration in which the layered structure in which the metal mesh radiator region 1020*a* and the dummy metal mesh region 1020*b* are formed and the metal lines are formed, in such a manner as to have a both-side blackening structure, on top of the dielectric substrate 1010 on which a substrate made of a transparent material is formed. FIG. 11 illustrates transmissivity and sheet resistance that vary with line-widths, line-heights, and pitches of various types of metal mesh structures.

Referring to FIGS. 7B to 10, the metal mesh layer 1020 may be formed on the second layer L2 that is a layer on top of the dielectric substrate 1010 that is the first layer L1. The metal mesh radiator region 1020*a* and the dummy metal mesh region 1020*b* may be formed on the metal mesh layer 1020. The dummy metal mesh region 1020*b* may be formed in such a manner as to be spaced the specific distance G1 away from boundaries of both sides of the metal mesh radiator region 1020*a*. The metal mesh radiator region 1020*a* and the dummy metal mesh region 1020*b* may be referred to as the metal mesh (grid) (or the radiator region or the antenna pattern) 1020*a* and the dummy mesh (grid) (or the dummy region or the dummy pattern) 1020*b*, respectively.

Figure 10:
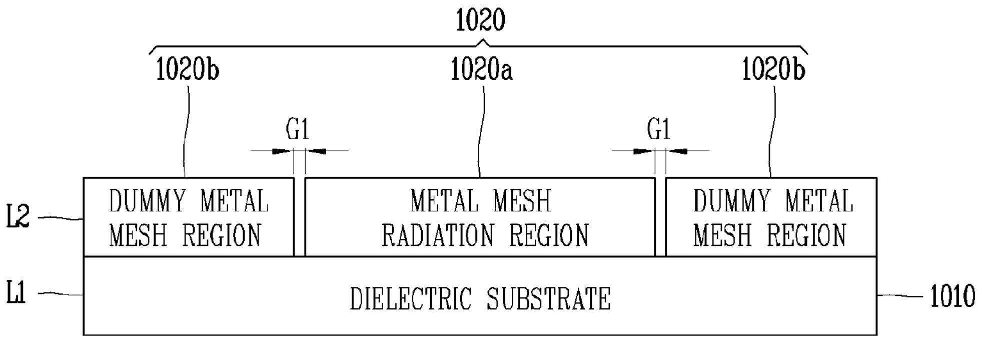
FIGS. 10 (*a*) and (*b*) are views each illustrating a configuration in which the layered structure in which the metal mesh radiator region and the dummy metal mesh region are formed and the metal lines are formed, in such a manner as to have a both-side blackening structure, on top of the dielectric substrate on which a substrate made of a transparent material is formed.
Figure 10:
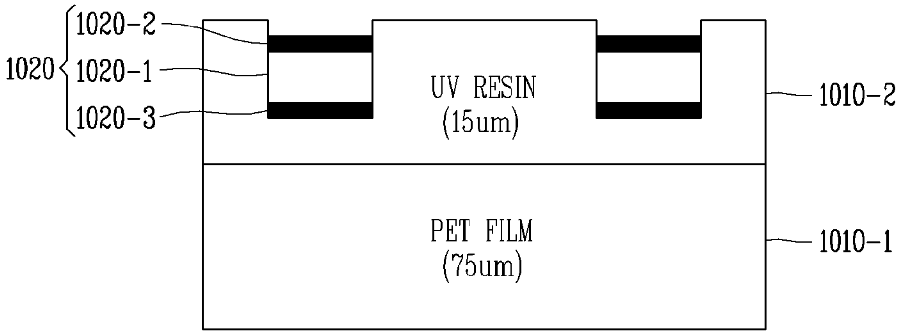
Figure 11:
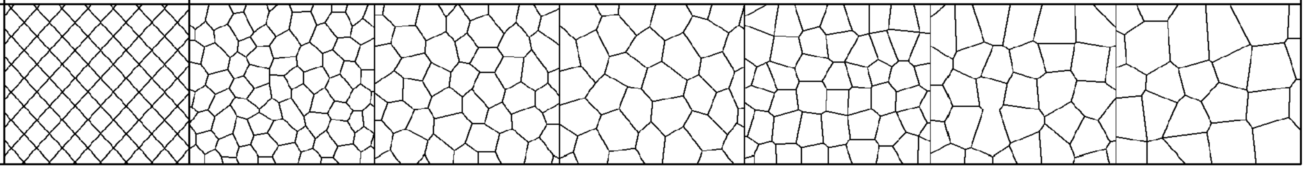
FIG. 11 is a table showing transmissivity and sheet resistance that vary with line-widths, line-heights, and pitches of various types of metal mesh structures.

Referring to FIG. 10 (*b*), the dielectric substrate 1010 may be configured to include a first dielectric substrate 1010-1 and a second dielectric substrate 1010-2 disposed on top of the first dielectric substrate 1010-1. The first dielectric substrate 1010-1 may be formed of a film material, such as a PET film, but is not limited thereto. The second dielectric substrate 1010-2 may be formed of an adhesive dielectric material, such as UV resin, but is not limited thereto. The metal mesh layer 1020 may be formed in an empty space in the second dielectric substrate 1010-2. The metal mesh layer 1020 may be configured to include a metal layer 1020-1 and first and second blackening layers 1020-2 and 1020-3 that are disposed on top of the metal layer 1020-1 and on the bottom thereof, respectively.

As an example, the first dielectric substrate 1010-1 may be formed in such a manner as to have a thickness of approximately 75 μm, but is limited thereto. Moreover, the second dielectric substrate 1010-2 may be formed in such a manner as to have a thickness of approximately 15 μm, but is not limited thereto. The metal layer 1020-1 may have a thickness of approximately 6.0 μm, but is not limited thereto. Each of the first and second blackening layers 1020-2 and 1020-3 may have a thickness of approximately 1.5 μm, but is not limited thereto. The metal layer 1020-1 may be formed in such a manner as to have a thickness of approximately 6.0 μm to 6.3 μm. The metal layer 1020-1 may be formed in such a manner as to have a line-width of approximately 5.2 μm to 5.4 μm. The metal mesh layer 1020 may be formed in such a manner that a filling fraction thereof is approximately 80% to 85%.

Referring to FIG. 11, it is possible that an atypical mesh type is realized in such a manner as to have a greater line-width of 5.2 μm to 5.4 μm than a typical mesh type in the shape of a diamond. Accordingly, the atypical mesh type may be realized in such a manner as to have a high pitch value of 100 μm to 150 μm while the typical mesh type may have a low pitch value of 70 μm. Accordingly, the atypical mesh type has a higher transmissivity of approximately 82% to 86% than the typical mesh type that has a transmissivity of approximately 70%. In addition, the atypical mesh type has a sheet resistance of 0.47 Ω/sq to 0.89 Ω/sq. In addition, unlike in the typical mesh type, in the atypical mesh type, a pitch is changeable according to a specific region, such as the antenna region or the mesh region. Thus, there is provided an advantage in that the meal mesh is optimally designable, considering electrical performance and visibility. Features of the atypical mesh type that result from various structures thereof will be described in detail below.

In a transparent antenna structure according to the present disclosure, transmissivity of the metal mesh grid may be determined according to a length and line-width of the metal line and an area fraction of a cut portion that results from disconnecting. In this regard, FIG. 12 illustrates the metal mesh grid structure that has a specific length and line-width, and the cut portion resulting from disconnecting the metal line.

Figure 12:
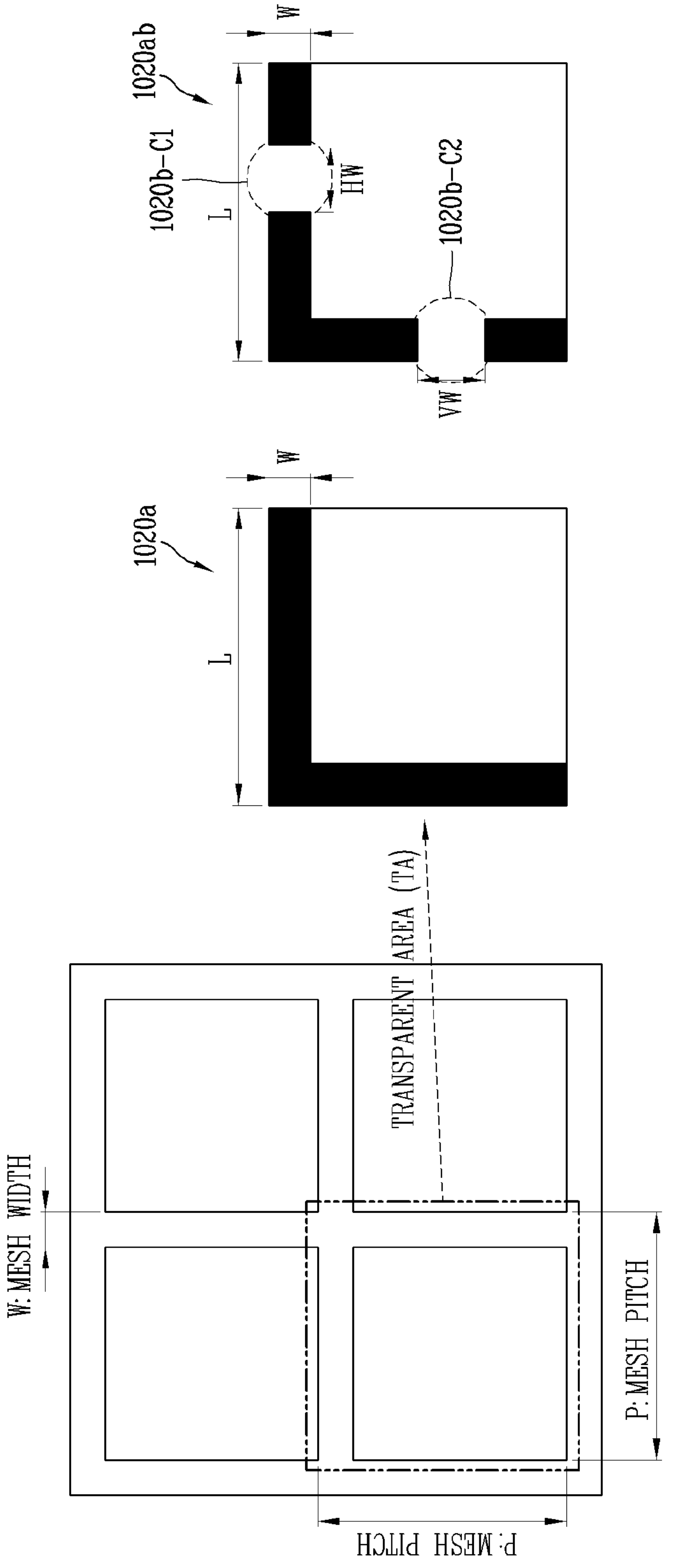
FIG. 12 is a view illustrating a metal mesh grid structure that has a specific length and line-width and a cut portion resulting from cutting a meta line.

Referring to FIG. 12, a unit cell of the metal mesh grid may be realized by a predetermined line-width W and pitch P. A region in which the metal lines are not formed may be referred to as a transparent area TA. The metal lines on the metal mesh radiator region 1020*a* forms the radiation conductive portion 1110. The unit cell that is formed by the metal lines on the metal mesh radiator region 1020*a* may have a mesh grid structure with a predetermined length L and line-width W. The predetermined length L of the unit cell corresponds to a pitch P of a mesh.

The metal lines on the dummy metal mesh region 1020*b* forms a dummy pattern portion. Cut portions 1020*b*-C1 and 1020*b*-C2 may be formed in such a manner as to have the mesh grid structure having a predetermined L and line-width W, in the unit cell formed by the metal lines on the dummy metal mesh region 1020*b*. The cut portions 1020*b*-C1 and 1020*b*-C2 may be formed in such a manner that they have a first width HW and a second width VW, respectively.

When an area of the unit cell and an area of the transparent area TA where the metal lines are not formed are defined as A and A', respectively, transmissivity is determined according to an aperture ratio. Accordingly, the transmissivity may be determined by A'/A. Transmissivity of the radiation conductive portion 1110 may be calculated as (L−W)2/L2, using a unit grid structure. In contract, transmissivity of the dummy pattern portion may be calculated as ((L−W)2+2*L*W1)/L2. Therefore, transmissivity of the dummy metal mesh region 1020*b* corresponding to the dummy pattern portion is increased by 2*L*W1/L2 that corresponds to the area fractions of the cut portions 1020*b*-C1 and 1020*b*-C2. Therefore, the transmissivity of the dummy pattern portion, which has a higher aperture ratio when the radiation conductive portion and the dummy pattern portion are realized with the same grid, is increased. Like in the typical mesh grid structure as illustrated in FIG. 12, transmissivity may also be calculated in an atypical mesh grid structure. The transmissivity in the atypical mesh grid structure may be determined by A'/A that means that an area A' of the transparent area TA is divided by an area A of the unit cell.

Referring to FIGS. 10 to 12, an atypical dummy pattern on the dummy metal mesh region 1020*b* may be formed in such a manner as to have a line-width of 5.2 μm to 5.4 μm. The atypical dummy pattern on the dummy metal mesh region 1020*b* may be formed in such a manner as to have a thickness of 6.0 μm to 6.3 μm.

A metal mesh layer TM that is the typical mesh type may be formed in the shape of a diamond in such a manner as to have a line-width of approximately 4.2 μm to 4.5 μm. The metal mesh layer TM that is the typical mesh type may be formed in such a manner as to have a line-height of approximately 0.5 μm to 0.65 μm. Metal mesh layers ATM1 to ATM6 may be formed in such a manner as to have a line-width of 5.2 μm to 5.4 μm. The metal mesh layers ATM1 to ATM6 may be formed in such a manner as to have a line-width of approximately 6.0 μm to 6.3 μm. In this regard, the atypical dummy pattern on the dummy metal mesh region 1020*b*, as illustrated in FIG. 10 (*a*), may be configured to include the metal layer 1020-1 and the first and second blackening layers 1020-2 and 1020-3 that are disposed on top of the metal layer 1020-1 and on the bottom thereof, respectively. Accordingly, the metal mesh layers ATM1 to ATM6 that are the atypical mesh types may be formed in such a manner as to have a greater line-width (thickness) than the metal mesh layer TM that is the typical mesh type.

The metal mesh layer TM that is the typical mesh type may be formed in such a manner as to have a pitch of approximately 70 μm. The metal mesh layers ATM1 to ATM6 that are the atypical mesh type may be formed in such a manner as to have a pitch of approximately 100 μm to 150 μm.

As an example, the metal mesh layer TM that is the typical mesh type may have a transmissivity of 79.79%. The metal mesh layers ATM1 to ATM6 that are the atypical mesh types may have a transmissivity of 82.62% to 86.29%. The more increased a pitch corresponding to a distance between the meshes, the more increased the transmissivity in each of the metal mesh layers ATM1 to ATM6 that are the atypical mesh types. The more increased the pitch in each of the metal mesh layers ATM1 to ATM6 that are the atypical mesh types, the more increased a value of sheet resistance. As an example, the sheet resistance of each of the metal mesh layers ATM1 to ATM6 that are the atypical mesh types has a value of approximately 0.47 Ω/sq to 0.88 Ω/sq. In a case where the metal lines in the atypical mesh shape are formed in such a manner as to have a pitch of 100 μm to 150 μm, the atypical mesh shape may be formed in such a manner as to have a sheet resistance of 0.47 Ω/sq to 0.89 Ω/sq. The more increased the pitch in the metal mesh layers ATM1 to ATM6 that are the atypical mesh type, the more decreased a haze value resulting from reflection.

Referring to FIGS. 10 to 12, the antenna pattern 1111 that is realized by the metal mesh radiator region 1020*a* may be formed in such a manner as to operate in an operating frequency band of 800 MHz to 3000 MHz. In addition, the antenna pattern 1111 may be formed in such a manner as to operate in an operating frequency band of 600 MHz to 6 GHz, considering an entire 4G/5G frequency band.

Referring to FIG. 9 (*a*) to 12, the distances HG1 and VG1 between the virtual cut lines on the dummy metal mesh region 1020*b* may be set to 1/10 or less of a wavelength. The distance between the virtual cut lines may be set to 10 mm or less, considering a reference frequency in an operating frequency band of the antenna pattern 1111, for example, a wavelength corresponding to an uppermost frequency. The operating frequency band of the antenna pattern 1111 is from 800 MHz to 3000 MHz, a reference frequency is 3000 MHz, and a wavelength corresponds to 10 cm. Accordingly, the distances HG1 and VG1 between the virtual cut lines on the dummy metal mesh region 1020*b* may be set to 10 mm or less, which is 1/10 or less of the wavelength. In a case where the antenna pattern 1111 operates in an operating frequency band of 600 MHz to 6 GHz, a reference frequency is 6 GHz, and a wavelength is 5 cm. Accordingly, the distances HG1 and VG1 between the virtual cut lines on the dummy metal mesh region 1020*b* may be set to 5 mm or less, which is 1/10 or less of the wavelength.

The transparent antenna structure according to an aspect of the present disclosure is described above. A transparent antenna structure, to which a CPW electricity supply technique applies, according to another aspect of the present disclosure will be described below. In this regard, all structural and technical features of the above-described transparent antenna structure may apply to the transparent antenna structure, to which the CPW electricity supply technique applies, which will be described below.

Referring to FIGS. 7A to 9, the antenna assembly may include the first layer L1 that is realized as the dielectric substrate 1010 formed of a transparent dielectric material.

The antenna assembly may include the second layer L2 that is formed in the metal mesh shape on one surface of the dielectric substrate 1010. Referring to FIGS. 9 (*a*) and 9 (*b*), the first layer L1 may be referred to as the dielectric substrate 1010, and the second layer L2 may also be referred to as the metal mesh layer 1020. In addition, the first layer L1 may be referred to as the dielectric region 1010, and the second layer L2 may also be referred to as the metal mesh layer 1020. In this regard, the combination of the dielectric region 1010 and the metal mesh layer 1020 may also be referred to as the dielectric substrate 1050.

The second layer L2 may include the metal lines that realize the shape of an atypical mesh shape that has a specific line-width or smaller in such a manner as to transmit and receive a wireless signal, and the metal mesh radiator region 1020*a* that is configured with the open area OA. The metal lines that realize the metal mesh shape may be formed in such a manner as to have a line-width of 10 μm or less. The second layer L2 may include the dummy metal mesh region 1020*b* that is configured with the metal lines that realize the atypical mesh shape that has a specific line-width or smaller and the slits SL. The metal lines that realize a dummy metal mesh shape may also be formed in such a manner as to have a line-width of 10 μm or less. The second layer L2 may include the connector portion CP that is configured in such a manner as to be connected to the metal mesh radiator region 1020*a* and thus to transmit a signal. The ground portions GP may be formed to both sides, respectively, of the connector portion CP.

The metal mesh radiator region 1020*a* and the dummy metal mesh region 1020*b* may be referred to as the metal mesh grid (or the radiator region or the antenna pattern) 1020*a* and the dummy mesh grid (or the dummy region or the dummy pattern) 1020*b*, respectively.

The metal mesh radiator region 1020*a* and the dummy metal mesh region 1020*b* may form a first region R1, and the connector portion CP may form a second region R2.

The metal mesh radiator region 1020*a* may be formed in such a manner as to have the first transmissivity. The dummy metal mesh region 1020*b* may be formed in such a manner as to have the second transmissivity that is higher than the first transmissivity. The connector portion CP may be formed in such a manner as to have third transmissivity that is lower than the first transmissivity.

As an example, the first transmissivity of the metal mesh radiator region 1020*a* may be set to 80% or more. The second transmissivity of the dummy metal mesh region 1020*b* may be set to 82% or more. The third transmissivity of the connector portion CP may be set to 70% or less. As another example, the first transmissivity of the metal mesh radiator region 1020*a* may be set to 70% or more. The second transmissivity of the dummy metal mesh region 1020*b* may be set to 72% or more. The metal mesh radiator region 1020*a* and the dummy metal mesh region 1020*b* may be formed in such a manner that the first line-width of the metal mesh radiator region 1020*a* is greater than the second line-width of the dummy metal mesh region 1020*b*. Thus, the dummy metal mesh region 1020*b* may be made to have relatively low transmissivity.

The metal mesh radiator region 1020*a* may be formed in such a manner that sheet resistance thereof is set to 1 Ω (ohm)/sq or less. The metal mesh radiator region 1020*a* and the dummy metal mesh region 1020*b* may be formed in such a manner that a difference between the first transmissivity of the metal mesh radiator region 1020*a* and the second transmissivity of the dummy metal mesh region 1020*b* is set to 2% or less. Thus, visibility may be kept at or below a predetermined level. The dummy metal mesh region 1020*b* may be configured in such a manner as to be spaced a distance away from the outer portion of the metal mesh radiator region 1020*a*. The dummy metal mesh region 1020*b* and the metal mesh radiator region 1020*a* may be formed in such a manner that a boundary of one portion of the dummy metal mesh region 1020*b* and a boundary of the metal mesh radiator region 1020*a* are spaced a distance away from each other. The dummy metal mesh region 1020*b* may be configured in such a manner as to be spaced the specific distance G1 away from the outer portion of the metal mesh radiator region 1020*a*. The dummy metal mesh region 1020*b* and the metal mesh radiator region 1020*a* may be formed in such a manner that they are spaced a different distance apart on the radiator region than on the electricity supply region.

The atypical mesh shape of the dummy metal mesh region 1020*b* that overlaps the virtual cut lines formed in both axial directions may form the slits SL. The virtual cut lines and a polygon that is made up of metal lines in the atypical mesh shape may be formed in such a manner as to overlap in a line-width region corresponding to the inside of the polygon. The virtual cut lines may be formed in the dummy metal mesh region 1020*b* in such a manner as to be equally spaced the distance HG1 in one axial direction and the distance VG1 in the other axial direction.

Referring to FIGS. 10 to 12, the atypical dummy pattern on the dummy metal mesh region 1020*b* may be formed in such a manner as to have a line-width of 5.2 μm to 5.4 μm. The atypical dummy pattern on the dummy metal mesh region 1020*b* may be formed in such a manner as to have a thickness of 6.0 μm to 6.3 μm.

Referring to FIGS. 10 to 12, the antenna pattern 1111 that is realized by the metal mesh radiator region 1020*a* may be formed in such a manner as to operate in the operating frequency band of 800 MHz to 3000 MHz. The distances HG1 and VG1 between the virtual cut lines on the dummy metal mesh region 1020*b* may be set to 1/10 or less of the wavelength. When 3000 MHz in the frequency band of the antenna pattern 1111 is defined as a reference frequency, the distance between the virtual cut lines may be set to 10 mm or less. In the case where the metal lines in the shape of an atypical mesh are formed in such a manner as to have a pitch of 100 μm to 150 μm, the atypical mesh shape may be formed in such a manner as to have a sheet resistance of 0.47 Ω/sq to 0.89 Ω/sq.

The dummy patterns on the dummy metal mesh region 1020*b* may be configured in such a manner as to be disconnected in the vertical and horizontal directions. The coupling between the antenna pattern realized by the metal mesh radiator region 1020*a* and the dummy pattern on the dummy metal mesh region 1020*b* that is configured in such a manner as to be disconnected in the vertical and horizontal directions may be decreased more than the second coupling between the antenna pattern and each of the dummy patterns that are connected to each other. The dummy patterns here that are connected to each other means that, like the antenna patterns, the metal mesh grids are configured in such a manner as to be connected to each other.

The dummy pattern on the dummy metal mesh region 1020*b* may be configured in such a manner that the boundary thereof is spaced the specific distance G1, for example, a distance of 100 μm or 200 μm or less, away from the boundaries of the metal lines on the metal mesh radiator region 1020*a*. The horizontal virtual cut lines may be disposed the first distance HG1 apart in the horizontal direction on the dummy metal mesh region 1020*b*. The vertical virtual cut lines may be disposed the second distance VG1 apart in the vertical direction on the dummy metal mesh region 1020*b*. The first distance HG1 and the second distance VG1 may be set to the specific distance G1 or greater between the boundary of the dummy metal mesh region 1020*b* and the boundary of the metal mesh radiator region 1020*a*.

The first region 1020*b*-R1 of the dummy metal mesh region that is spaced a predetermined distance or smaller away from the boundary of the metal mesh radiator region 1020*a* may form an open dummy region having an open area where the atypical mesh shape is disconnected. In contrast, the second region 1020*b*-R2 of the dummy metal mesh region that is spaced a predetermined space or greater away from the boundary of the metal mesh radiator region 1020*a* may form the closed dummy region where the atypical mesh shapes are connected to each other.

In this regard, the atypical mesh shape that overlaps virtual cut lines formed in both axial directions may form the slits SL in the open dummy region. In contrast, similarly to the metal mesh radiator region 1020*a*, the atypical mesh shape may be formed in the closed dummy region in such a manner as to have the structure in which the open area is not formed inside itself. A predetermined distance that determines the open dummy region and the closed dummy region may be set to ¼ to ½ of the wavelength corresponding to the uppermost frequency, among the operating frequencies of the antenna pattern that is realized by the metal mesh radiator region 1020*a*.

Figure 13A:
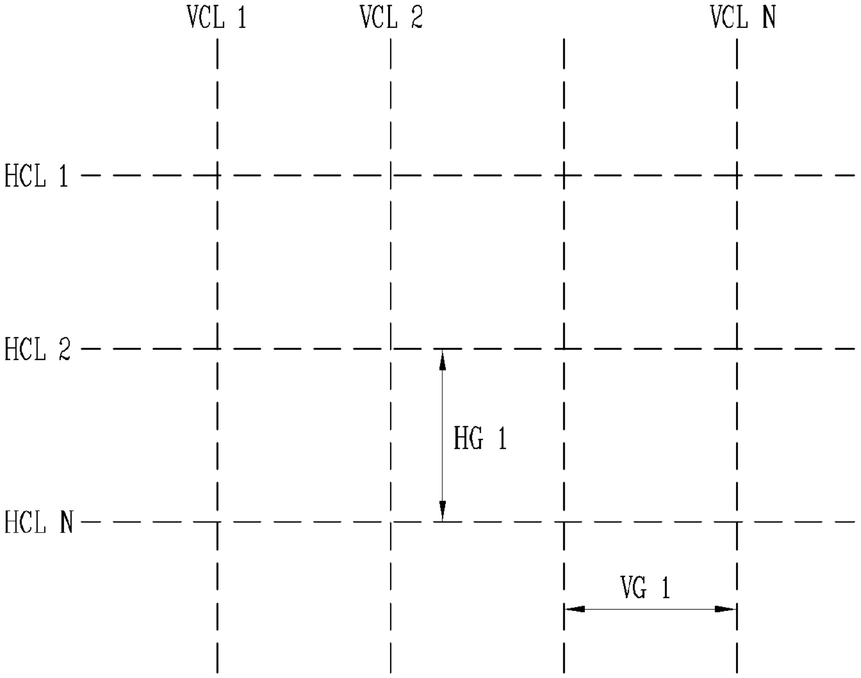
FIGS. 13A and 13B are views illustrating a structure of a virtual cut line and a structure in which the virtual cut line and a dummy pattern are formed, respectively.
Figure 13B:
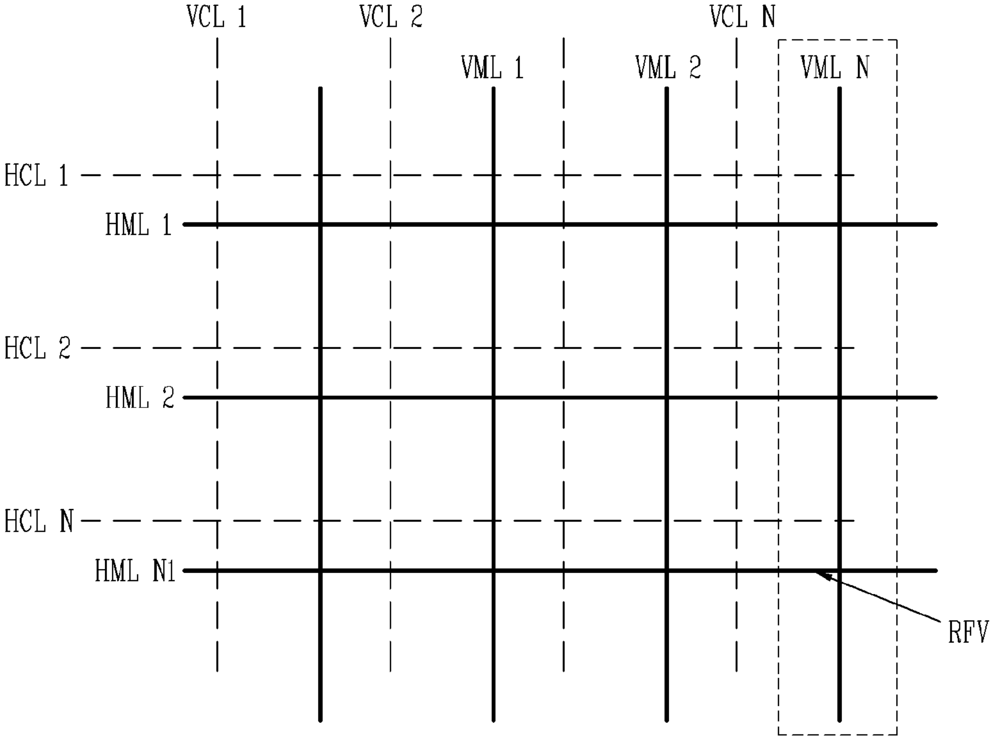

A structure of the virtual cut line in various embodiments, in association with the transparent antenna structure according to the present disclosure, is described. In this regard, FIGS. 13A and 13B illustrate the structure of the virtual cut line and a structure in which the virtual cut line and the dummy pattern are formed, respectively.

Referring to FIGS. 7A, 8A, 8B, 12, 13A, and 13B, electric current occurring in an antenna is mixed with electric current in the vertical and horizontal directions, and the dummy pattern may have an effect on the antenna performance. In order to decrease this effect, the dummy patterns on the dummy metal mesh region 1020*b* may be configured in such a manner to be disconnected from each other. Accordingly, the coupling effect may be reduced that occurs between the radiation conductive portion 1110 and the dummy pattern on the dummy metal mesh region 1020*b*. Among the cut lines HCL1, HCL2, and so forth up to HCLN in the horizontal direction, adjacent cut lines may be disposed to be spaced the first space HG1 apart. Among the cut lines VCL1, VCL2, and so forth up to VCLN in the vertical direction, adjacent cut lines may be disposed to be spaced the second space VG1 apart.

The metal meshes formed on the metal mesh radiator region 1020*a* and the dummy metal mesh region 1020*b* may be realized in such a manner as to have a line-width W of 10 μm or less and a degree of transparency of 70% or more. It is possible that the metal mesh is realized in such a manner as to have a line-wide W of up to approximately 1 μm. The line-width W of the metal mesh is decreased from 10 μm to 5 μm, 4 μm, and 1 μm. Thus, a manufacturing error and manufacturing cost can be relatively increased. When the line-width W is increased, transmissivity can be maintained by increasing the pitch P. However, the visibility may be decreased. Particularly, there is a restriction on realization of a small-sized antenna in designing an antenna for a high frequency band, such as the mmWave band or a Sub-6 band.

The dummy pattern formed on the dummy metal mesh region 1020*b* may be disposed to be spaced the specific distance G1 or greater away from a boundary of the radiation conductive portion of the metal mesh radiator region 1020*a*. The width G1 that is a disconnection distance between boundary portions of the radiation conductive portion and the dummy pattern may be set to 200 μm or less. In this regard, the disconnection distance G1, when set to more than 200 μm, may be distinguishable with the naked eye. The disconnection distance G1, when set to more than 200 μm, may be or may not be distinguished with the naked eye, depending on a distance from which it is seen.

The first distance HG1 and the second distance VG1, which are distances between the cut lines, may be set to $\lambda_H/10$ or less. At this point, $\lambda_H$ is a wavelength corresponding to an uppermost frequency, among operating frequencies. As described above, in a case where an operating frequency of the antenna is 800 MHz to 3000 MHz, the uppermost frequency that is a reference frequency is determined as 3000 MHz, and a wavelength is determined as 10 cm. Accordingly, values for upper limits of the first distance HG1 and the second distance VG1 that are the distances between the virtual cut lines may be set to 10 mm.

In association with the transparent antenna structure according to the present disclosure, transmissivity varies with an aperture ratio of the metal mesh which varies with the line-widths HW and VW of the cut portion. A difference in this transmissivity between the dummy pattern portion and the radiation conductive portion may be set to 2% or less. In a case where the radiation conductive portion and the dummy pattern portion are configured with the metal mesh having the same line-width, the more increased the line-width of the cut line, the more increased the transmissivity of the dummy pattern portion. The pattern is identifiable with the naked eye. Accordingly, the line-widths HW of the cut line and the line-widths VW thereof may be set to a threshold line-line or below in such a manner that a difference in the transmissivity between the line-widths HW of the cut line and between the line-widths VW thereof is 2% or less.

Similarly to the cut lines HCL1, HCL2, and so forth up to HCLN in the horizontal direction, the metal lines HML1, HML2, and so forth up to HMLN in the horizontal direction may be formed. Similarly to the cut lines VCL1, VCL2, and so forth up to VCLN in the vertical direction, the metal lines VML1, VML2, and so forth up to VMLN in the vertical direction may be formed. The cut line and the metal lime VMLN may be prevented from overlap in a region RFV where the cult line in the vertical direction is not present. In this regard, the region RFV where the cut line in the vertical direction is not present may be the metal mesh radiator region 1020*a*. In addition, the region RFV may be the dummy metal mesh region 1020*b* that is spaced a predetermined distance away from the boundary of the metal mesh radiator region 1020*a*.

The structure of the virtual cut line in the various embodiments, in association with the transparent antenna structure according to the present disclosure, which is described above, will be described in detail referring to the drawings. In this regard, FIG. 14 (*a*) to (*c*) are views illustrating modification examples, respectively, of various shapes of the virtual cut lines in the embodiments of the present disclosure. FIGS. 15A to 15C illustrate a structure where the virtual cut lines are rotated, a structure where the virtual cut lines are moved in parallel, and a structure where the virtual cut lines are scaled, respectively, in the embodiments of the present disclosure.

Figure 14:
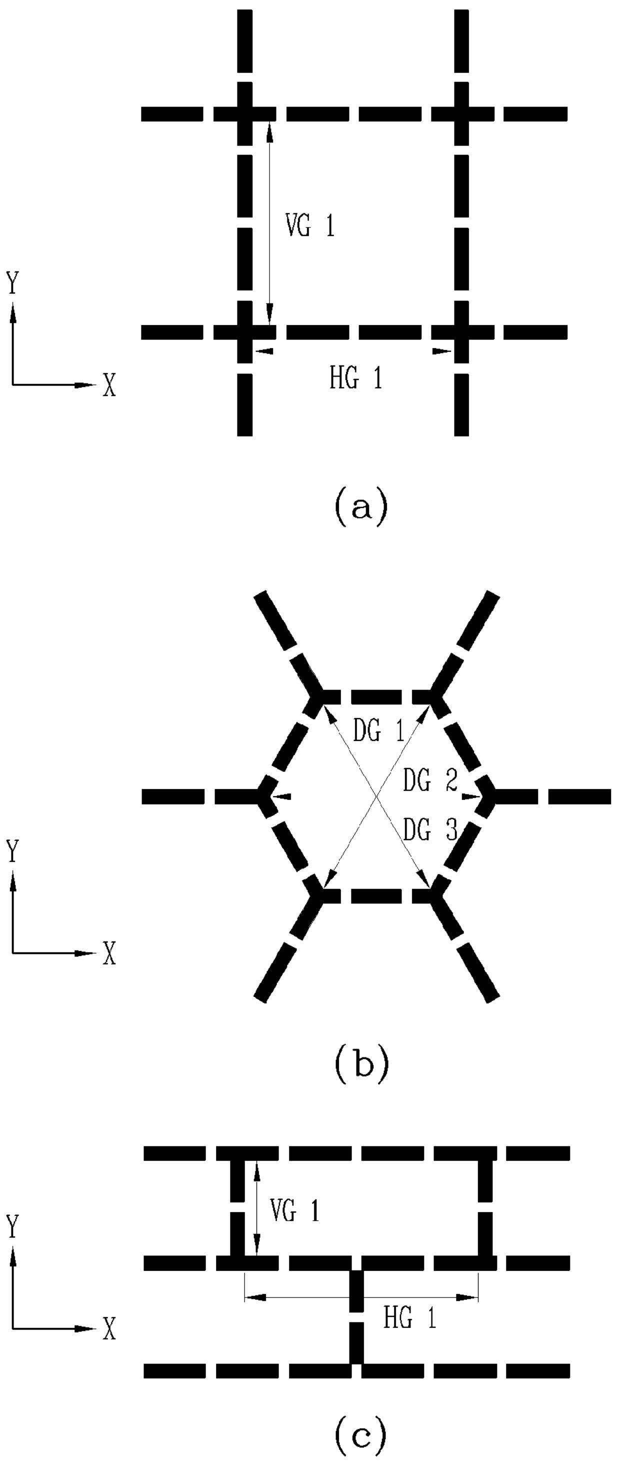
FIG. 14 (*a*) to (*c*) are views illustrating modification examples, respectively, of various shapes of the virtual cut lines in the embodiments of the present disclosure.
Figure 15A:
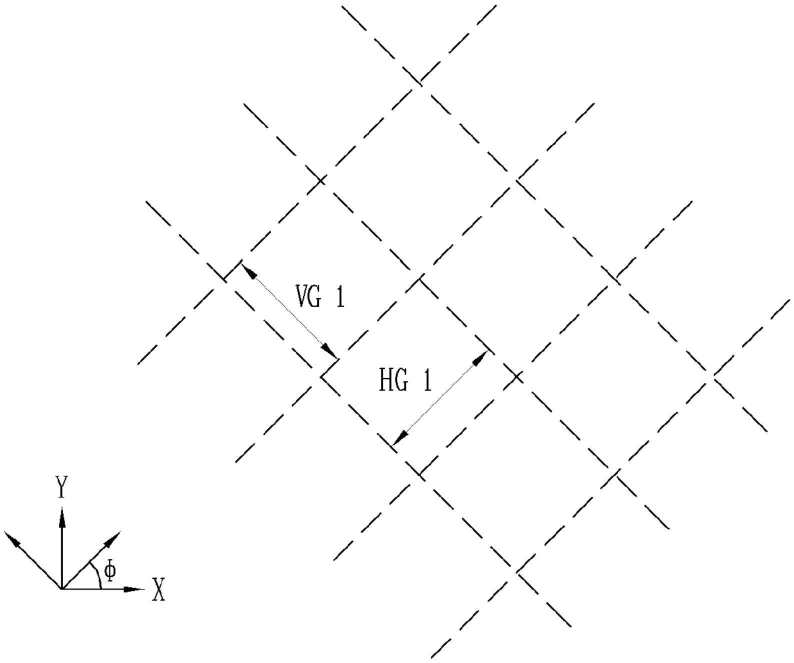
FIGS. 15A to 15C are views illustrating a structure where the virtual cut lines are rotated, a structure where the virtual cut lines are moved in parallel, and a structure where the virtual cut lines are scaled, respectively, in the embodiments of the present disclosure.
Figure 15B:
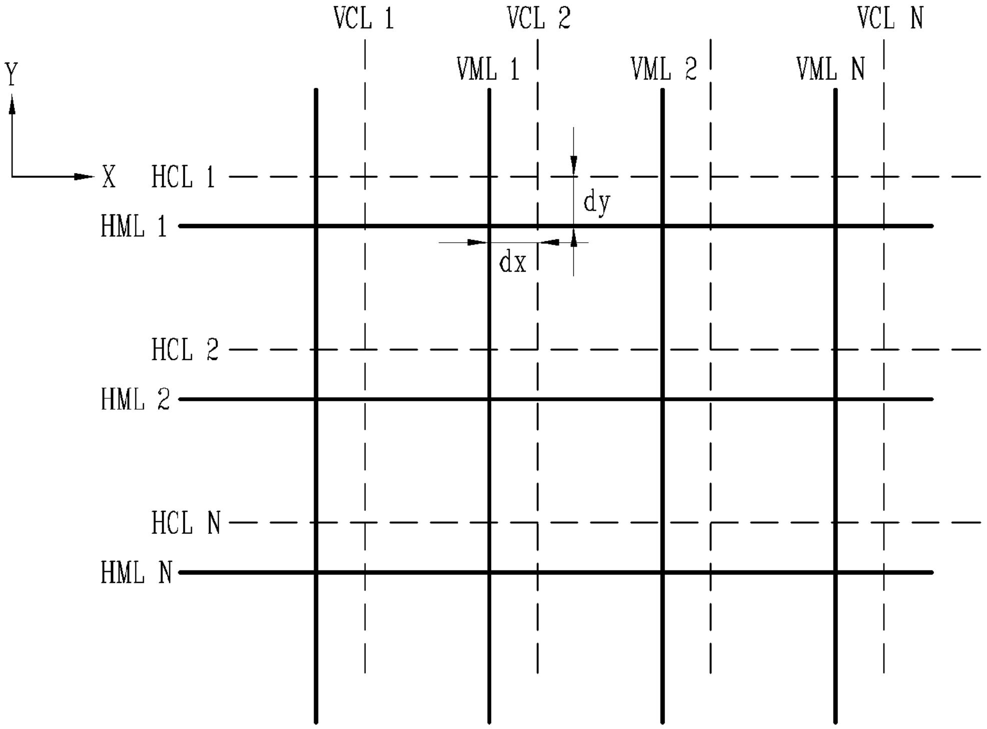
Figure 15C:
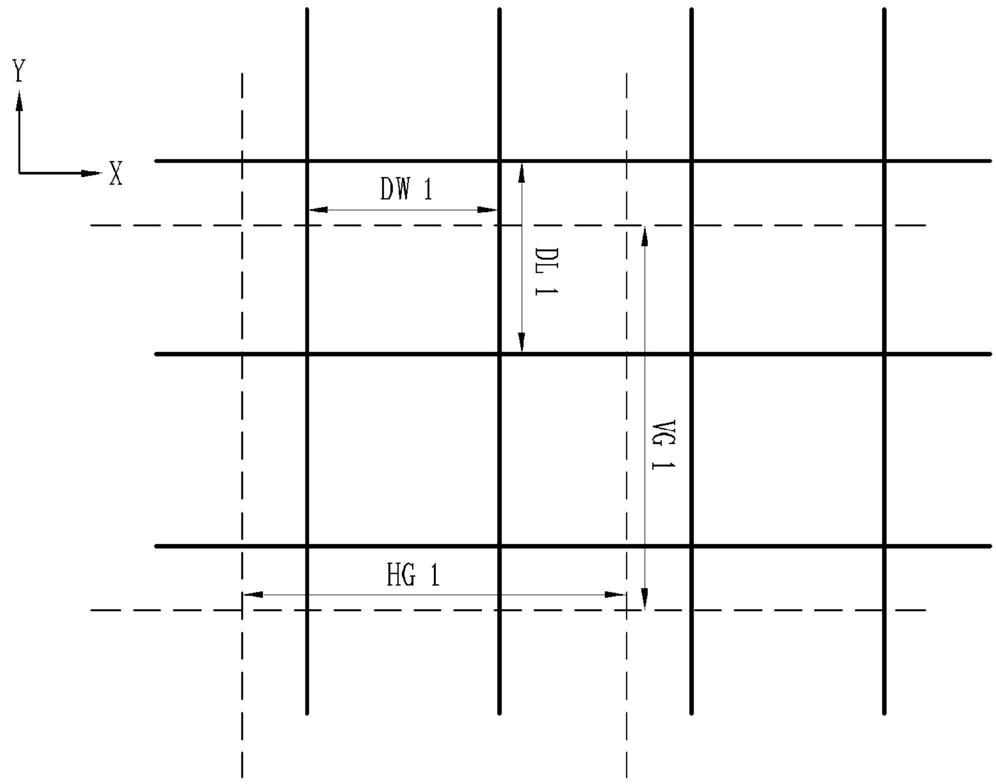

FIG. 14 (*a*) illustrates the cut lines in the horizontal and vertical directions that are formed in such a manner as to have the shape of a rectangle. The adjacent cut lines in the horizontal direction may be disposed to be spaced the first distance HG1 apart. The adjacent cut lines in the vertical direction may be disposed to be spaced the second distance VG1.

FIG. 14 (*b*) illustrates the cut lines in a plurality of directions that are formed in such a manner as to have the shape of a polygon. As an example, the cut lines in first to third directions that are formed in the shape of a hexagon are illustrated. The cut lines that are adjacent to each other in the first direction may be disposed to be spaced a first distance DG1 apart. The cut lines that are adjacent to each other in the second direction may be disposed to be spaced a second distance DG2 apart. The cut lines that are adjacent to each other in the third direction may be disposed to be spaced a third distance DG3 apart. The first distance DG1 that the cut lines in the shape of a regular hexagon are spaced apart, the second distance DG2 that the cut lines in the shape of a regular hexagon are spaced apart, and the third distance DG3 that the cut lines in the shape of a regular hexagon are spaced apart may be set to be the same, but are not limited to be being the same. The first to third distances DG1, DG2, and DG3 may be set to be different from each other.

FIG. 14 (*c*) illustrates the cut lines that are disposed to be offset in one direction in which they are formed in such a manner as to have a rectangular structure. As illustrated in FIG. 14 (*c*), the cut lines in the vertical line may be disposed in an offset manner. As another example, the cut lines in the vertical lines may be disposed in an offset manner. In this regard, the adjacent cut lines in the horizontal direction may be disposed to be spaced the first distance HG1 apart, and the adjacent cut lines in the vertical direction may be disposed to be spaced the second distance VG1 apart.

Referring to FIGS. 14 (*a*) to 14 (*c*), the virtual cut lines may be configured in such a manner as to have a geometric shape. In a case where the virtual cut lines are configured in such a manner as to have a geometric shape, the metal mesh pattern may also be formed in such a manner as to have an atypical metal mesh grid structure.

Referring to FIG. 15A, the structure of the virtual cut line as illustrated in FIG. 14 (*a*) may be configured in such a manner as to be rotated by a predetermined angle in one axial direction. An axis that is rotated by a predetermined angle in one axial direction may be defined as a first axial direction, and an axis that is perpendicular to the first axial direction may be defined as a second axial direction. The adjacent cut lines in the first axial direction may be disposed to be spaced the first distance HG1 apart. The adjacent cut lines in the second axial direction may be disposed to be spaced the second distance VG1 apart.

Referring to FIG. 15B, the mesh lines may be formed in such a manner as to be spaced a predetermined distance apart in the horizontal direction and a predetermined distance apart in the vertical direction with respect to the virtual cut lines and to be moved in parallel. The metal lines HML1, HML2, and so forth up to HMLN in the first direction may be formed in such a manner as to be spaced a first distance dx away from the cut lines HCL1, HCL2, and so for the up to HCLN, respectively, in the first direction. The metal lines VML1, VML2, and so forth up to VMLN in the second direction may be formed in such a manner as to be spaced a second distance dy away from the cut lines VCL1, VCL2, and so for the up to VCLN, respectively, in the second direction. The dummy pattern may have the same shape as the cut lines and may be moved the first distance dx in the horizontal direction and the second distance dy in the vertical direction.

Referring to FIG. 15C, the cut lines may be formed in such a manner that the distances HG1 and VG1 therebetween are different from distances DW1 and DL1, respectively, between the dummy patterns. The cut lines may be formed in such a manner that the distances HG1 and VG1 in the horizontal and vertical directions have scaled dimensions, respectively, of the distances DW1 and DL1 in the horizontal and vertical directions between the dummy patterns. As an example, the cut lines may be formed in such a manner that the distances HG1 and VG1 therebetween are scaled to two times the distances DW1 and DL1, respectively, in the horizontal and vertical directions between the dummy patterns, but are not limited to these scaled dimensions.

The transparent antenna structure according to the present disclosure in which the virtual cut lines are formed on the dummy region may apply to an antenna element, such as a dipole antenna, as well as to an antenna element, such as a patch antenna. In this regard, FIGS. 16A and 16B each illustrate the transparent antenna structure according to the present disclosure in which a signal is applied to the radiation conductive portion 1110 of the transparent region 311 through an electricity supply unit in the opaque region 312 that varies according to whether or not the dummy pattern is present. FIGS. 17A, 17B(a), and 17B(b) are enlarged views of the radiation conductive portion in the transparent antenna structure in FIG. 16B.

Figure 16A:
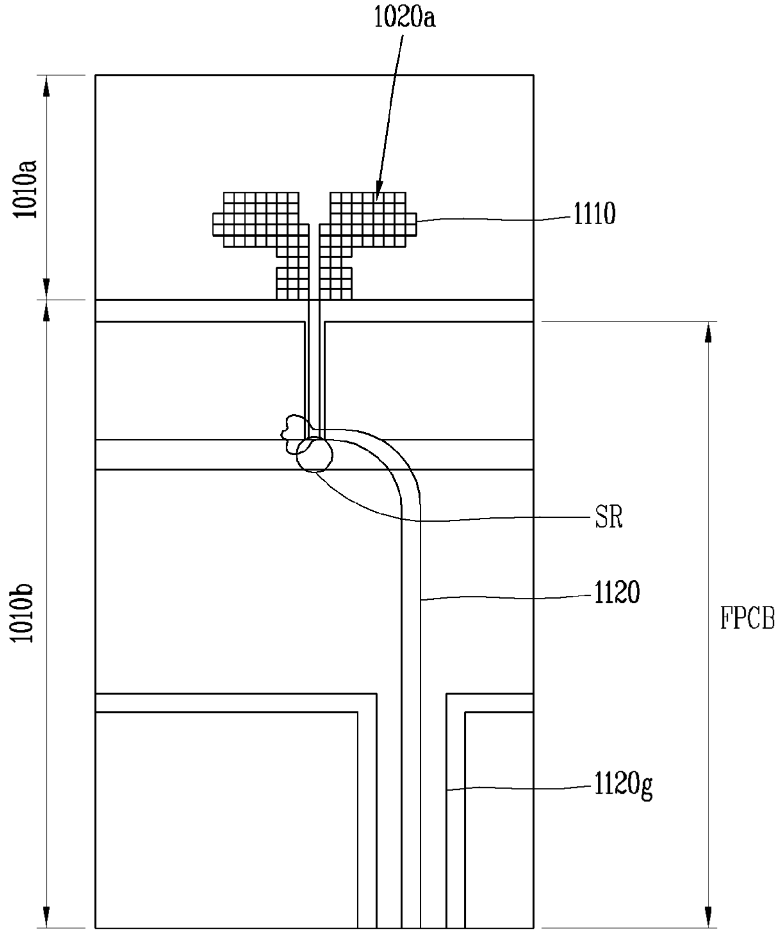
FIGS. 16A and 16B are views each illustrating a transparent antenna structure according to the present disclosure in which a signal is applied to a radiation conductive portion of a transparent region through an electricity supply unit in an opaque region that varies according to whether or not a dummy pattern is present.
Figure 16B:
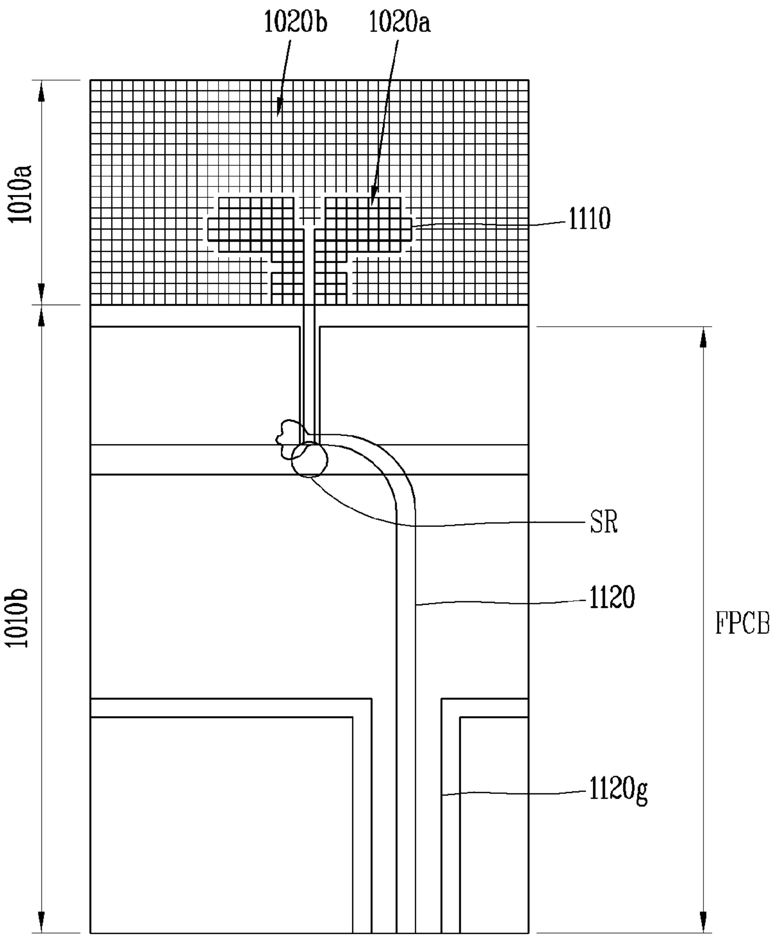
Figure 17A:
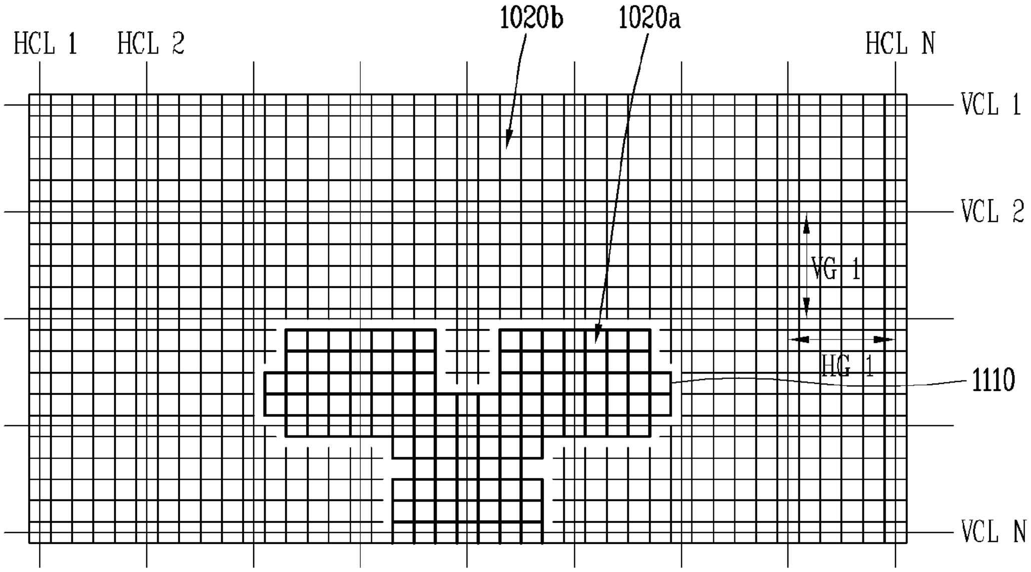
FIGS. 17A, 17B(a), and 17B(b) are enlarged views of the radiation conductive portion in the transparent antenna structure in FIG. 16B.
Figure 17B:
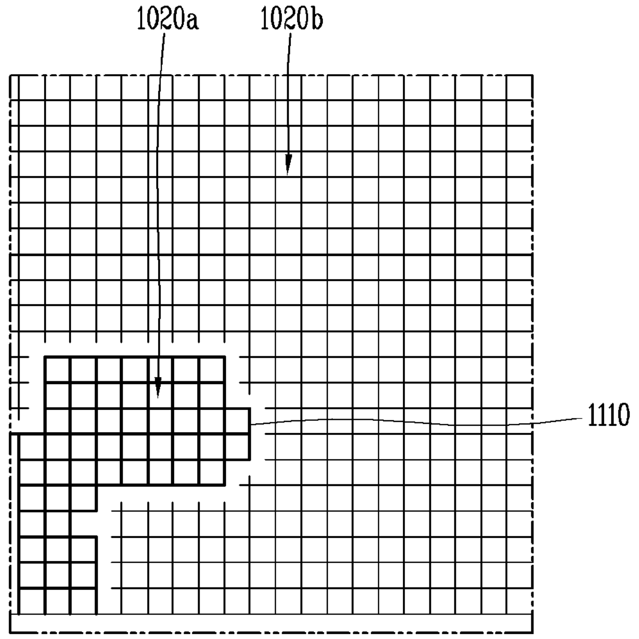
Figure 17B:
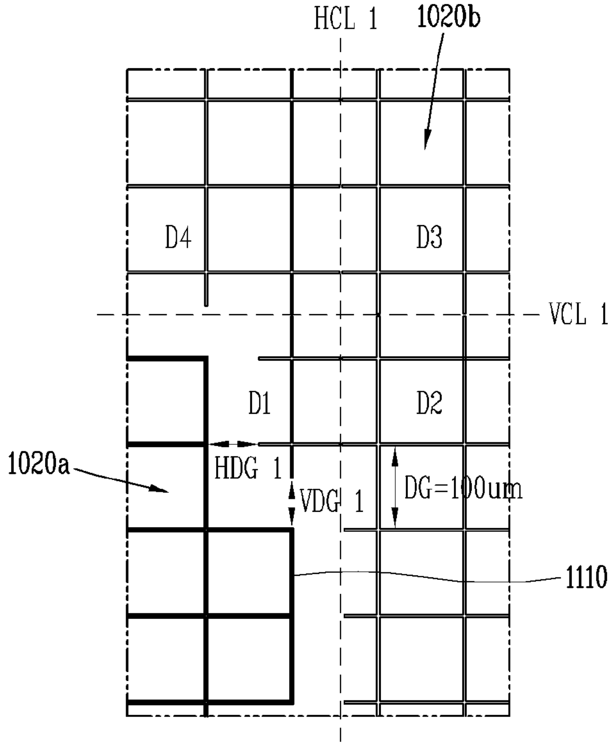

Referring to FIGS. 16A and 16B, a signal may be transmitted to the antenna pattern 1111 on the transparent substrate 1010*a* that is formed as the transparent region 311, through the electricity supply pattern 1110*f* on the opaque substrate 1010*b* formed as the opaque region 312. The opaque substrate 1010*b* may be formed as a flexible printed circuit board (FPCB), and the transparent substrate 1010*a* may be formed of a transparent film. The ground pattern 1120*g* may be formed to both sides of the electricity supply pattern 1110*f*, and the CPW electricity supply structure may be formed. A signal may be transmitted to the antenna pattern 1111 through a slot region SR in the opaque substrate 1010*b*.

As illustrated in FIG. 16A, the antenna pattern 1111 may be configured in such a manner that the dummy pattern is not formed on an outer portion thereof. However, in order to solve the issue of visibility due to a difference in the degree of transparency between the antenna pattern 1111 and an outer portion thereof, the dummy metal mesh region 1020*b*, as illustrated in FIG. 16B, may be formed on the outer portion of the antenna pattern 1111.

Referring to FIGS. 16B and 17A, the antenna pattern 1111 may form the metal mesh radiator region 1020*a* on which the metal lines are connected to each other. The dummy metal mesh region 1020*b* may be formed on the outer portion of the antenna pattern 1111.

The metal lines may be formed on the metal mesh radiator region 1020*a* and the dummy metal mesh region 1020*b* in such a manner as to have a line-width of approximately 2 μm and to have a pitch of approximately 100 μm, but is not limited to this line-width and this pitch. The metal mesh radiator region 1020*a* and the dummy metal mesh region 1020*b* may be formed in such a manner that a distance between the boundaries thereof is approximately 60 μm, but is not limited to this distance. The metal lines on the metal mesh radiator region 1020*a* and the dummy metal mesh region 1020*b* may be formed of a copper or silver material, but is not limited to these materials. The operating frequency band of the antenna pattern 1111 may be set to a band of approximately 57 to 70 GHz. In this regard, the transparent antenna structure may be configured in such a manner as to transmit or receive a wireless signal in a WiFi band of 60 GHz through the antenna pattern 1111. The antenna pattern 1111 formed on the metal mesh radiator region 1020*a* may be realized as a dipole antenna, for example, a Yagi dipole antenna, but is not limited thereto.

Referring to FIG. 17A, the open areas OA may be formed, in such a manner as to be spaced a predetermined distance apart, in the dummy pattern on the dummy metal mesh region 1020*b* formed on an outer portion of the radiation conductive portion 1110. In this regard, the adjacent cut lines HCL1, HCL2, and so forth up to HCLN in the horizontal direction may be disposed to be spaced the first distance HG1 apart. The adjacent cut lines VCL1, VCL2, and so forth up to VCLN in the vertical direction may be disposed to be spaced the second distance VG1 apart. The open area OA may be formed at points of intersection of the dummy pattern on the dummy metal mesh region 1020*b*, the cut lines HCL1, HCL2, and so forth up to the HCLN in the horizontal direction, and the cut lines VCL1, VCL2, and so forth up to VCLN in the vertical direction. As illustrated in FIG. 17A, the open areas OA in which the metal lines are disconnected may also be formed, in such a manner as to be spaced a predetermined distance apart, in the dummy metal mesh region 1020*b* other than boundary portions of the metal mesh radiator region 1020*a* and the dummy metal mesh region 1020*b*. Accordingly, an interference phenomenon may be minimized that occurs between the antenna pattern 1111 and the dummy patterns on the dummy metal mesh region 1020*b* adjacent to the antenna pattern 1111.

Referring to FIG. 17A, the closed dummy region 1020*b*-R2 may be formed on the outer portion of the radiation conductive portion 1110. The antenna pattern 1111 and the dummy pattern may be configured in such a manner that only boundary portions thereof are disconnected from each other, and the dummy patterns may be configured in such a manner as to be connected to each other. As illustrated in FIG. 17B(a), in a case where the dummy region is formed with only the closed dummy region 1020*b*-R2, convenience of manufacturing is improved, but antenna efficiency can be decreased due to the phenomenon of coupling to the antenna pattern 1111. In order to decrease the phenomenon of the coupling, as illustrated in FIG. 17B(b), the cut line may be formed adjacent to the boundary of the antenna pattern 1111.

Referring to FIG. 17B(b), the conductive pattern, forming the radiation conductive portion 1110, and the dummy pattern on the dummy region are disconnected from each other, and at the same time, the dummy pattern and points of intersection of the virtual cut lines are disconnected from each other. Specifically, dummy grids D1, D2, D3, and D4 in the dummy region may be formed in such a manner that they are disconnected from each other by the cut lines HCL1 and VCL1 in the horizontal and vertical directions. A distance DG between the dummy grid in the dummy metal mesh region 1020*b* may be 100 μm. An end portion of the dummy grid D1 adjacent to the boundary of the antenna pattern 1111 may be spaced a first distance HDG and a second distance VDG away from the boundary of the antenna pattern 1111. The first HDG and the second distance VDG may be set to approximately 60 μm, but are not limited thereto. The metal lines may be formed on the metal mesh radiator region 1020*a* and the dummy metal mesh region 1020*b* in such a manner as to have a line-width of approximately 2 μm, but are limited to this line-width.

In the transparent antenna structure according to the present disclosure, the antenna performance can be degraded by the closed dummy region 1020*b*-R2 on which the dummy patterns in the vicinity of the antenna pattern are connected to each other. Referring to FIGS. 16A to 17B(b), the dummy pattern is required in order to enhance the non-visibility of the transparent antenna. In this regard, in terms of the antenna performance, there is a need to form the dummy pattern in the shape of an open dummy in order to be used utilized as an antenna. Therefore, simulation may be performed on the dummy region on which the dummy pattern is formed, considering the presence or absence of the dummy pattern in the transparent antenna structure according to the present disclosure, a distance between the cut portions in the dummy pattern, and the like.

Figure 18A:
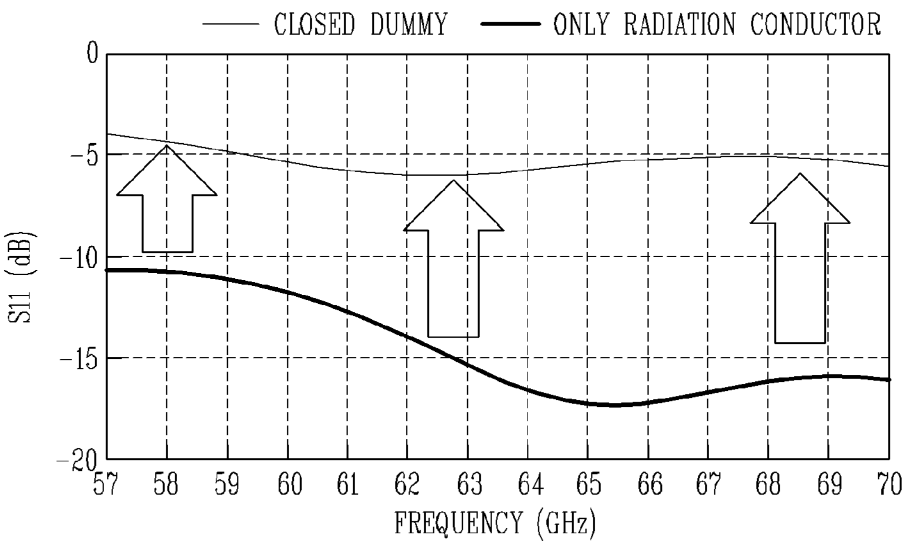
FIG. 18A is a graph for comparing a reflection coefficient measured in a case where only a radiation conductive portion is disposed without the dummy pattern and a reflection coefficient measured in a case where a closed dummy region is formed.
Figure 18B:
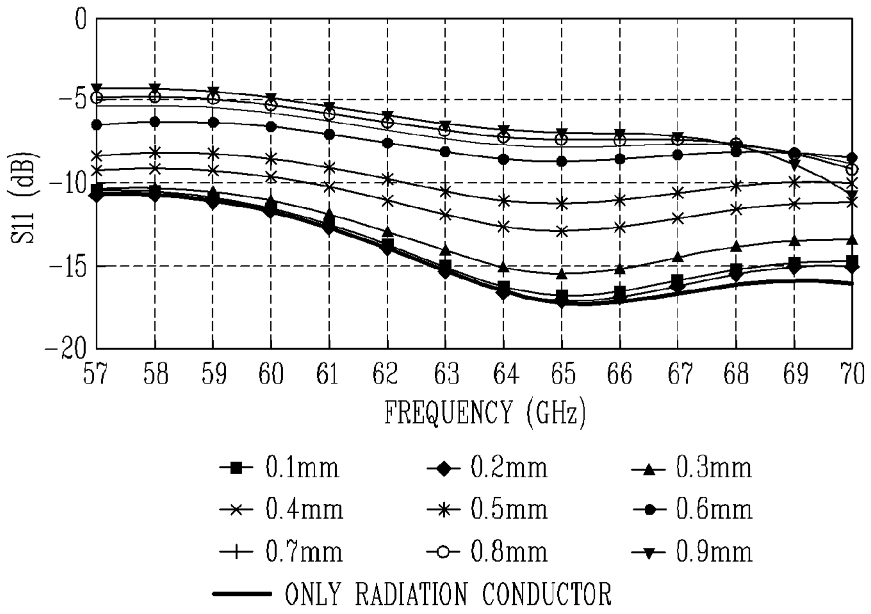
FIG. 18B is a graph for comparing reflection coefficients that vary with a change in a distance between the adjacent dummy patterns.

In this regard, FIG. 18A is a graph for comparing a reflection coefficient measured in a case where only the radiation conductive portion 1110 is disposed without the dummy pattern and a reflection coefficient measured in a case where the closed dummy region 1020*b*-R2 is formed. FIG. 18B is a graph for comparing reflection coefficients that vary with a change in the distance between the adjacent dummy patterns.

Referring to FIGS. 16A and 18A, in a case where only the radiation conductive portion 1110 is disposed without the dummy pattern, a reflection coefficient of −10 dB or less is characteristically obtained in an entire frequency band. Referring to FIGS. 16B, 17B(a), and 18A, in a case where the closed dummy region 1020*b*-R2 is formed, a reflection coefficient of approximately −5 dB is obtained in the entire frequency band. Thus, the antenna performance is degraded. The entire frequency band may be set to a band of approximately 57 to 70 GHz, considering a Wi-Fi communication service operating in a band of 60 GHz, or a mmWave communication service operating in a band of 60 GHz, but is not limited thereto.

Referring to FIGS. 17A to 18B, the more decreased the first distance HG1 between the adjacent cut lines in the horizontal direction and the second distance VG1 between the adjacent cut lines in the vertical direction, the more decreased the distance DG between the dummy grids and the first and second distances HDG and VDG. Accordingly, the more decreased the first distance HG1 and the second distance VG1 between the cut lines, the more decreased the level of coupling to the antenna pattern 1111. Therefore, the more decreased the first distance HG1 and the second distance VG1 between the cut lines, the more similar the antenna performance becomes to the antenna performance obtained in a case where the dummy pattern is not present. In this regard, when the first distance HG1 and the second distance VG1 between the cut lines are approximately 0.5 mm (a 0.12 wavelength) or less, the antenna performance converges to the antenna performance obtained in the case where the dummy pattern is not present. Therefore, the first distance HG1 and the second distance VG1 are less than approximately 0.5 mm (a 0.12 wavelength), the antenna performance similar to the antenna performance obtained in the case where the dummy pattern is not present can be expected.

Figure 19A:
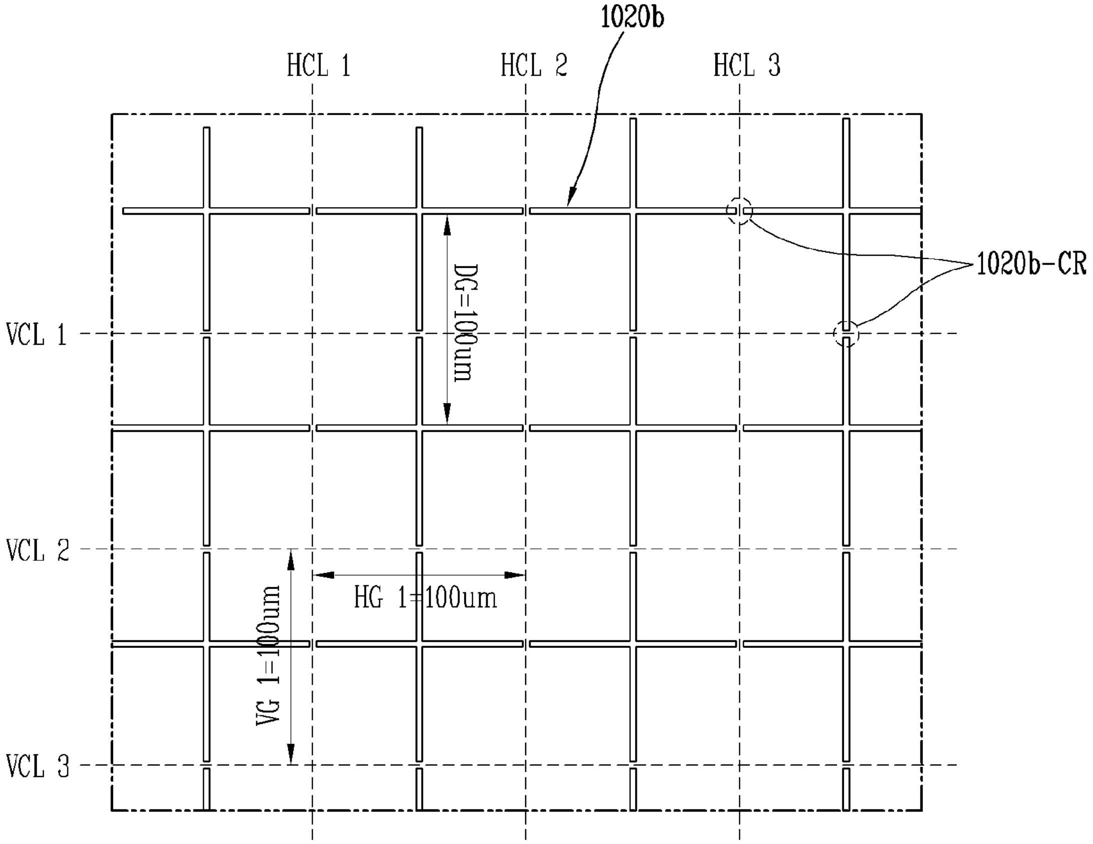
FIG. 19A is a view illustrating a dummy grid structure according to the embodiment of the present disclosure that is configured in such a manner that a cut portion is formed in all dummy cells.
Figure 19B:
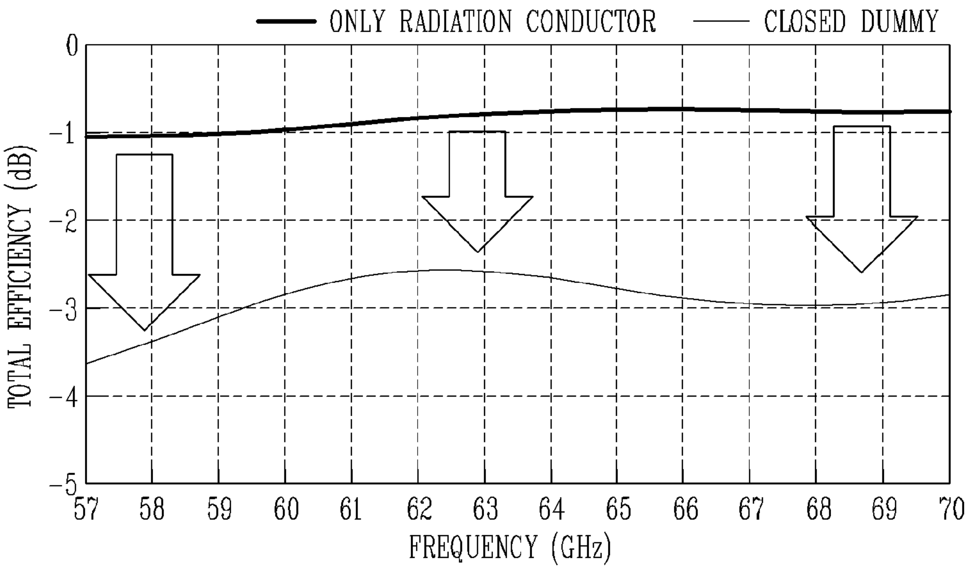
FIG. 19B is a graph for comparing antenna performance of a transparent antenna without the dummy pattern and antenna performance of a transparent antenna in which the closed dummy region is formed.
Figure 19C:
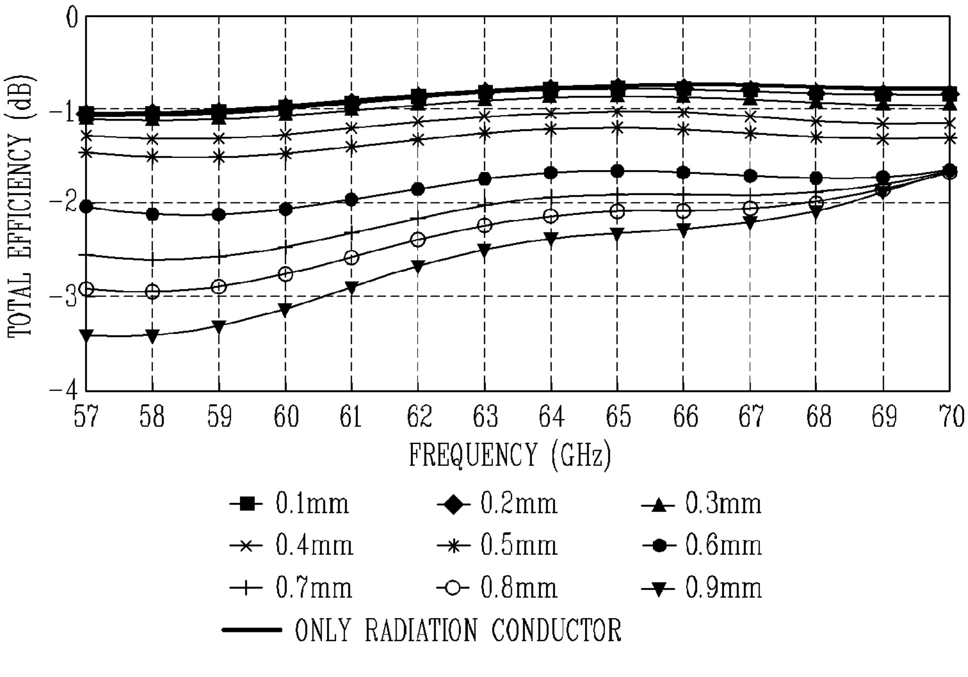
FIG. 19C is a graph for comparing the antenna performance that varies with a distance that the cut portions are formed to be spaced apart in the dummy pattern.

The transparent antenna structure according to the present disclosure may be configured in such a manner that the distance between the cut lines and the distance between the cut lines on the dummy pattern are made to be the same and thus that the cut portion is formed on all dummy cells. In this regard, FIG. 19A illustrates a dummy grid structure according to the embodiment of the present disclosure that is configured in such a manner that the cut portion is formed in all dummy cells. FIG. 19B is a graph for comparing the antenna performance of the transparent antenna without the dummy pattern and the antenna performance of the transparent antenna in which the closed dummy region 1020*b*-R2 is formed. FIG. 19C is a graph for comparing the antenna performance that varies with the distance that the cut portions are formed to be spaced apart in the dummy pattern.

Referring to FIG. 19A, a cut region 1020*b*-CR may be formed in all dummy grids in the dummy region by the cut lines HLC1, HCL2, and HCL3 in the horizontal direction and the cut lines VCL1, VCL2, and VCL3 in the vertical direction. The cut region 1020*b*-CR may be formed by an N×N matrix on all dummy grids in the dummy region. The dummy grids in the dummy metal mesh region 1020*b* may be spaced the distance DG of approximately 100 μm apart. The cut lines HCL1, HCL2, and HCL3 in the horizontal direction may also be spaced the first distance HG1 of approximately 100 μm apart. The cut lines VCL1, VCL2, and VCL3 in the vertical direction may also be spaced the second distance VG1 of approximately 100 μm apart.

The cut region 1020*b*-CR forming the dummy metal mesh region 1020*b* may be formed in such a manner as to have a line-width of approximately 2 μm, but is not limited to this line-width. In this regard, the metal lines forming the dummy metal mesh region 1020*b* may be formed in such a manner that the line-widths thereof are the same as the line-width of the cut region 1020*b*-CR. The metal lines forming the dummy metal mesh region 1020*b* may also be formed in such a manner as to have a line-width of approximately 2 μm, but is not limited to this line-width.

Referring to FIG. 19B, in a case where only the radiation conductive portion is formed by the antenna pattern without the dummy pattern, the antenna efficiency has a value of −1 dB or more. In contrast, in a case where the closed dummy region 1020*b*-R2 is formed, the antenna efficiency has a value of approximately −3 dB. Therefore, in a case where the closed dummy region 1020*b*-R2 is formed, unnecessary coupling occurs in the dummy pattern. Then, the antenna performance is decreased by 2 dB or more when compared with a structure in which the dummy pattern is not present. There is a need to maintain non-visibility characteristics between the antenna region and the dummy region, as well as to solve this issue of the antenna efficiency.

Referring to FIGS. 19A and 19C, when the distance DG between the dummy grids in the dummy meal mesh region 1020*b* is approximately 0.5 mm (a 0.12 wavelength) or less, the antenna efficiency can be kept reduced to 0.5 dB or less. Therefore, when the distance DG between the dummy grids is formed in such a manner as to be at or below a threshold and thus the dummy pattern is spaced a predetermined disconnection distance or smaller apart, the antenna performance similar to that of the antenna structure without the dummy pattern is obtained. Specifically, when the distance DG between the dummy grids is less than 0.5 mm (a 0.12 wavelength), the likelihood of being utilized as an antenna is increased. Accordingly, when the distance DG between the dummy grids is formed in such a manner as to be at or below the threshold, the antenna performance similar to the antenna performance which is obtained when the dummy pattern is not present can be expected.

Figure 20A:
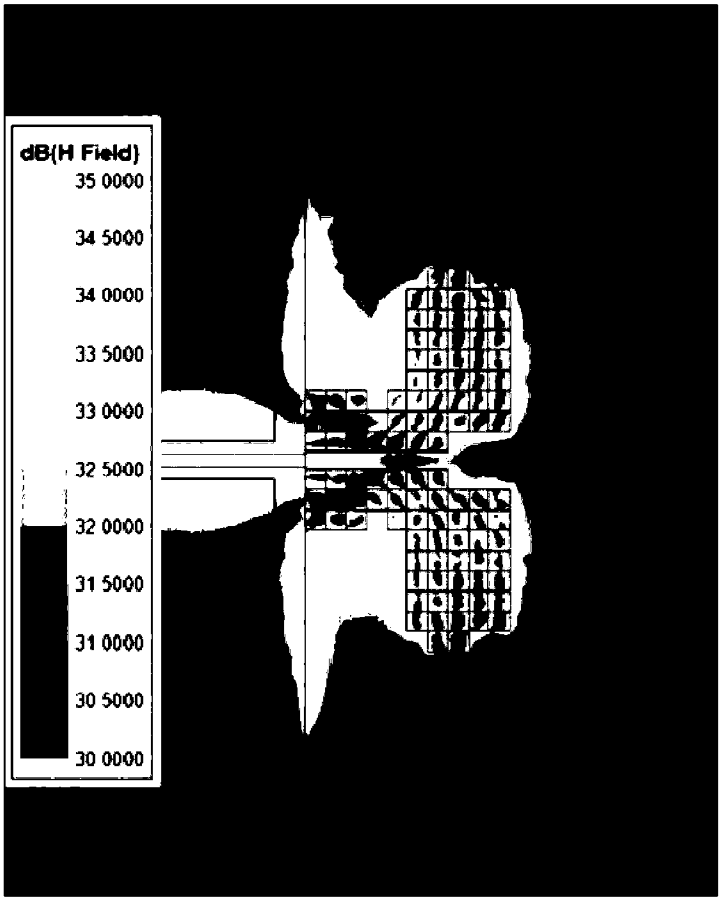
FIGS. 20A to 20C are views each illustrating the radiation conductive portion and a magnetic field distribution in the vicinity thereof in the embodiments of the present disclosure.
Figure 20B:
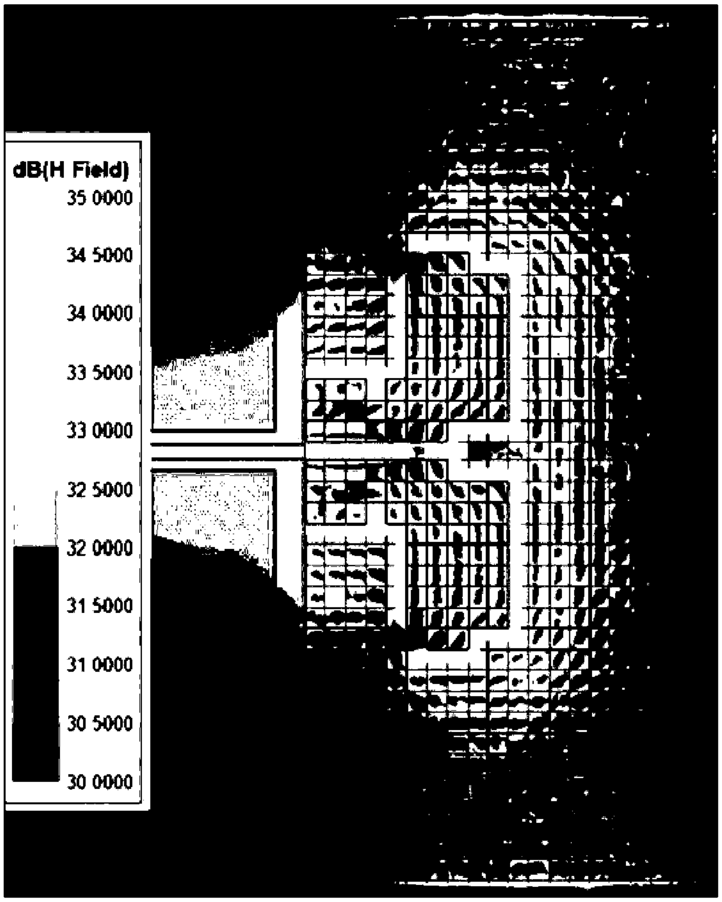
Figure 20C:
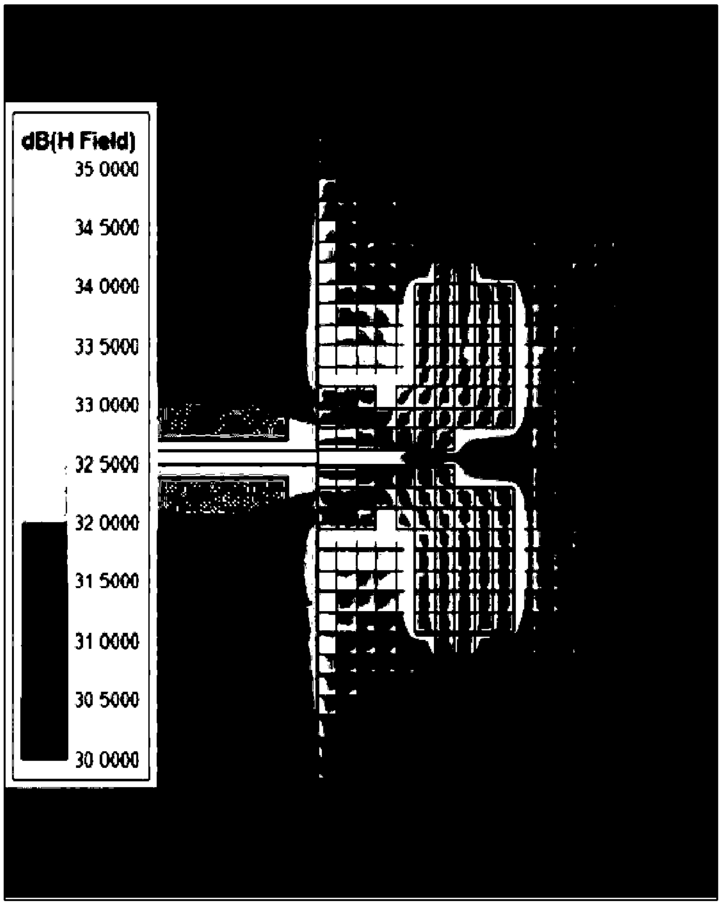

In the transparent antenna structure according to the present disclosure, an electric current distribution and a magnetic field distribution due to the electric current distribution are formed in a manner that varies according to the presence or absence of the dummy pattern. Thus, a change occurs in the antenna performance. In this regard, FIGS. 20A to 20C each illustrate the radiation conductive portion and the magnetic field distribution in the vicinity thereof in the embodiments of the present disclosure. FIG. 20A illustrates the magnetic field distribution in a case where the dummy pattern is not present, as illustrated in FIG. 16A. FIGS. 20B and 20C each illustrate a structure where the dummy pattern is formed, as illustrated in FIG. 16B. Specifically, FIG. 20B illustrates the magnetic field distribution in a case where a closed dummy pattern is formed, as illustrated in FIG. 17B(a). FIG. 20C illustrates the magnetic field distribution in a case where an open dummy pattern is formed, as illustrated in FIG. 19A.

Referring to FIGS. 16A and 20A, in a case where the dummy pattern is not present, a strong magnetic field is formed in the radiation conductive portion and a region that is spaced a predetermined distance away from the radiation conductive portion. Referring to FIGS. 17B(a) and 20B, electric current is induced in the closed dummy pattern. Accordingly, a strong magnetic field is formed not only in the radiation conductive portion and the region that is spaced the predetermined distance away from the radiation conductive portion, but also in the neighboring metal lines adjacent to the region. The forming of the strong magnetic field in the neighboring metal lines adjacent to the region means that strong coupling also occurs in the neighboring metal lines. Referring to FIGS. 19A and 20C, a weaker magnetic field is formed in the open dummy pattern than in the closed dummy pattern. Therefore, the magnetic field distribution in an open dummy pattern structure has characteristics similar to those of the structure where the dummy pattern is not present. Therefore, the open dummy pattern is required in order to lower the level of coupling between the dummy region and the antenna region.

Figure 21:
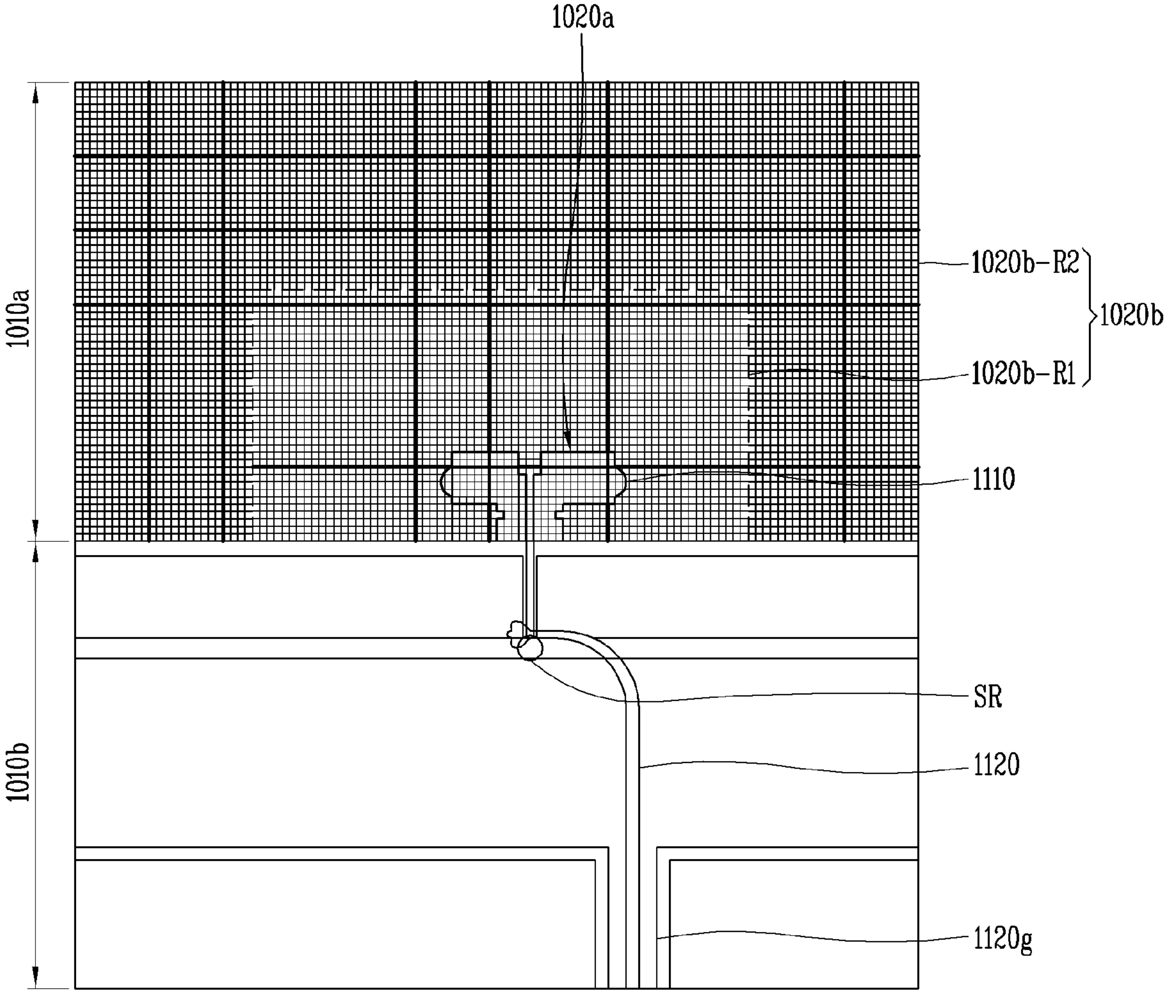
FIG. 21 is a view illustrating a structure in which first and second dummy patterns are disposed in the vicinity of an antenna pattern in the transparent antenna structure in FIG. 16B.

As illustrated in FIG. 16B, the dummy pattern may be disposed in the vicinity of the antenna pattern 1111 in the transparent antenna structure according to the present disclosure. In this regard, FIG. 21 illustrates a structure in which first and second dummy patterns are disposed in the vicinity of the antenna pattern in the transparent antenna structure in FIG. 16B. Referring to FIGS. 16B and 21, the dummy metal mesh region 1020*b* may be formed in the vicinity of the antenna pattern 1111 in such a manner as to be spaced away from the boundary of the antenna pattern 1111. The antenna pattern 1111 may form the metal mesh radiator region 1020*a* on which the metal lines are connected to each other. The dummy metal mesh region 1020*b* may include a first dummy pattern 1020*b*-R1 and a second dummy pattern 1020*b*-R2. The first dummy pattern 1020*b*-R1 may form the open dummy structure 1020*b*-R1 inside which the metal lines are disconnected from each other. The second dummy pattern 1020*b*-R2 may form the open dummy structure 1020*b*-R2 inside which the metal lines are connected to each other.

Referring to FIGS. 16B, 19A, and 21, the first dummy pattern 1020*b*-R1 may be the open dummy pattern 1020*b*-R2 in which a point of intersection with the virtual cut line in the shape of a square whose adjacent two sides are the first distance HG1 of 0.1 mm and the second distance VG1 of 0.1 mm is disconnected. Referring to FIGS. 16B, 17B(b), and 21, the second dummy pattern 1020*b*-R2 may be the closed dummy region 1020*b*-R2 inside which the metal lines are connected to each other.

The antenna pattern 1111 and the dummy metal mesh region 1020*b* may be formed in such a manner that a ratio of the dummy metal mesh region 1020*b* to the antenna pattern 1111 is a predetermined ratio or higher. In this regard, the dummy metal mesh region 1020*b* may be divided into the first dummy pattern 1020*b*-R1 and the second dummy pattern 1020*b*-R2. A change in the antenna performance due to the dummy region in which the second dummy pattern 1020*b*-R2 starts is described in detail.

Figure 22:
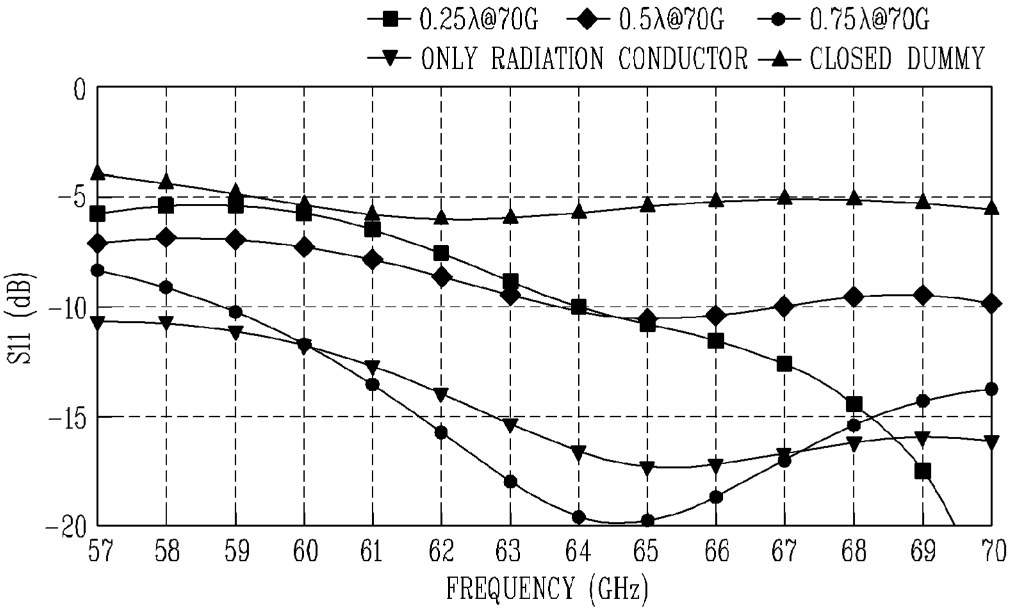
FIGS. 22 (*a*) and (*b*) are graphs each showing a characteristic reflection coefficient and characteristic antenna efficiency that vary with a position at which a closed dummy pattern starts in the antenna structure in FIG. 21.
Figure 22:
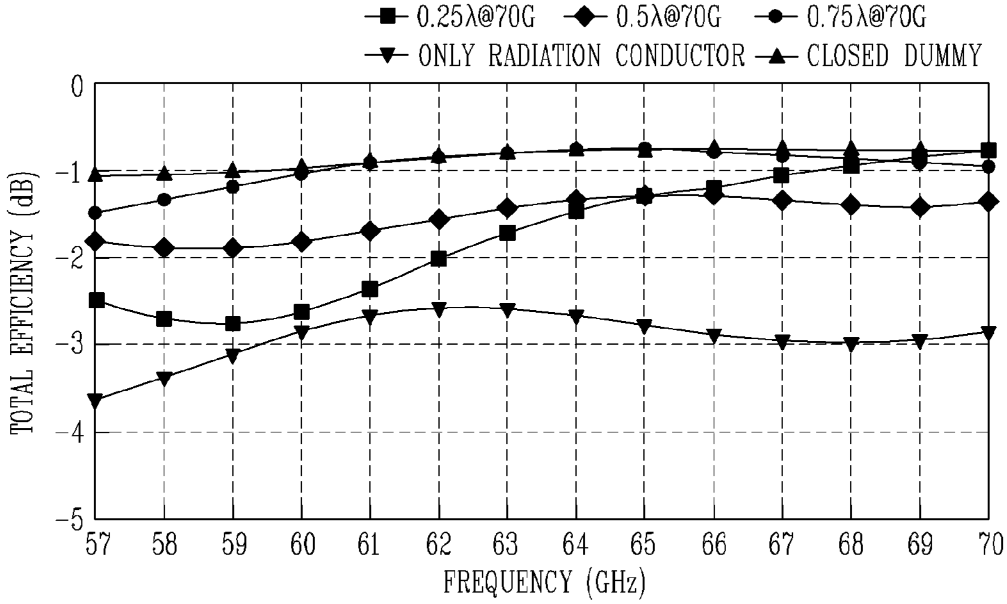

In this regard, FIGS. 22 (*a*) and (*b*) are graphs each showing a characteristic reflection coefficient and characteristic antenna efficiency that vary with a position at which the closed dummy pattern starts in the antenna structure in FIG. 21. Referring to FIGS. 21 and 22 (*a*), in a case where only the antenna pattern 1111 is formed without the dummy pattern, a characteristic reflection coefficient of −10 dB or less is obtained in an entire band. In a case where only the closed dummy region, such as the second dummy pattern 1020*b*-R2, is formed, the characteristic reflection coefficient is degraded to approximately −5 dB. As a distance from the boundary of the antenna pattern 1111 to a boundary of the first dummy pattern 1020*b*-R1 is increased to 0.25, 0.5, and 0.75 wavelengths, the characteristic reflection coefficient is improved.

Referring to FIGS. 21 to 22, in the case where only the antenna pattern 1111 is formed without the dummy pattern, a characteristic antenna efficiency of approximately −1 dB is obtained in the entire band. In a case where only the closed dummy region, such as the second dummy pattern 1020*b*-R2, is formed, the characteristic antenna efficiency is degraded to approximately −3 dB. As the distance from the boundary of the antenna pattern 1111 to the boundary of the first dummy pattern 1020*b*-R1 is increased to 0.25, 0.5, and 0.75 wavelengths, the characteristic antenna efficiency is improved. Accordingly, the second dummy pattern 1020*b*-R2 and the antenna pattern 1111 may be formed in such a manner that a starting point of the second dummy pattern 1020*b*-R2 is spaced a 0.5 or 0.75 wavelength away from the antenna pattern 1111. In this regard, when considering a wavelength at a 70 GHz frequency that is an uppermost frequency in the entire frequency band, the 0.5 wavelength corresponds to approximately 2.2 mm, and the 0.75 wavelength corresponds to approximately 3.2 mm.

FIGS. 21, 22 (*a*), and 22 (*b*) illustrate that all dummy patterns do not need to be open. Like in the second dummy pattern 1020*b*-R2, the dummy regions that are spaced a predetermined distance or greater apart in the antenna pattern 1111 may be configured with the closed dummy pattern. When an inner boundary of the second dummy pattern 1020*b*-R2 is spaced a predetermined distance (for example, a 0.5 wavelength) or greater away from an outer boundary of the antenna pattern 1111, interference with the antenna pattern 1111 may be kept at or below a predetermined level.

In this regard, an antenna in which the second dummy pattern 1020*b*-R2 that is spaced the predetermined distance or greater apart is formed has somewhat less unique impedance matching characteristics and somewhat lower antenna efficiency than an antenna without the dummy pattern, but is utilizable as an antenna. Although the closed dummy pattern region is present, the antenna performance can be excellent in some frequency bands, depending on a size or shape of the dummy pattern. However, when considering an entire operating region of the antenna, a starting point of the second dummy pattern 1020*b*-R2 needs to be spaced a distance of at least a 0.5 or more wavelength apart in order to ensure performance in an intended frequency band.

The transparent antenna structure according to the present disclosure may also be designed in such a manner as to operate at the Sub-6 band other than the mmWave band. In this regard, FIGS. 23A(a), 23A(b), 23B(a) and 23B(b) each illustrate the transparent antenna structure, to which the CPW electricity supply technique applies, which also additionally operates in the Sub-6 band, in the embodiments of the present disclosure. FIGS. 24A(a) and 24A(b) each illustrates the antenna performance and the degree of transparency according to the antenna structure in FIGS. 23A(a), 23A(b), 23B(a) and 23B(b).

Figure 23A:
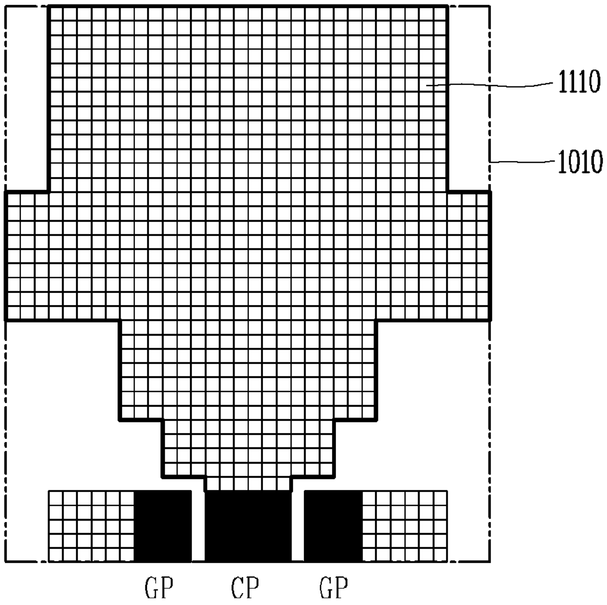
FIGS. 23A(a), 23A(b), 23B(a) and 23B(b) are views each illustrating the transparent antenna structure, to which a CPW electricity supply technique applies, which also additionally operates in a Sub-6 band, in the embodiments of the present disclosure.
Figure 23A:
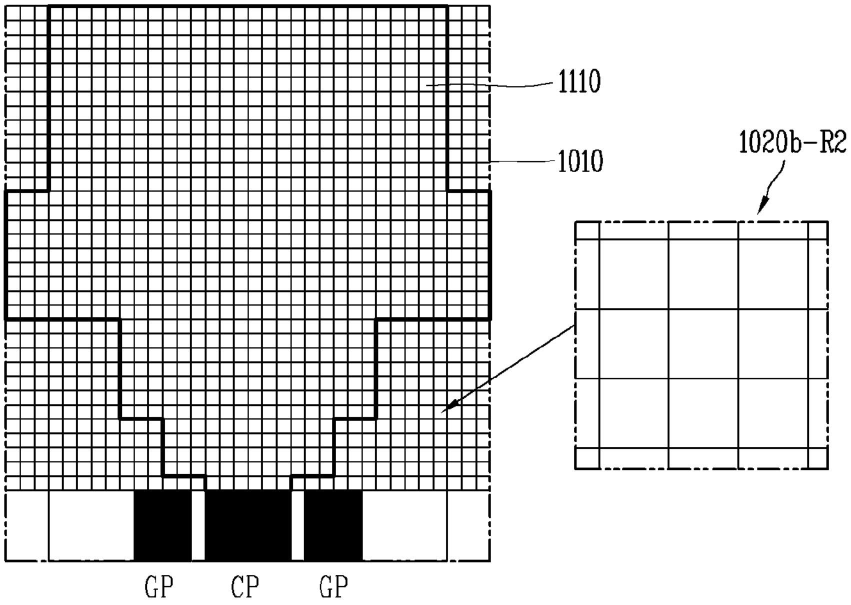
Figure 23B:
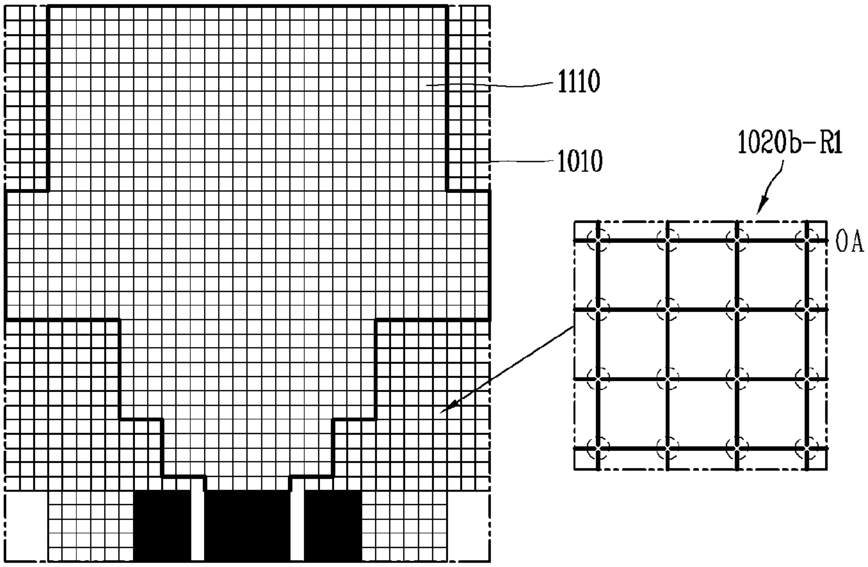
Figure 23B:
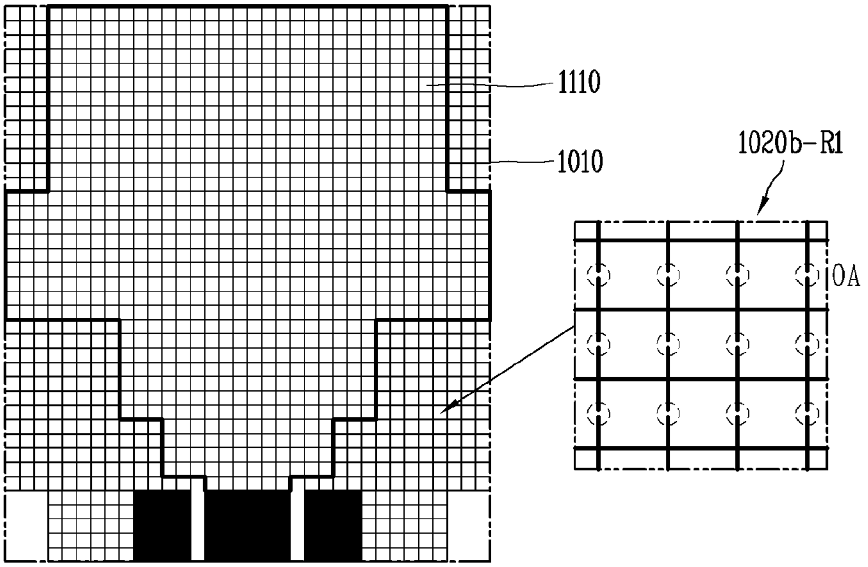
Figure 24A:
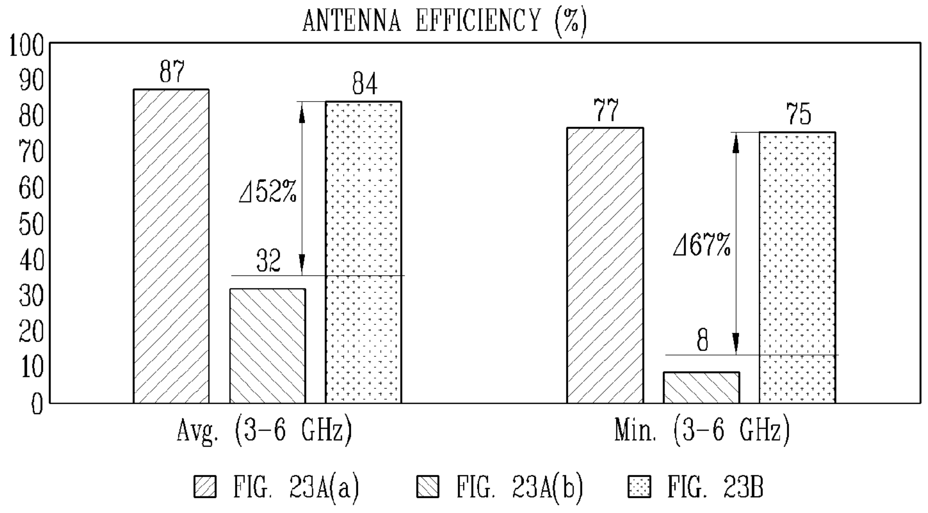
FIGS. 24A(a) and 24A(b) are graphs each showing the antenna performance and the degree of transparency according to the antenna structure in FIGS. 23A(a), 23A(b), 23B(a) and 23B(b).
Figure 24A:
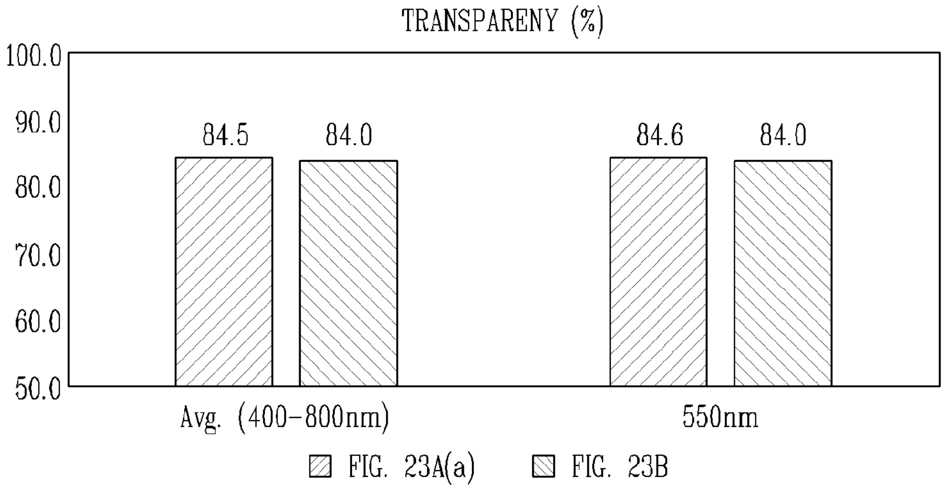

FIG. 23A(a) illustrates an antenna assembly 1000*a* that has no dummy pattern. FIG. 23A(b) illustrates an antenna assembly 1000*b* in which a dummy pattern region is formed as the closed dummy region 1020*b*-R2. FIG. 23B(a) illustrates an antenna assembly 1000*c* in which the slits SL are formed at points, respectively, of intersection of the dummy grids. FIG. 23B(b) illustrates an antenna assembly 1000*d* in which the slits SL are formed at points, respectively, on the middle portions of the metal lines.

Referring to FIGS. 23A(a) to 23B(b), the antenna pattern 1111 is connected to the connector portion CP, and thus a signal may be radiated through the connector portion CP and then through the antenna pattern 1111. The ground portions GP are disposed to both sides, respectively, of the connector portion CP and thus form the CPW electricity supply structure.

FIG. 23A(a) illustrates a structure in which the dummy pattern is not formed on the dielectric substrate 1010. The visibility of the antenna pattern 1111 that is distinguishable at the boundary of the antenna pattern 1111 from the dielectric substrate 1010 is due to a difference in the degree of transparency between PET, which is a material of the dielectric substrate 1010, and the metal mesh on the antenna pattern 1111. Referring to FIG. 23A(b), in the same manner as in the metal mesh structure of the antenna pattern 1111 that is not an open structure, the closed dummy region 1020*b*-R2 on which the metal lines are connected to each other may be formed on the dielectric substrate 1010. The closed dummy region 1020*b*-R2 applies to a dielectric region of the dielectric substrate 1010, and thus the non-visibility of the transparent antenna structure can be enhanced. However, the antenna efficiency is decreased.

Referring to FIGS. 15A and 23B(a), the metal lines are disconnected by the virtual cut lines, and thus the open area OA may be formed. The virtual cut lines that are formed in such a manner that the metal lines are disconnected may be formed in a rotated state, as illustrated in FIG. 15A, but are not limited to this rotated state. Referring to FIGS. 15B and 23B (a), the metal lines are disconnected by the virtual cut lines, and thus the open area OA may be formed. The virtual cut lines formed in such a manner that the metal lines are disconnected may be formed in such a manner as to be moved in parallel with respect to the metal lines on the open dummy region 1020*b*-R1, as illustrated in FIG. 15B, but are not limited to this forming.

Referring to FIG. 23B, the open dummy region 1020*b*-R1 that is not combined with the antenna pattern 1111 is formed on the dielectric region 1010, and thus has a higher sheet resistance than the closed dummy region 1020*b*-R2. The open areas OA are formed at the points, respectively, of intersection of the dummy grids forming the dummy region 1020*b*-R1, or are formed in the mesh lines, respectively. The non-visibility of the transparent antenna structure can be ensured without decreasing the antenna efficiency.

Referring to FIGS. 23A, 23B, and 24A(a), a first structure in which the dummy pattern is not formed has an average antenna efficiency of 87% and a minimum antenna efficiency of 77%. A second structure in which the closed dummy region 1020*b*-R2 is formed has an average antenna efficiency of 32% and a minimum antenna efficiency of 8%. A third structure in which the open dummy region 1020*b*-R1 is formed has an average antenna efficiency of 84% and a minimum antenna efficiency of 75%. Therefore, it is possible that the efficiency of the antenna employing the third structure in which the open dummy region 1020*b*-R1 is formed at a predetermined or smaller from a boundary of the radiation conductive portion 1110 is improved by 50% or more, when compared with the closed dummy region 1020*b*-R2. It is possible that, similarly to the antenna employing the first structure that has no dummy pattern, the efficiency of the antenna employing the third structure is increased and that the non-visibility associated with the transmissivity is enhanced.

Referring to FIGS. 23A, 23B, and 24A(b), the first structure in which the dummy pattern is not formed has a degree of transparency of approximately 84.5 to 84.6%. The third structure in which the open dummy region 1020*b*-R1 is formed has a degree of transparency of approximately 84.0% that is almost similar to that of the first structure. In this regard, the dielectric region 1010 of the first structure may be formed of PET, and the antenna region may be formed of a metal mesh (MM). The dielectric region 1010 of the third structure may be formed of PET, and a region in the vicinity of the antenna region may be formed of an open dummy.

Figure 24B:
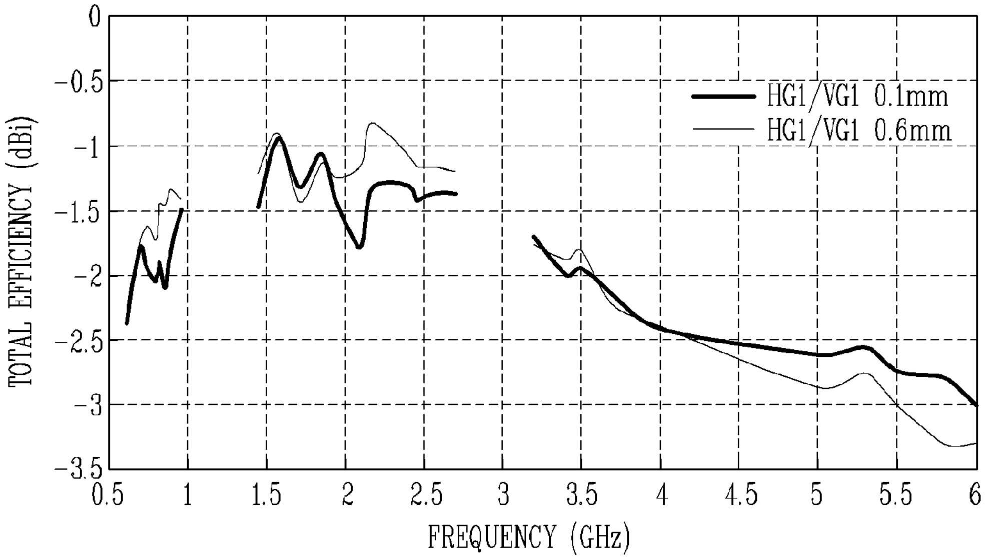
FIG. 24B is a graph showing the antenna efficiency varying with a distance between the cut lines in the transparent antenna structure according to the present disclosure that also operates as an antenna in the Sub-6 band.

The transparent antenna structure including the dummy pattern, in various embodiments of the present disclosure, may also operate in the Sub-6 band other than the mmWave band. In this regard, FIG. 24B shows the antenna efficiency varying with the distance between the cut lines in the transparent antenna structure according to the embodiment of the present disclosure that operates as an antenna in the Sub-6 band.

Referring to FIGS. 7B to 8B and 24B, in a case where the first and second distances HG1 and VG1 between the virtual cut lines are approximately 0.1 mm, the antenna assembly has an antenna efficiency of approximately −3 dB or more in a 4G frequency band and a 5G frequency band. For 4G and 5G wireless communication, the antenna assembly may transmit and receive a wireless signal in an entire band including a low band (LB), a mid band (MB), and a high band (HB). The antenna assembly has an antenna efficiency of approximately −3 dB or more in an entire band of approximately 600 MHz to 6 GHz.

In a case where the first and second distances HG1 and VG1 between the virtual cut lines is approximately 0.6 mm, the antenna assembly has an antenna efficiency of approximately −3 dB or more in a first band that is the low band LB, among the low band LB, the mid band MB, and the high band HB. As the first and second distances HG1 and VG1 are increased from approximately 0.1 mm to 0.6 mm, the antenna efficiency is somewhat decreased in a second band higher than the first band, among the low band LB, the mid band MB, and the high band HB. As the first and second distances HG1 and VG1 are increased from approximately 0.1 mm to 0.6 mm, the antenna efficiency is somewhat increased in one of the low band LB and the mid band MB. Accordingly, the distance that the dummy patterns are spaced apart for disconnection in the transparent antenna structure that operates in a 4G/5G band may be set to a range of approximately 0.1 mm to 0.6 mm.

Figure 25:
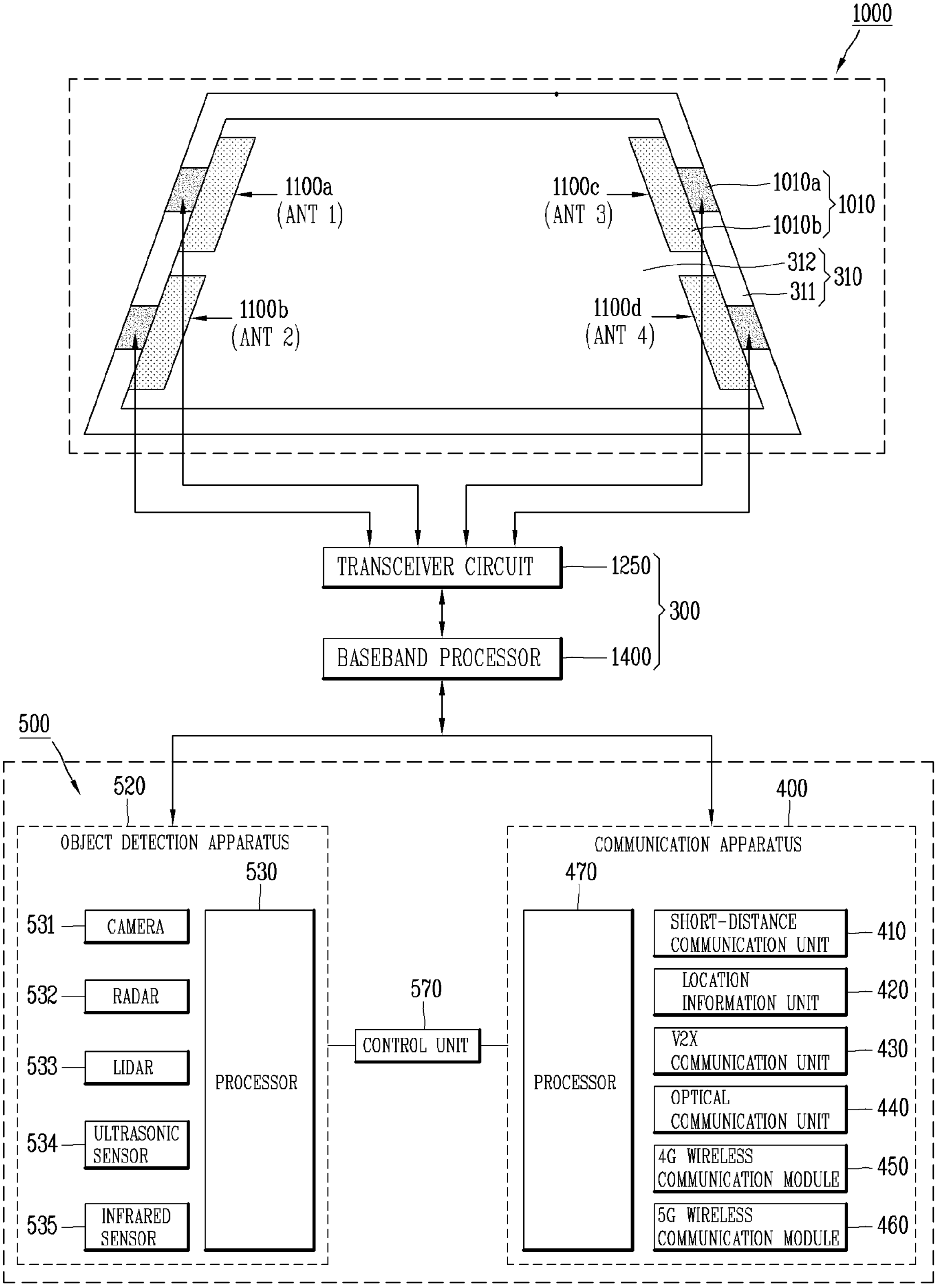
FIG. 25 is a block diagram illustrating a configuration in which a plurality of antenna modules according to the present disclosure that are disposed in different positions, respectively, in the vehicle are combined with other components of the vehicle.

A vehicle equipped with the antennal module according to an aspect of the present disclosure will be described in detail below. In this regard, FIG. 25 illustrates a configuration in which a plurality of antenna modules according to the present disclosure, which are disposed in different positions, respectively, in the vehicle, are combined with other components of the vehicle.

Referring to FIGS. 1 to 25, the vehicle 500 includes a conductive vehicle body that operates as an electric ground. The vehicle 500 may be equipped with a plurality of antennas 1100*a* to 1100*d* that can be disposed at different positions, respectively, on the glass panel 310. The antenna assembly 1000 may be configured to include the plurality of antennas 1100*a* to 1100*d* and a communication module 300. The communication module 300 may be configured to include a transceiver circuit 1250 and a processor 1400. The communication module 300 may correspond to a TCU of the vehicle 500 or may constitute at least one portion of the TCU.

The vehicle 500 may be configured to include an object detection apparatus 520 and a navigation system 550. The vehicle 500 may further include a separate processor 570 in addition to the processor 1400 included in the communication module 300. The processor 1400 and the separate processor 570 may be distinguished from each other physically or functionally and may be realized on one substrate. The processor 1400 may be realized as the TCU, and the processor 570 may be realized as an electronic control unit (ECU).

In a case where the vehicle 500 is an autonomous vehicle, the processor 570 may be an automated driving control unit (ADCU) into which the ECU is integrated. The processor 570 may search for a traveling path and may perform control in such a manner as to accelerate or decelerate the vehicle 500, on the basis of information obtained through measurement by a camera 531, a radar 532 and/or a lidar 533. To this end, the processor 570 may operate in conjunction with the processor 530 corresponding to an MCU inside the object detection apparatus 520, and with the communication module 300 corresponding to the TCU.

The vehicle 500 may include the first transparent dielectric substrate 1010*a* and the second dielectric substrate 1010*b* that are disposed on the glass panel 310. The first transparent dielectric substrate 1010*a* may be formed inside the glass panel 310 of the vehicle 500 or may be attached on a surface of the glass panel 310. The first transparent dielectric substrate 1010*a* may be configured in such a manner that the conductive patterns in the shape of a metal mesh grid are formed thereon. The vehicle 500 may include the antenna module 1100 in which the conductive patterns are formed, in the metal mesh shape, on one lateral surface of the dielectric substrate 1010 in such a manner as to radiate a wireless signal.

The antenna assembly 1000 may include a first antenna module 1100*a* to a fourth antenna module 1100*d* in such a manner as to perform Multi-Input Multi-Output (MIMO). The first antenna module 1100*a*, the second antenna module 1100*b*, the third antenna module 1100*c*, and the fourth antenna module 1100*d* may be disposed on an upper left portion, a lower left portion, an upper right portion, and a lower right portion, respectively, of the glass panel 310. The first antenna module 1100*a* to the fourth antenna module 1100*d* may be referred to as a first antenna ANT1 to a fourth antenna ANT4, respectively. The first antenna ANT1 to the fourth antenna ANT4 may be referred to as a first antenna module ANT1 to a fourth antenna module ANT4, respectively.

As described above, the vehicle 500 may include the telematics control unit (TCU) 300 that is a communication module. The TCU 300 may perform control in such a manner that a signal is received and transmitted through at least one of the first to fourth antenna modules 1100*a* to 1100*d*. The TCU 300 may be configured to include the transceiver circuit 1250 and a baseband processor 1400.

Accordingly, the vehicle 500 may be configured to further include the transceiver circuit 1250 and the processor 1400. One portion of the transceiver circuit 1250 may be disposed as an antenna module or a combination of antenna modules. The transceiver circuit 1250 may perform control in such a manner that a wireless signal in at least one of a first frequency band to a third frequency band is radiated through the antenna modules ANT1 to ANT4. The first frequency band to the third frequency band may be the low band LB, the mid band MB, and the high band HB, respectively, for 4G/5G wireless communication, and are not limited to them, respectively.

The processor 1400 may be operatively combined with the transceiver circuit 1250 and may be configured as a modem operating in a baseband. The processor 1400 may be configured in such a manner as to receive or transmit a signal through at least one of the first antenna module ANT1 and a second antenna module ANT2. The processor 1400 may perform a diversity operation or a MIMO operation using the first antenna module ANT1 and the second antenna module ANT2 in such a manner that a signal is transmitted to inside the vehicle 500.

The antenna modules may be disposed on different regions, respectively, on one side and the other side of the glass panel 310. The antenna module may receive signals from in front of the vehicle 500 at the same time and may perform Multi-Input Multi-Output (MIMO). In this regard, the antenna module may further include a third antenna module ANT3 and a fourth antenna module ANT4 in addition to the first antenna module ANT1 and the second antenna module ANT2, in such a manner as to perform 4×4 MIMO.

The processor 1400 may be configured in such a manner that the antenna module to perform communication with an entity is selected on the basis of a traveling path for the vehicle 500 and a path for communication with the entity communicating with the vehicle 500. The processor 1400 may perform the MIMO operation using the first antenna module ANT1 and the second antenna module ANT2, on the basis of a direction in which the vehicle 500 travels. Alternatively, the processor 1400 may perform the MIMO operation using the third antenna module ANT3 and the fourth antenna module ANT4, on the basis of a direction in which the vehicle 500 travels.

The processor 1400 may perform Multi-Input Multi-Output (MIMO) in the first band through two or more of the first antenna ANT1 to the fourth antenna ANT4. The processor 1400 may perform Multi-Input Multi-Output (MIMO) in at least one of the second band and a third band through at least two of the first antenna ANT1 to the fourth antenna ANT4.

Accordingly, in a case where the performance in transmitting/receiving a signal in any one band in the vehicle 500 is decreased, it is possible that the vehicle 500 transmits and receives the signal in the other bands. As an example, for communication coverage extension and connection reliability in the vehicle 500, the first band that is the low band may be preferably used for a connection for communication, and subsequently, the connection for communication may be performed in the second and third bands.

The processor 1400 may control the transceiver circuit 1250 in such a manner as to perform carrier aggregation (CA) or double connection (DC) through at least one of the first antenna ANT1 to fourth antenna ANT4. In this regard, a communication capacity can be increased through aggregation in the second band and the third that are broader than the first band. In addition, communication reliability can be improved through double connection with nearby vehicles or entities, using a plurality of antenna elements that are disposed on different regions, respectively, of the vehicle 500.

The antenna system equipped with the broadband antenna formed of a transparent material and the vehicle equipped with the antenna system are described above. Technical effects of the antenna system equipped with the broadband antenna formed of a transparent material and technical effects of the vehicle equipped with the antenna system are described as follows.

According to the present disclosure, the antenna assembly can be optimally configured that is formed of a transparent material in such a manner that the antenna region is not identifiable from the neighboring dielectric region in the transparent antenna structure.

According to the present disclosure, a difference in the non-visibility between a region where the antenna formed of a transparent material is disposed and a different region can be minimized by forming the open dummy region where the open area is formed in the dielectric region.

According to the present disclosure, the spacing by a predetermined distance between the antenna region and the dummy pattern can ensure the non-visibility of each of the transparent antenna and the antenna assembly including the transparent antenna without the degradation in the antenna performance.

According to the present disclosure, the forming of the open dummy structure in such a manner as to disconnect the points of intersection of the metal lines on the dummy region and one point on each of the metal lines can ensure the non-visibility of each of the transparent antenna and the antenna assembly including the transparent antenna without the degradation in the antenna performance.

According to the present disclosure, the forming of the virtual cut lines formed in both axial directions in such a manner as to disconnect the metal lines on the dummy region can ensure the non-visibility of each of the transparent antenna and the antenna assembly including the transparent antenna without the degradation in the antenna performance.

According to the present disclosure, a structure of the virtual cut line capable of being realized in various sizes and shapes can ensure the non-visibility of each of the transparent antenna and the antenna assembly including the transparent antenna without the degradation in the antenna performance.

According to the present disclosure, the atypical metal mesh grid structure capable of being realized in various sizes and shapes can realize the transparent antenna having an excellent level of transparency and excellent sheet resistance characteristics without the degradation in the antenna performance.

According to the present disclosure, optimal designing of the slits in the dummy pattern having the open area and the open area separate from the radiator region can improve the visibility without the degradation in the antenna performance in the transparent antenna.

According to the present disclosure, the broadband antenna structure, formed of a transparent material, that is capable of decreasing a loss in electricity supply and improving the antenna efficiency while operating in the broad band can be provided through the glass pane of the vehicle or a display region of the electronic apparatus.

According to the present specification, the transparent antenna structure capable of performing wireless communication in 4G and 5G frequency bands can be provided while minimizing a change in the antenna performance and a difference between the antenna region and a region in the vicinity of the antenna region.

According to the present specification, the transparent antenna structure capable of performing the wireless communication in the mmWave frequency band can be provided while minimizing the change in the antenna performance and the difference between the antenna region and the region in the vicinity of the antenna region.

An additional range of applicability of the present disclosure would be apparent from the following detailed description. However, it would be clearly understood that various alterations and modifications are possibly made within the technical idea of the present disclosure, and therefore it should be understood that a specific embodiment, as a desired embodiment, are provided only in an exemplary manner in the present disclosure.

According to the present disclosure, designing and driving of the antenna assembly including the transparent antenna and the vehicle controlling the antenna assembly are realizable, as computer-readable codes, on a medium on which a program is recorded. Computer-readable mediums include all types of mediums on which data readable by a computer system are stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, and the like. The computer-readable medium may also be realized in the form of a carrier wave (for example, transmission over the Internet). In addition, the examples of the computer-readable medium include a control unit of a terminal. Therefore, the detailed description should be considered as exemplary one without being interpreted in a limited manner in all aspects. The scope of the present disclosure is determined by proper interpretation of the following claims. All equivalent modifications to the embodiments of the present disclosure fall within the scope of the present disclosure.

What is claimed is:

1. An antenna assembly comprising:

a first layer comprising a dielectric substrate that comprises a transparent dielectric material; and a second layer having a metal mesh shape on a surface of the dielectric substrate, wherein the second layer comprises:

a metal mesh radiator region having metal lines that form a mesh shape having a line-width less than or equal to a first line-width to transmit and receive a wireless signal, and an open area; and a dummy metal mesh region having metal lines and slits that form a mesh shape having a line-width less than or equal to a second line-width, wherein the metal mesh radiator region has a first transmissivity, and the dummy metal mesh region has a second transmissivity that is higher than the first transmissivity, wherein the dummy metal mesh region is spaced away from an outer portion of the metal mesh radiator region, wherein the mesh shape of the dummy metal mesh region overlaps virtual cut lines extending along a first axial direction and a second axial direction, and forms the open area, wherein the virtual cut lines and a plurality of polygons formed by the metal lines in the mesh shape of the dummy metal mesh region are overlapped in a line-width region corresponding to an interior of the polygons, wherein the virtual cut lines are arranged on the dummy metal mesh region to be equally spaced from each other, wherein a boundary of a portion of the dummy metal mesh region and a boundary of the metal mesh radiator region are spaced apart by a first gap, wherein a first region of the dummy metal mesh region that is spaced by a distance less than or equal to a second gap away from the boundary of the metal mesh radiator region forms an open dummy region in which slits by which the metal lines in the mesh shape are disconnected are present, and wherein a second region of the dummy metal mesh region that is spaced by a distance greater than or equal to the second gap away from the boundary of the metal mesh radiator region forms a closed dummy region in which shapes of the mesh shape are connected to each other.

2. The antenna assembly of claim 1, wherein the first transmissivity of the metal mesh radiator region is greater than or equal to 80%, the second transmissivity of the dummy metal mesh region is greater than or equal to 82%, and a sheet resistance of the metal mesh radiator region is less than or equal to 1 Ω (ohm)/sq.

3. The antenna assembly of claim 1, wherein a difference between the first transmissivity of the metal mesh radiator region and the second transmissivity of the dummy metal mesh region is less than or equal to 2%, and wherein a boundary of the dummy metal mesh region and the boundary of the metal mesh radiator region are spaced apart by a distance less than or equal to 200 μm.

4. The antenna assembly of claim 1, wherein the line-width of the dummy metal mesh region is 5.2 μm to 5.4 μm, and wherein the dummy metal mesh region has a thickness of 6.0 μm to 6.3 μm.

5. The antenna assembly of claim 1, wherein an antenna pattern formed by the metal mesh radiator region is configured to operate in an operating frequency band of 800 MHz to 3000 MHz, and wherein a distance between the virtual cut lines on the dummy metal mesh region is set to be less than or equal to 1/10 of a wavelength, and when 3000 MHz is defined as a reference frequency, the distance between the virtual cut lines is set to be less than or equal to 10 mm.

6. The antenna assembly of claim 1, wherein when the metal lines in the mesh shape of the metal mesh radiator region have a pitch of 100 μm to 150 μm, the mesh shape of the metal mesh radiator region has a sheet resistance of 0.47 Ω/sq to 0.89 Ω/sq.

7. The antenna assembly of claim 1, wherein a dummy pattern on the dummy metal mesh region is configured to be disconnected along a vertical direction and a horizontal direction, and wherein a coupling level between the metal mesh radiator region and the dummy pattern is less than a coupling level between the metal mesh radiator region and a second dummy pattern on the dummy metal mesh region that is configured to be connected along the vertical direction and the horizontal direction.

8. The antenna assembly of claim 7, wherein a boundary of the dummy pattern is configured to be spaced away from boundaries of the metal lines on the metal mesh radiator region by a distance less than or equal to 100 μm.

9. The antenna assembly of claim 1, wherein vertical virtual cut lines are disposed on the dummy metal mesh region to be spaced a first distance apart along a vertical direction, and horizontal virtual cut lines are disposed on the dummy metal mesh region to be spaced a second distance apart along a horizontal direction, and wherein the first distance and the second distance are set to be greater than or equal to a distance between a boundary of the dummy metal mesh region and the boundary of the metal mesh radiator region.

10. The antenna assembly of claim 1, wherein the second gap is set to be in a range of ¼ to ½ of a wavelength corresponding to an uppermost frequency, among operating frequencies of an antenna pattern formed by the metal mesh radiator region, to keep an interference between the metal mesh radiator region and the closed dummy region less than a predetermined level.

11. The antenna assembly of claim 1, further comprising a connector portion connected to the metal mesh radiator region to transmit the wireless signal, wherein the connector portion has a third transmissivity that is lower than the first transmissivity.

* * * * *